(12) United States Patent
Petti et al.

(10) Patent No.: US 12,499,922 B2
(45) Date of Patent: Dec. 16, 2025

(54) CURRENT SOURCE FOR READ OF PROGRAMMABLE RESISTANCE MEMORY CELLS

(71) Applicant: Sandisk Technologies, Inc., Milpitas, CA (US)

(72) Inventors: Christopher J. Petti, Mountain View, CA (US); Ward Parkinson, Boise, ID (US); Thomas Trent, Tucson, AZ (US); James O'Toole, Boise, ID (US)

(73) Assignee: Sandisk Technologies, Inc., Milpitas, CA (US)

( * ) Notice: Subject to any disclaimer, the term of this patent is extended or adjusted under 35 U.S.C. 154(b) by 164 days.

(21) Appl. No.: 18/360,119

(22) Filed: Jul. 27, 2023

(65) Prior Publication Data

US 2024/0395301 A1 Nov. 28, 2024

Related U.S. Application Data

(60) Provisional application No. 63/504,428, filed on May 25, 2023.

(51) Int. Cl.
*G11C 11/00* (2006.01)
*G11C 11/16* (2006.01)
(Continued)

(52) U.S. Cl.
CPC ........ *G11C 11/1697* (2013.01); *G11C 11/161* (2013.01); *G11C 11/1655* (2013.01);
(Continued)

(58) Field of Classification Search
CPC ............ G11C 11/5678; G11C 13/0004; G11C 13/0038; G11C 13/0064; G11C 13/0069;
(Continued)

(56) References Cited

U.S. PATENT DOCUMENTS 5,572,474 A 11/1996 Sheen et al.
7,187,235 B2 3/2007 Moon
(Continued)

FOREIGN PATENT DOCUMENTS

CN 218447235 U 2/2023
JP 2018509727 A 4/2018
(Continued)

*Primary Examiner* — Thong Q Le
(74) *Attorney, Agent, or Firm* — Pearl Cohen Zedek Latzer Baratz LLP

(57) ABSTRACT

Technology is disclosed for a current source for reading a memory cell having a threshold switching selector. The current source may be operated in a first mode when turning on the threshold switching selector and in a second mode when sensing a voltage across the memory cell. The first mode may allow the use of the full range of the power supply voltage, which provides sufficient voltage across the memory cell to turn on the threshold switching selector. In the second mode the magnitude of the read current is less dependent on the voltage across the memory cell. The second mode therefore provides for accurate sensing of the memory cell. The first mode may also be used when writing the memory cell, which provides sufficient voltage across the memory cell to write the memory cell.

20 Claims, 30 Drawing Sheets

(51) Int. Cl.
*G11C 13/00* (2006.01)
*H10N 50/80* (2023.01)

(52) U.S. Cl.
CPC ...... *G11C 11/1659* (2013.01); *G11C 11/1673* (2013.01); *G11C 11/1675* (2013.01); *G11C 13/003* (2013.01); *G11C 13/0038* (2013.01); *G11C 13/004* (2013.01); *G11C 13/0069* (2013.01); *G11C 2013/0045* (2013.01); *G11C 2213/15* (2013.01); *H10N 50/80* (2023.02)

(58) Field of Classification Search
CPC ........ G11C 2013/0078; G11C 2213/79; G11C 5/14; G11C 7/1096; G11C 11/161; G11C 11/1655; G11C 11/1659; G11C 11/1673; G11C 11/1675; G11C 11/1697; G11C 13/0026; G11C 13/003; G11C 13/004; G11C 2013/0045; G11C 2213/15; G11C 11/4091; G11C 5/147; G11C 29/02; G11C 29/028; G11C 29/50; G11C 16/04; G11C 29/50004; G11C 7/14; G11C 11/22; G11C 2029/5004; G11C 2211/5641; G11C 29/023; G11C 29/026; G11C 29/1201; G11C 29/46; G11C 29/48; G11C 11/401; G11C 11/406; G11C 11/4087; G11C 11/417; G11C 11/419; G11C 11/5642; G11C 15/00; G11C 15/04; G11C 15/046; G11C 16/06; G11C 16/22; G11C 16/26; G11C 16/28; G11C 16/3404; G11C 16/3409; G11C 2029/1204; G11C 2207/104; G11C 2211/4013; G11C 29/006; G11C 29/021; G11C 29/50012; G11C 29/50016; G11C 29/78; G11C 29/83; G11C 7/1045; G11C 7/22; G11C 8/16

See application file for complete search history.

(56) References Cited

U.S. PATENT DOCUMENTS

| | | | |
|---|---|---|---|
| 7,292,466 B2 * | 11/2007 | Nirschl | G11C 13/0069 365/158 |
| 7,474,158 B1 | 1/2009 | Yim et al. | |
| 8,351,245 B2 | 1/2013 | Ma et al. | |
| 9,196,360 B2 | 11/2015 | Chou et al. | |
| 9,437,291 B2 | 9/2016 | Bateman | |
| 9,460,784 B1 | 10/2016 | Pellizzer | |
| 9,793,260 B2 | 10/2017 | Zojer et al. | |
| 10,388,350 B2 | 8/2019 | Saida et al. | |
| 2020/0135250 A1 | 4/2020 | Nobunaga et al. | |

FOREIGN PATENT DOCUMENTS

| | | |
|---|---|---|
| JP | 2022060146 A | 4/2022 |
| JP | 2022060149 A | 4/2022 |
| JP | 2022164558 A | 10/2022 |
| KR | 20170014872 A | 2/2017 |
| KR | 20190031107 A | 3/2019 |
| KR | 20230043665 A | 3/2023 |
| TW | I799097 B | 4/2023 |

\* cited by examiner

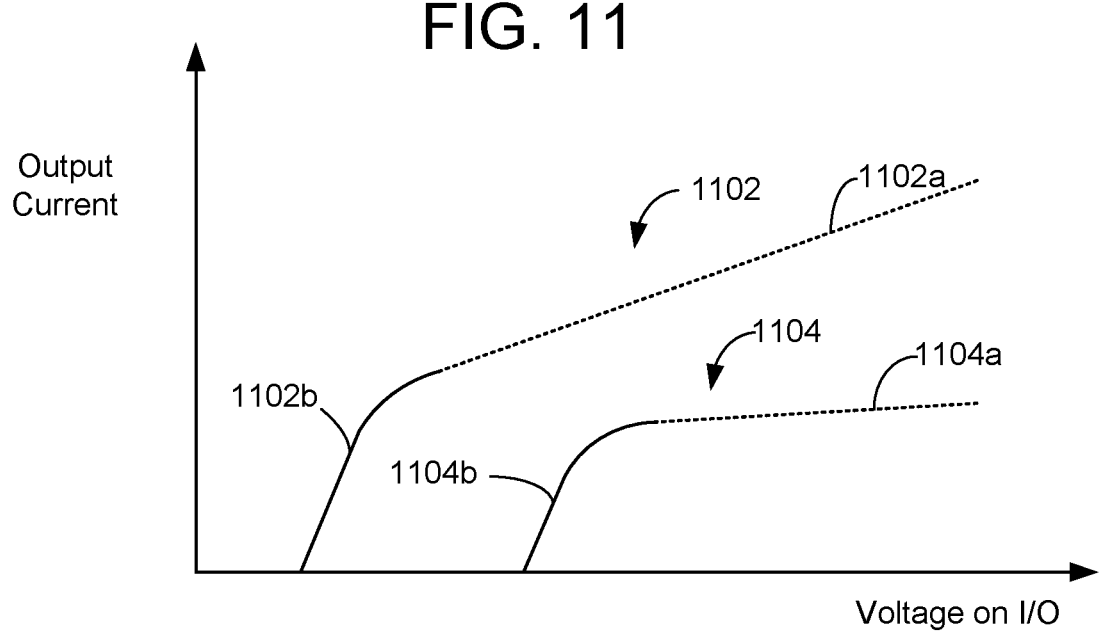

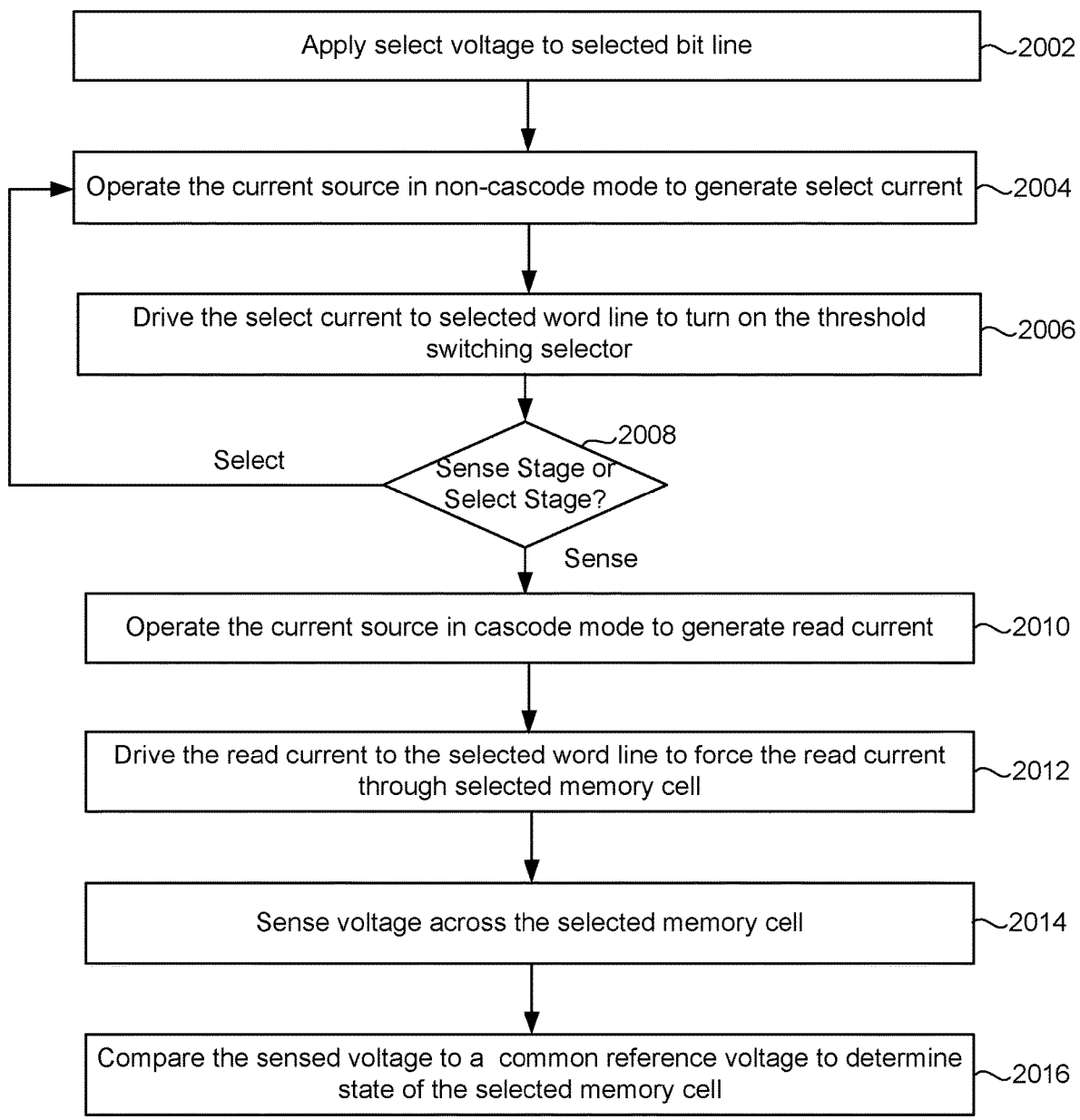

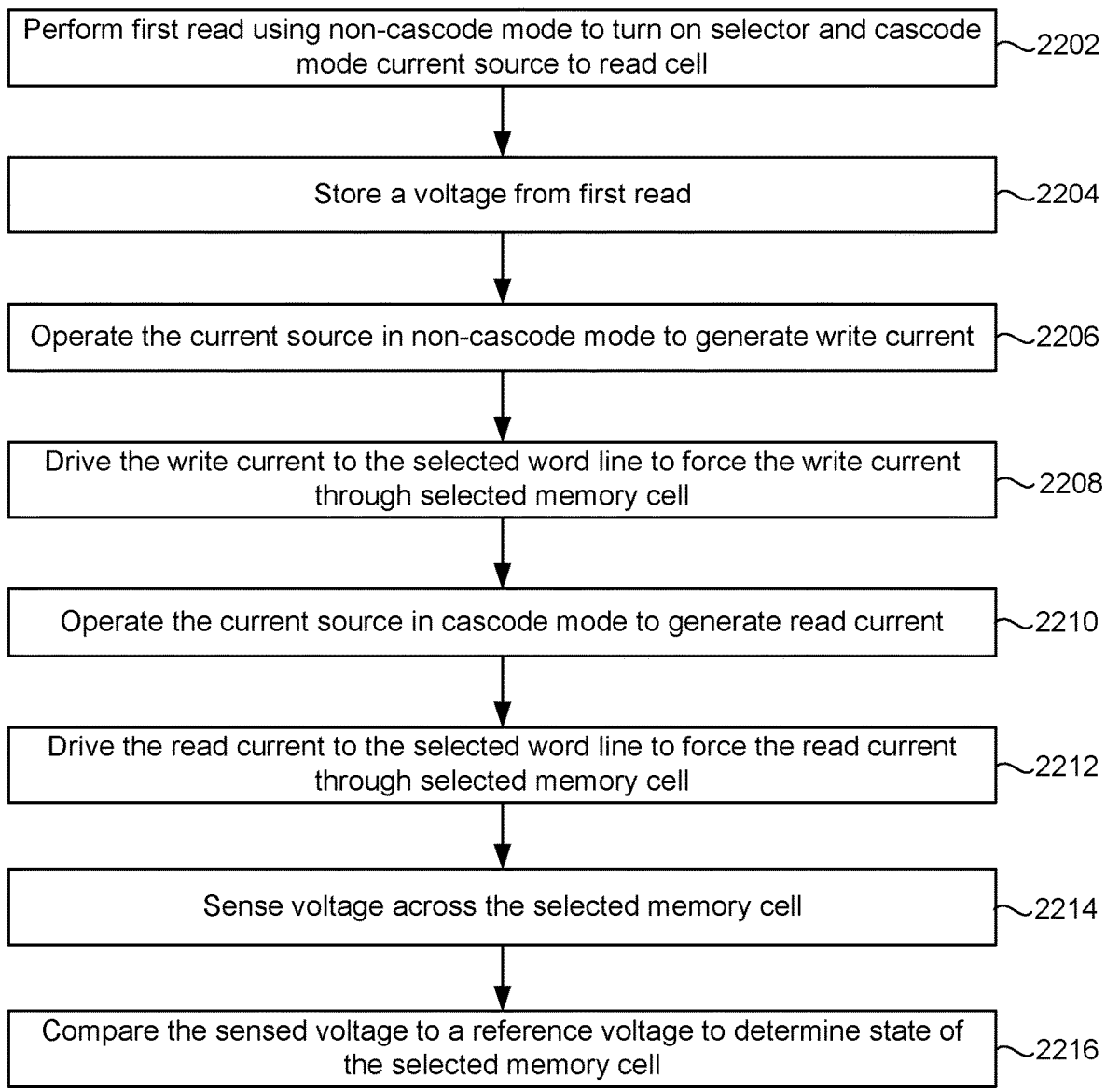

CURRENT SOURCE FOR READ OF PROGRAMMABLE RESISTANCE MEMORY CELLS

CLAIM OF PRIORITY

The present application claims priority from U.S. Provisional Patent Application No. 63/504,428, entitled "CURRENT SOURCE FOR READ OF PROGRAMMABLE RESISTANCE MEMORY CELLS," by Petti et al., filed May 25, 2023, incorporated by reference herein in its entirety.

BACKGROUND

Memory is widely used in various electronic devices such as cellular telephones, digital cameras, personal digital assistants, medical electronics, mobile computing devices, non-mobile computing devices, and data servers. Memory may comprise non-volatile memory or volatile memory. A non-volatile memory allows information to be stored and retained even when the non-volatile memory is not connected to a source of power (e.g., a battery).

The memory cells may reside in a cross-point memory array. In a memory array with a cross-point type architecture, one set of conductive lines run across the surface of a substrate and another set of conductive lines are formed over the other set of conductive lines, running over the substrate in a direction perpendicular to the other set of conductive lines. The memory cells are located at the cross-point junctions of the two sets of conductive lines.

A programmable resistance memory cell is formed from a material having a programmable resistance. In a binary approach, the programmable resistance memory cell can be programmed into one of two resistance states: high resistance state (HRS) and low resistance state (LRS). In some approaches, more than two resistance states may be used. One type of programmable resistance memory cell is a magnetoresistive random access memory (MRAM) cell. An MRAM cell uses magnetization to represent stored data, in contrast to some other memory technologies that use electronic charges to store data. A bit of data is written to an MRAM cell by changing the direction of magnetization of a magnetic element ("the free layer") within the MRAM cell, and a bit is read by measuring the resistance of the MRAM cell.

In a cross-point memory array, each memory cell may contain a threshold switching selector in series with the material having the programmable resistance. The threshold switching selector has a high resistance (in an off or non-conductive state) until it is biased to a voltage higher than its threshold voltage (Vt) or current above its threshold current, and until its voltage bias falls below Vhold ("Voffset") or current below a holding current Ihold. After the Vt is exceeded and while Vhold is exceeded across the threshold switching selector, the threshold switching selector has a low resistance (in an on or conductive state). The threshold switching selector remains on until its current is lowered below a holding current Ihold, or the voltage is lowered below a holding voltage, Vhold. When this occurs, the threshold switching selector returns to the off (higher) resistance state. To read a memory cell, the threshold switching selector is activated by being turned on before the resistance state of the memory is determined. One example of a threshold switching selector is an Ovonic Threshold Switch (OTS).

In a forced current technique for reading programmable resistance memory cells in a cross-point array a current is driven to the memory cell that is selected for read ("selected memory cell"). The current will charge up the voltage across the selected memory cell until the threshold switching selector turns on. Then, while the read current is driven through the programmable resistance memory element of the selected memory cell the voltage across the selected cell is sensed.

One technique for reading programmable resistance memory cells may be referred to as a globally referenced read. A globally referenced read is sometimes referred to as a midpoint read or midpoint referenced read. A globally referenced read may use a reference voltage that is between the lower resistance state (LRS) and the higher resistance state (HRS). Here, the LRS and FIRS refer to the voltage that appears across the cell in response to the read current. For example, the midpoint reference may be a reference voltage that is midway between two voltages that correspond to sensing a cell having either the LRS or the HRS. In a forced current approach, memory cell's state is determined based on whether the sensed voltage is higher or lower than the midpoint reference voltage.

Another technique for reading programmable resistance memory cells is commonly referred to as a destructive self-referenced read (SRR). In a SRR rather than using a midpoint reference that is independent of the state of the cell, the reference is generated based on sensing the cell itself. In a destructive SRR it is possible that the state of the memory cell is changed (e.g., destroyed) by a write operation of the SRR. One SRR technique includes a first read (Read1), a destructive write to a known state (e.g., the HRS), and a second read (Read2). The results of the two reads are compared to determine the original state of the cell. One technique for the first read is to apply a read current through the memory cell, resulting in a voltage across the cell having a magnitude that is representative of the resistance of the memory cell. The voltage is stored and may be adjusted (for example, up or down by 150 mv) for comparison with a voltage sample from the second read. The voltage adjustment can be approximately half the signal difference across the MRAM for each state. For example, if the MRAM low resistance state (LRS) is 25 Kohm, the high resistance state 50 Kohm, and the read current 15 ua, the difference from a state change is 375 mV so an adjustment of approximately 180 mV could be made from Read1 stored voltage of SRR. The determination of the original state of the memory cell depends on the difference between the first adjusted read voltage and the second read voltage. For example, if the first sampled voltage from Read1 of SRR was adjusted up and the write was to the HRS, then if the cell was originally in the FIRS then the second sampled voltage from Read2 should be about the same as Read1 and therefore lower than the first adjusted up voltage. However, if the cell was originally in the LRS then the second sampled voltage from Read2 should be higher than the adjusted up voltage from Read1 due to the higher Read2 voltage of the HRS.

For both mid-point reads and SRR, accuracy of the read depends on accuracy of the sensed voltage. As noted, the read current should have a pre-determined magnitude. However, due to limitations in the current source the magnitude of the read current could vary depending on the voltage across the memory cell. Even small variations in the read current of a few percent can significantly reduce the read margin.

BRIEF DESCRIPTION OF THE DRAWINGS

Like-numbered elements refer to common components in the different figures.

FIG. 11 is a graph depicting output current versus voltage on the output node of one embodiment of a current source.

FIG. 20 is a flowchart of one embodiment of a process of a globally referenced read operation.

FIG. 22 is a flowchart of one embodiment of a process of a self-referenced read operation.

DETAILED DESCRIPTION

Figure 1:
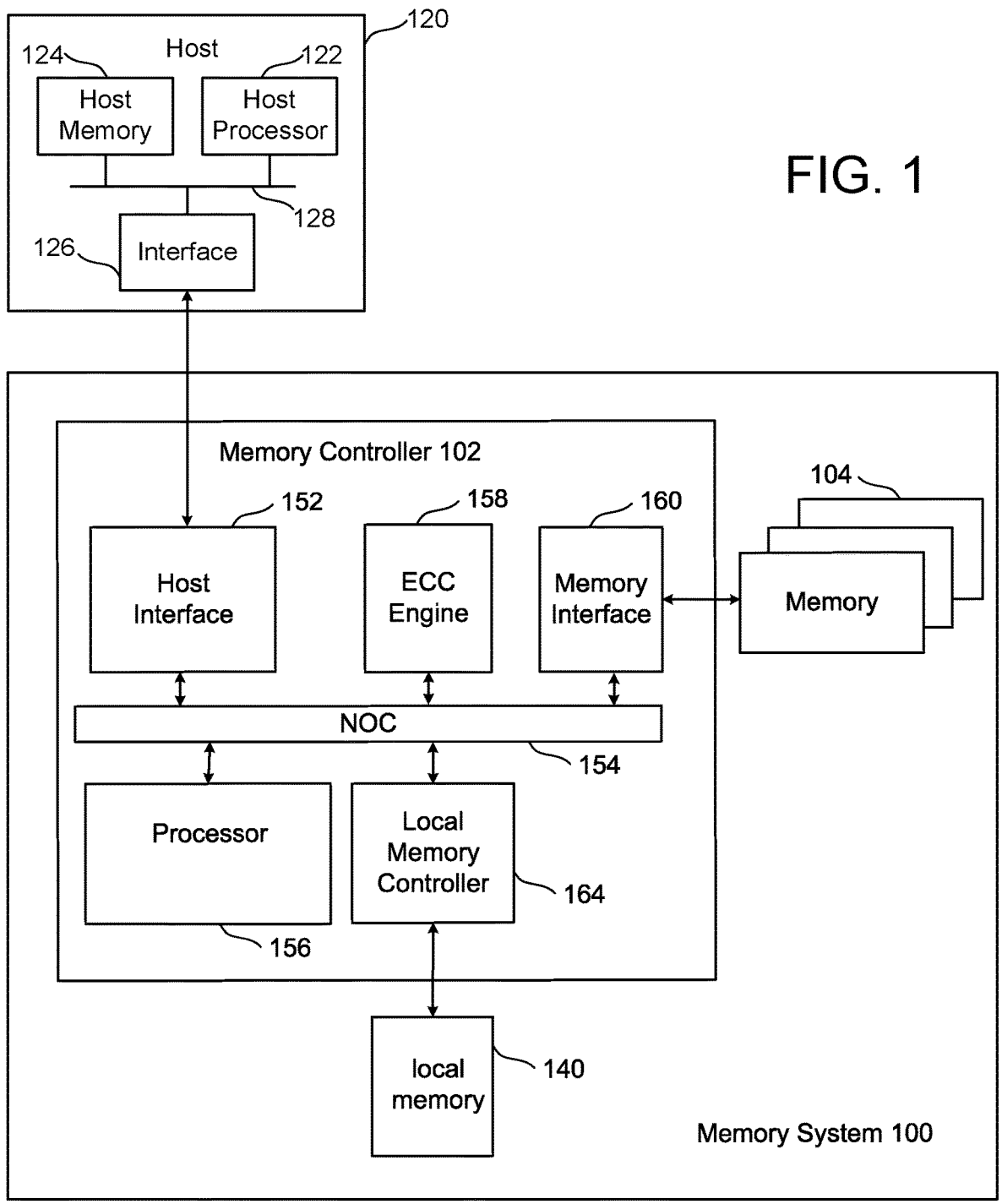
FIG. 1 is a block diagram of one embodiment of a non-volatile memory system connected to a host.

Technology is disclosed for a system having a current source and method of operating the current source when accessing a memory cell having a threshold switching selector, for example, an Ovonyx Threshold Switch (OTS). In an embodiment, the current source is operated in a first mode that is used when turning on the threshold switching selector and is operated in a second mode that is used when sensing a voltage across the memory cell. The voltage across the memory cell needed to turn on the threshold switching selector may exceed the voltage across the cell when sensing regardless of whether the cell is in the HRS or the LRS. The first mode may allow the use of the full range of the power supply voltage, which provides sufficient voltage across the memory cell to turn on the threshold switching selector. However, if the first mode were to be used when sensing the memory cell the magnitude of the read current could depend more than desired on the cell voltage thereby reducing the read margin. In the second mode the magnitude of the read current is less dependent on the voltage across the memory cell. Note that the voltage across the cell may appear at the output of the current source. Therefore, the voltage at the output of the current source may be related to the voltage across the cell. The second mode provides for more accurate sensing of the memory cell.

In an embodiment the current source is used to read programmable resistance memory cells that reside in a cross-point memory array. In a memory array with a cross-point type architecture, one set of conductive lines run across the surface of a substrate and another set of conductive lines are formed over the other set of conductive lines, running over the substrate in a direction perpendicular to the other set of conductive lines. The memory cells are located at the cross-point junctions of the two sets of conductive lines. Cross-point memory arrays are sometimes referred to as cross-bar memory arrays. In an embodiment the memory cells each have a magnetoresistive memory element in series with an OTS, which may be referred to as MRAM memory cell. However, the current source may be used with other types of memory cells. These elements of the memory cell may be changed to be other technologies such as ReRam, PCM, FeRam. Also, the threshold switching selector is not required to be an OTS, back to back diode, and others as are familiar to those reasonably skilled in the art.

In some embodiments, the programmable resistance memory cell has a magnetoresistive random access memory (MRAM) element. As used herein, direction of magnetization is the direction that the magnetic moment is oriented with respect to a reference direction set by another element of the MRAM ("the reference layer"). In some embodiments, the low resistance is referred to as a parallel or P-state or LRS, and the high resistance is referred to as an anti-parallel or AP-state or HRS. MRAM can use the spin-transfer torque effect to change the direction of the magnetization from P-state to AP-state and vice-versa, which typically requires bipolar (bi-directional write) operation for writes. However, SRR of programmable resistance memory cells as disclosed herein is not limited to memory cells having MRAM elements or OTS elements.

FIG. 1 is a block diagram of one embodiment of a non-volatile memory system (or more briefly "memory system") 100 connected to a host system 120. Memory system 100 can implement the technology presented herein for a system having a current source and method of operating the current source when accessing a memory cell having a threshold switching selector In an embodiment, the memory cells have a programmable resistance memory element (e.g., MRAM element) in series with a threshold switching selector such as an OTS. Many types of memory systems can be used with the technology proposed herein. Example memory systems include dual in-line memory modules (DIMMs), solid state drives ("SSDs"), memory cards and embedded memory devices; however, other types of memory systems can also be used.

Memory system 100 of FIG. 1 comprises a memory controller 102, memory 104 for storing data, and local memory 140 (e.g., MRAM, ReRAM, DRAM). The local memory 140 may be non-volatile and retain data after power off. The local memory 140 may be volatile and not be expected to retain data after power off. In one embodiment the local memory 140 is MRAM. In an embodiment, the local memory MRAM is not required to retain data after power-off. However, the local memory MRAM may retain data after power-off. In one embodiment, memory controller 102 and/or local memory controller 164 provides access to programmable resistance memory cells in local memory 140. For example, memory controller 102 may provide for access in a cross-point array of MRAM cells in local memory 140. In another embodiment the memory controller 102 or interface 126 or both are eliminated and the memory packages are connected directly to the host 120 through a bus such as DDRn. Or they are connected to a Host memory management unit (MMU). In another instance, the memory controller 102 or portions are moved onto the Memory 104 for direct connection of the Memory 104 to the Host, such as by providing parity bits, ECC, and wear level on the Memory along with an DDRn interface to/from the Host or MMU. The term memory system, as used throughout this document, is not limited to memory system 100. For example, the local memory 140 or the combination of local memory 140 and local memory controller 164 could be considered to be a memory system. Likewise, host memory 124 or the combination of host processor 122 and host memory 124 considered to be a memory system.

The components of memory system 100 depicted in FIG. 1 are electrical circuits. The memory controller 102 has host interface 152, processor 156, ECC engine 158, memory interface 160, and local memory controller 164. The host interface 152 is connected to and in communication with host 120. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and local memory controller 164. Local memory controller 164 is used to operate and communicate with local high speed memory 140 (e.g., MRAM). In other embodiments, local high speed memory 140 can be DRAM, SRAM or another type of volatile memory.

ECC engine 158 performs error correction services. For example, ECC engine 158 performs data encoding and decoding of parity bits provided on or off the memory as part of the code word used for error correction of the data fetched from memory 140 or 104. In one embodiment, ECC engine 158 is an electrical circuit programmed by software. For example, ECC engine 158 can be a processor that can be programmed. In other embodiments, ECC engine 158 is a custom and dedicated hardware circuit without any software. In one embodiment, the function of ECC engine 158 is implemented by processor 156. In one embodiment, local memory 140 has an ECC engine with or without a wear level engine. In one embodiment, memory 104 has an ECC engine with or without a wear level engine.

Processor 156 performs the various controller memory operations, such as programming, erasing, reading, and memory management processes including wear level. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 102 (e.g., the translation module) performs address translation between the logical addresses used by the host and the physical addresses used by the memory die. One example implementation is to maintain tables (i.e. the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in a memory 104 and a subset of the L2P tables are cached (L2P cache) in the local high speed memory 140.

Memory interface 160 communicates with non-volatile memory 104. In an embodiment, non-volatile memory 104 contains programmable resistance memory cells in a cross-point array. In one embodiment, memory interface provides a Toggle Mode interface. Other interfaces can also be used. In some example implementations, memory interface 160 (or another portion of controller 102) implements a scheduler and buffer for transmitting data to and receiving data from one or more memory die.

In one embodiment, local memory 140 has an ECC engine. Local memory 140 may perform other functions such as wear leveling. Further details of on-chip memory maintenance are described in U.S. Pat. No. 10,545,692, titled "Memory Maintenance Operations During Refresh Window", and U.S. Pat. No. 10,885,991, titled "Data Rewrite During Refresh Window", both of which are hereby incorporated by reference in their entirety. In an embodiment, the local memory 140 is synchronous. In an embodiment, the local memory 140 is asynchronous.

In one embodiment, memory 104 comprises a plurality of memory packages. Each memory package includes one or more memory dies. Therefore, memory controller 102 is connected to one or more memory dies. In one embodiment, the memory package can include types of memory, such as storage class memory (SCM) based on programmable resistance random access memory (such as ReRAM, MRAM, FeRAM or RRAM) or a phase change memory (PCM). In one embodiment, memory controller 102 provides access to memory cells in a cross-point array in a memory package 104.

Memory controller 102 communicates with host system 120 via an interface 152 that implements a protocol such as, for example, Compute Express Link (CXL). Or such controller can be eliminated and the memory packages can be placed directly on the host bus, DDRn for example. For working with memory system 100, host system 120 includes a host processor 122, host memory 124, and interface 126 connected along bus 128. Host memory 124 is the host's physical memory, and can be DRAM, SRAM, ReRAM, MRAM, non-volatile memory, or another type of storage. In an embodiment, host memory 124 contains a cross-point array of programmable resistance memory cells, with each memory cell comprising a programmable resistance memory element and a threshold switching selector in series with the programmable resistance memory element.

Host system 120 is external to and separate from memory system 100. In one embodiment, memory system 100 is embedded in host system 120. Host memory 124 may be referred to herein as a memory system. The combination of the host processor 122 and host memory 124 may be referred to herein as a memory system. In an embodiment, such host memory can be cross-point memory using MRAM.

Figure 2:
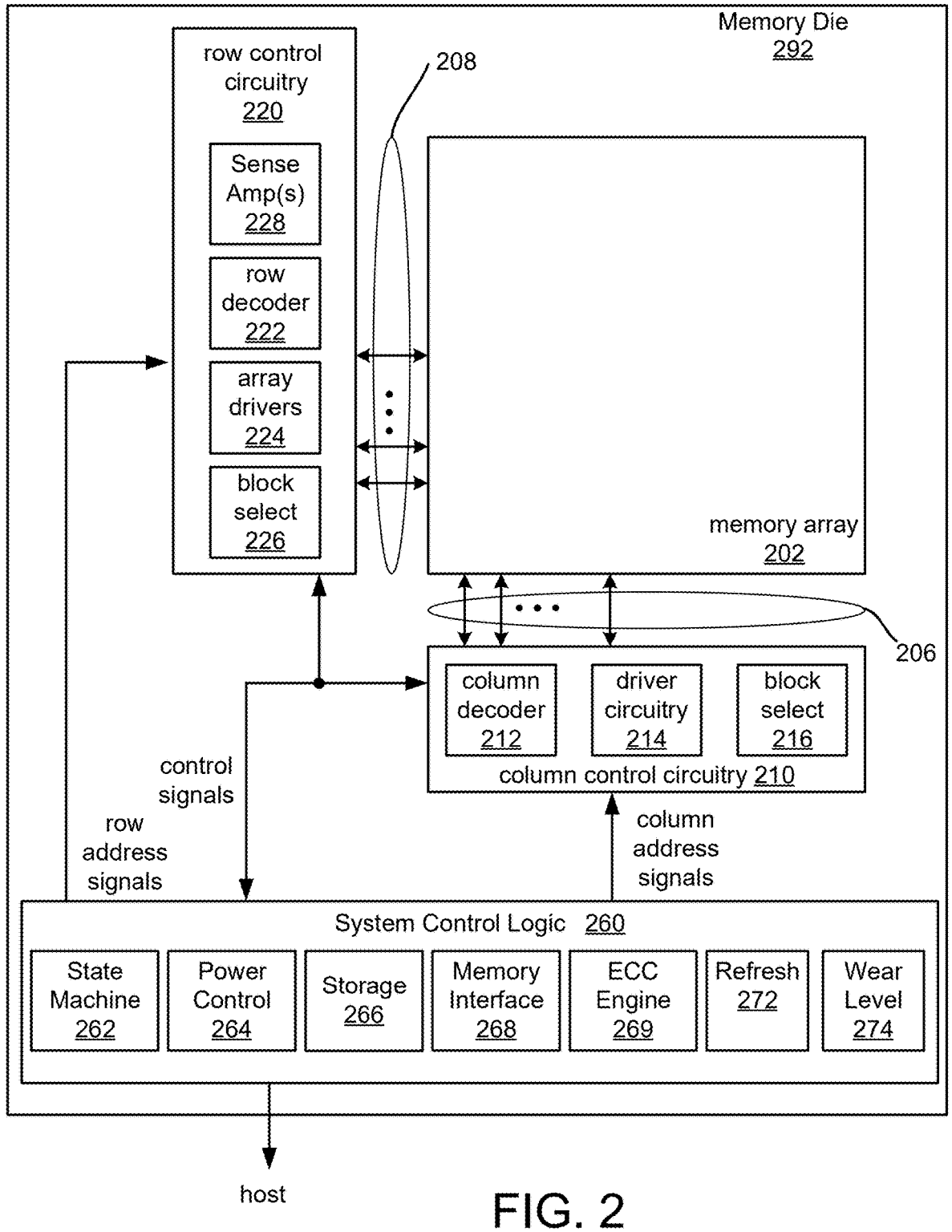
FIG. 2 is a block diagram of one embodiment of a memory die.

FIG. 2 is a block diagram that depicts one example of a memory die 292 that can implement the technology described herein. In one embodiment, memory die 292 is included in local memory 140, and in embodiment memory die 292 is included in memory 104. In one embodiment, memory die 292 is included in host memory 124. Memory die 292 includes a memory array 202 that can include any of memory cells described in the following. The array terminal lines of memory array 202 include the various layer(s) of word lines organized as rows, and the various layer(s) of bit lines organized as columns. However, other orientations can also be implemented, including for example diagonal patterns to save space. Memory die 292 includes row control circuitry 220, whose outputs 208 are connected to respective word lines of the memory array 202. Row control circuitry 220 receives a group of M row address signals and one or more various control signals from System Control Logic circuit 260, and typically may include such circuits as row decoders 222, row drivers 224, and block select circuitry 226 for both reading and writing operations. Row control circuitry 220 may also include read/write circuitry. In an embodiment, row decode and control circuitry 220 has sense amplifiers 228, which each contain circuitry for sensing a condition (e.g., voltage) of a word line of the memory array 202. In an embodiment, by sensing a word line voltage, a condition of a memory cell in a cross-point array is determined. Memory die 292 also includes column decode and control circuitry 210 whose input/outputs 206 are connected to respective bit lines of the memory array 202. Although only a single block is shown for array 202, a memory die can include multiple arrays or "tiles" that can be individually accessed. Column control circuitry 210 receives a group of N column address signals and one or more various control signals from System Control Logic 260, and typically may include such circuits as column decoders 212, column decoders and drivers 214, block select circuitry 216, as well as read/write circuitry, and I/O multiplexers.

System control logic 260 receives data and commands from a host system and provides output data and status to the host system. In other embodiments, system control logic 260 receives data and commands from a separate controller circuit and provides output data to that controller circuit, with the controller circuit communicating with the host system. Such controller system implement an interface such as DDR, DIMM, CXL, PCIe and others. In another embodiment those data and commands are sent and received directly from the memory packages to the Host without a separate controller, and any controller needed is within each die or within a die added to a multi-chip memory package. In some embodiments, the system control logic 260 can include a state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor. The system control logic 260 can also include a power control module 264 that controls the power, current source currents, and voltages supplied to the rows and columns of the memory 202 during memory operations and may include charge pumps and regulator circuit for creating regulating voltages, and on/off control of each for word line bit line selection of the memory cells. In some embodiments, the power control 264 includes one or more current sources. The current source(s) may be used to provide read and/or write currents. In an embodiment, the current source is operated in a first mode when turning on a threshold switching selector and a second mode when sensing the memory cells as described herein. System control logic 260 includes storage 266, which may be used to store parameters for operating the memory array 202. System control logic 260 also includes refresh logic 272 and wear leveling logic 274. Such system control logic may be commanded by the host 120 or memory controller 102 to refresh logic 272, which may load an on-chip stored row and column address (Pointer) which may be incremented after refresh. Such address bit(s) may be selected only (to refresh the OTS). Or such address may be read, corrected by steering through ECC engine 269, and then stored in a "spare" location, which is also being incremented (so all codewords are periodically read, corrected, and relocated in the entire chip under control of wear leveling logic 274) to in effect wear level so use of each bit across the chip is more uniform. Such operation may be more directly controlled by the host of an external controller, for example a PCIe or CXL or DDRn controller located separately from the memory chip or on the memory die.

Commands and data are transferred between memory controller 102 and the memory die 292 via memory controller interface 268 (also referred to as a "communication interface"). Such interface may be PCIe, CXL, DDRn for example. Memory controller interface 268 is an electrical interface for communicating with memory controller 102. Examples of memory controller interface 268 also include a Toggle Mode Interface. Other I/O interfaces can also be used. For example, memory controller interface 268 may implement a Toggle Mode Interface that connects to the Toggle Mode interfaces of memory interface 228/258 for memory controller 102. In one embodiment, memory controller interface 268 includes a set of input and/or output (I/O) pins that connect to the controller 102. In another embodiment, the interface is JEDEC standard DDRn or LPDDRn, such as DDR5 or LPDDR5, or a subset thereof with smaller page and/or relaxed timing.

System control logic 260 located in a controller on the memory die in the memory packages may include Error Correction Code (ECC) engine 269. ECC engine 269 may be referred to as an on-die ECC engine, as it is on the same semiconductor die as the memory cells. That is, the on-die ECC engine 269 may be used to encode data that is to be stored in the memory array 202, and to decode the decoded data and correct errors. The encoded data may be referred to herein as a codeword or as an ECC codeword. ECC engine 269 may be used to perform a decoding algorithm and to perform error correction. Hence, the ECC engine 269 may decode the ECC codeword. In an embodiment, the ECC engine 269 is able to decode the data more rapidly by direct decoding without iteration. Having the ECC engine 269 on the same die as the memory cells allows for faster decoding. The ECC engine 269 can use a wide variety of decoding algorithms including, but not limited to, Reed Solomon, a Bose-Chaudhuri-Hocquenghem (BCH), and low-density parity check (LDPC).

In some embodiments, all of the elements of memory die 292, including the system control logic 260, can be formed as part of a single die. In other embodiments, some or all of the system control logic 260 can be formed on a different die.

In one embodiment, memory structure 202 comprises a three-dimensional memory array of non-volatile or volatile memory cells in which multiple memory levels are formed above a single substrate, such as a wafer. The memory structure may comprise any type of non-volatile or volatile memory that are monolithically formed in one or more physical levels of memory cells having an active area disposed above a silicon (or other type of) substrate. In another embodiment, memory structure 202 comprises a two-dimensional memory array of non-volatile memory cells.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM or MRAM cross-point memory includes programmable resistance switching elements in series with an OTS selector arranged in cross-point arrays accessed by X lines and Y lines (e.g., word lines and bit lines). In another embodiment of cross-point is PCM in series with and OTS selector. In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive random access memory (MRAM) stores data using magnetic storage elements. The elements are formed from two ferromagnetic layers, each of which can hold a magnetization, separated by a thin insulating layer. For a field-controlled MRAM, one of the two layers is a permanent magnet set to a particular polarity; the other layer's magnetization can be changed by applying an external field to store memory. Other types of MRAM cells are possible. A memory device may be built from a grid of MRAM cells. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). The memory cells are programmed by current pulses that can change the co-ordination of the PCM material or switch it between amorphous and crystalline states. Note that the use of "pulse" in this document does not require a square pulse but includes a (continuous or non-continuous) vibration or burst of sound, current, voltage light, or other wave. And the current forced for write can, for example, be driven rapidly to a peak value and then linearly ramped lower with, for example, a 200 ns edge rate. Such peak current force may be limited by a zoned voltage compliance that varies by position of the memory cell along the word line or bit line. In an embodiment, a phase change memory cell has a phase change memory element in series with a threshold switching selector such as an OTS.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2 can be grouped into two parts, the memory structure 202 and the peripheral circuitry, including all of the other elements. An important characteristic of a memory circuit is its capacity, which can be increased by increasing the area of the memory die 292 that is given over to the memory structure 202; however, this reduces the area of the memory die available for the peripheral circuitry or increases cost which is related to chip area. This can place quite severe restrictions on these peripheral elements. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die 292 is the amount of area to devote to the memory structure 202 and the amount of area to devote to the peripheral circuitry. Such tradeoffs may result in more IR drop from use of larger x-y arrays of memory between driving circuits on the word line and bit line, which in turn may be benefit more from use of voltage limit and zoning of the voltage compliance by memory cell position along the word line and bit line.

Another area in which the memory structure 202 and the peripheral circuitry are often at odds is in the processing involved in forming these regions, since these regions often involve differing processing technologies and the trade-off in having differing technologies on a single die. For example, elements such as sense amplifier circuits, charge pumps, logic elements in a state machine, and other peripheral circuitry in system control logic 260 often employ PMOS devices. In some cases, the memory structure will be based on CMOS devices. Processing operations for manufacturing a CMOS die will differ in many aspects from the processing operations optimized for NMOS-only technologies.

Figure 3:
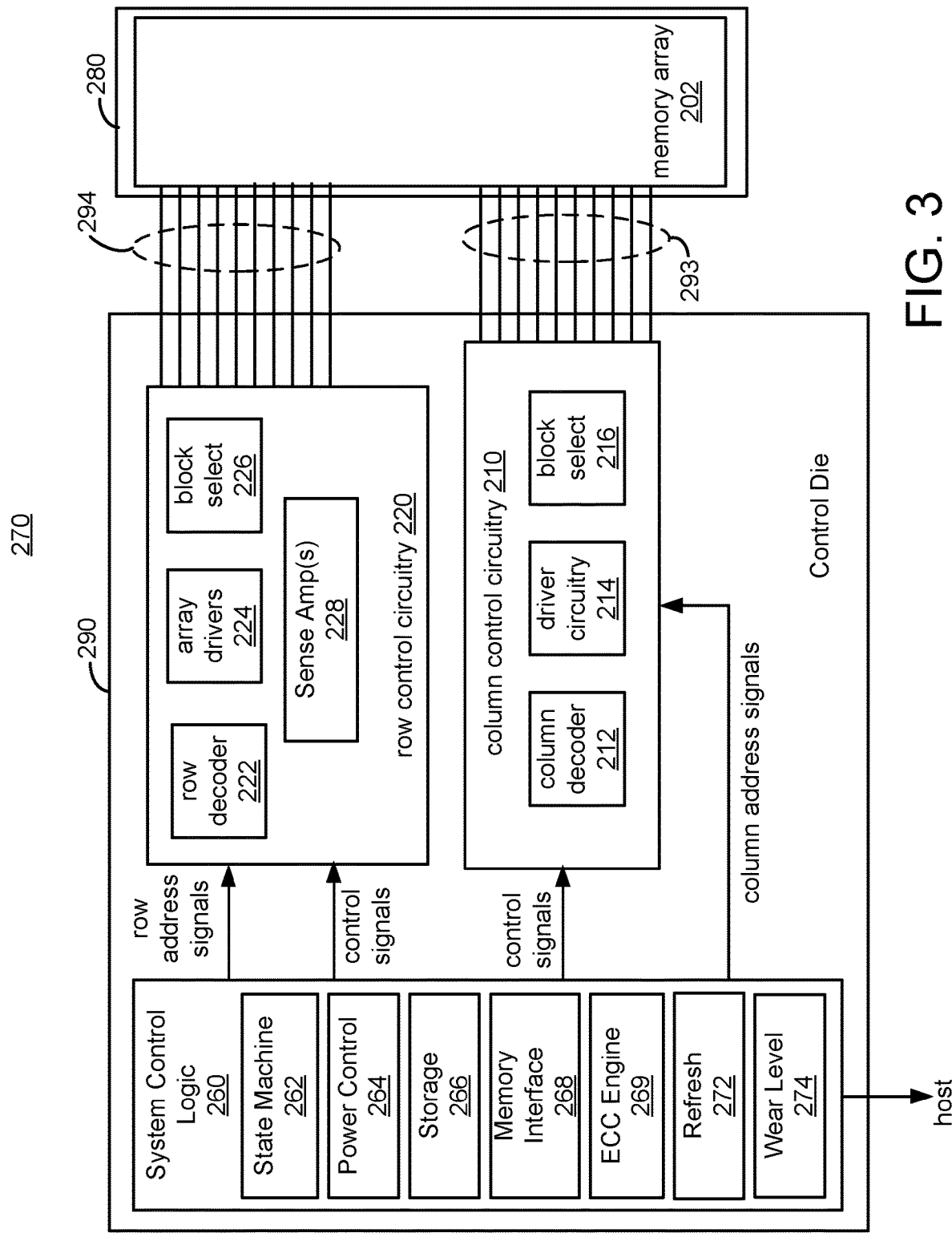
FIG. 3 is a block diagram of one embodiment of an integrated memory assembly containing a control die and a memory structure die.

To improve upon these limitations, embodiments described below can separate the elements of FIG. 2 onto separately formed die that are then bonded together. FIG. 3 depicts an integrated memory assembly 270 having a memory structure die 280 and a control die 290. The memory structure 202 is formed on the memory structure die 280 and some or all of the peripheral circuitry elements, including one or more control circuits, are formed on the control die 290. For example, a memory structure die 280 can be formed of just the memory elements, such as the array of memory cells of MRAM memory, PCM memory, ReRAM memory, or other memory type. Some or all of the peripheral circuitry, even including elements such as decoders, current sources, and sense amplifiers, can then be moved on to the control die. This allows each of the semiconductor die to be optimized individually according to its technology. This allows more space for the peripheral elements, which can now incorporate additional capabilities that could not be readily incorporated were they restricted to the margins of the same die holding the memory cell array. The two die can then be bonded together in a bonded multi-die integrated memory assembly, with the array on the one die connected to the periphery elements on the other die. Although the following will focus on an integrated memory assembly of one memory die and one control die, other embodiments can use additional die, such as two memory die and one control die, for example.

As with 202 of FIG. 2, the memory structure die 280 in FIG. 3 can include multiple independently accessible arrays or "tiles." System control logic 260, row control circuitry 220, and column control circuitry 210 are located in control die 290. In some embodiments, all or a portion of the column control circuitry 210 and all or a portion of the row control circuitry 220 are located on the memory structure die 280. In some embodiments, some of the circuitry in the system control logic 260 is located on the on the memory structure die 280.

FIG. 3 shows column control circuitry 210 on the control die 290 coupled to memory structure 202 on the memory structure die 280 through electrical paths 293. For example, electrical paths 293 may provide electrical connection between column decoder 212, column driver circuitry 214, and block select 216 and bit lines of memory structure 202. Electrical paths may extend from column control circuitry 210 in control die 290 through pads on control die 290 that are bonded to corresponding pads of the memory structure die 280, which are connected to bit lines of memory structure 202. Each bit line of memory structure 202 may have a corresponding electrical path in electrical paths 293, including a pair of bond pads, which connects to column control circuitry 210. Similarly, row control circuitry 220, including row decoder 222, row drivers 224, block select 226, and sense amplifiers 228 are coupled to memory structure 202 through electrical paths 294. Each of electrical path 294 may correspond to, for example, a word line. Additional electrical paths may also be provided between control die 290 and memory structure die 280.

For purposes of this document, the phrase "a control circuit" can include one or more of memory controller 102 (or one or more of local memory controller 164, processor 156, system control logic 260, column control circuitry 210, row control circuitry 220, host processor 122, a microcontroller, a state machine, and/or other control circuitry, or other analogous circuits that are used to control non-volatile memory. The control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit. Such control circuitry may include drivers such as direct drive via connection of a node through fully on transistors (gate to the power supply) driving to a fixed voltage such as a power supply. Such control circuitry may include a current source driver.

For purposes of this document, the term "apparatus" can include, but is not limited to, one or more of memory system 100, local memory 140, the combination of local memory controller 164 and/or memory controller 102 and local memory 140, memory package 104, memory die 292, integrated memory assembly 270, and/or control die 290.

In the following discussion, the memory array 202 of FIGS. 2 and 3 will be discussed in the context of a cross-point architecture. In a cross-point architecture, a first set of conductive lines or wires, such as word lines, run in a first direction relative to the underlying substrate and a second set of conductive lines or wires, such a bit lines, run in a second direction relative to the underlying substrate. The memory cells are sited at the intersection of the word lines and bit lines. The memory cells at these cross-points can be formed according to any of a number of technologies, including those described above. The following discussion will mainly focus on embodiments based on a cross-point architecture using MRAM memory cells, each in series with a threshold switching selector such as Ovonic Threshold Switch (OTS) to comprise a selectable memory bit. However, embodiments are not limited to providing currents to a cross-point architecture having MRAM cells each with magnetic memory element in a series OTS selector.

Figure 4A:
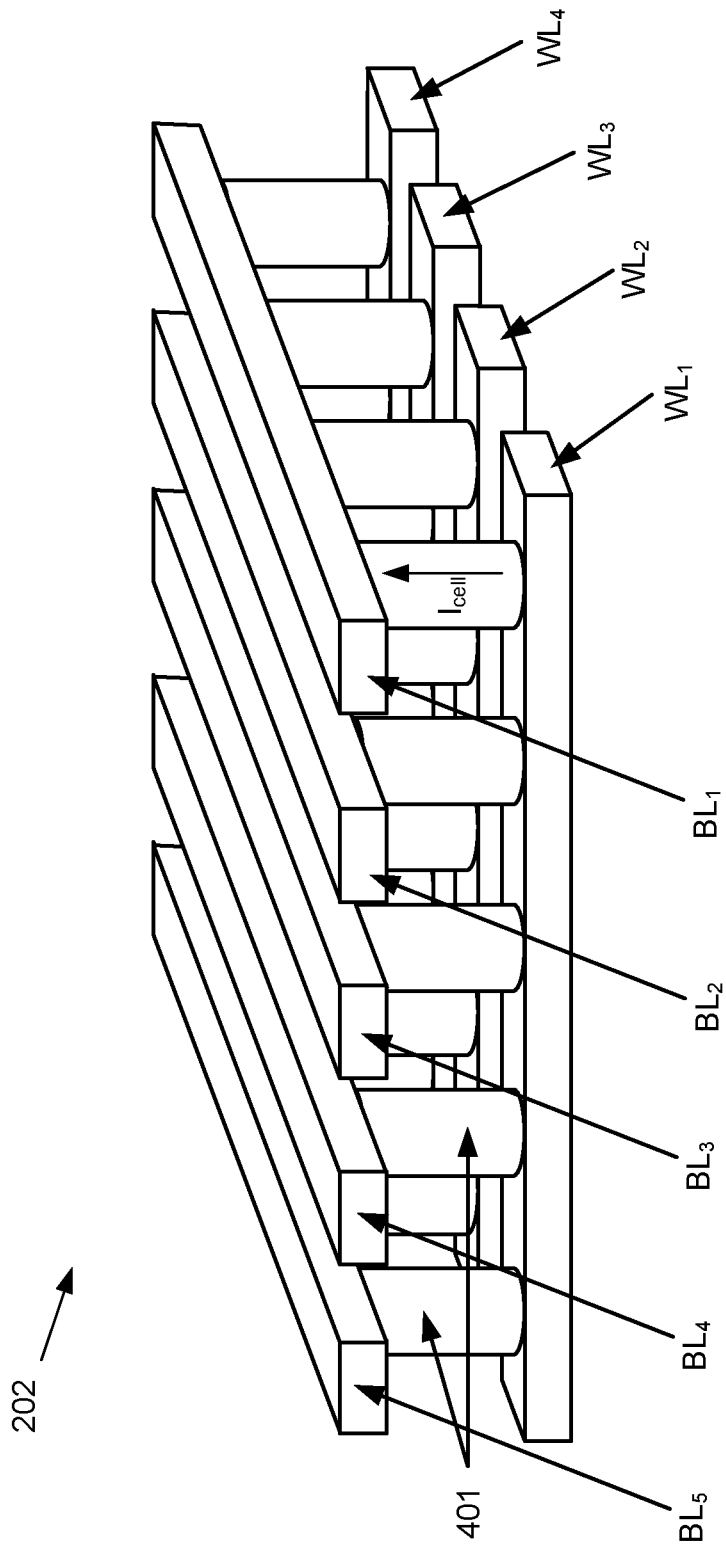
FIG. 4A depicts one embodiment of a portion of a memory array that forms a cross-point architecture in an oblique view.

FIG. 4A depicts one embodiment of a portion of a memory array that forms a cross-point architecture in an oblique view. Memory array 202 of FIG. 4A is one example of an implementation for memory array 202 in FIG. 2 or 3, where a memory die 292 or memory structure die 280 can include multiple such array structures. The memory array 202 may be included in local memory 140 or host memory 124. The bit lines $BL_1$-$BL_5$ are arranged in a first direction (represented as running into the page) relative to an underlying substrate (not shown) of the die and the word lines $WL_1$-$WL_5$ are arranged in a second direction perpendicular to the first direction. FIG. 4A is an example of a horizontal cross-point structure in which word lines $WL_1$-$WL_5$ and $BL_1$-$BL_5$ both run in a horizontal direction relative to the substrate, while the memory cells, two of which are indicated at 401, are oriented so that the current through a memory cell (such as shown at $I_{cell}$) runs in the vertical direction. In a memory array with additional layers of memory cells, such as discussed below with respect to FIG. 4D, there would be corresponding additional layers of bit lines and word lines.

As depicted in FIG. 4A, memory array 202 includes a plurality of memory cells 401. The memory cells 401 may include re-writeable memory elements, such as can be implemented using ReRAM, MRAM, PCM, or other material with a programmable resistance. The memory cells 401 may be referred to herein as programmable resistance memory cells. One type of programmable resistance memory cell is referred to as an MRAM cell, which is a memory cell that includes a MRAM memory element. The memory cells 401 may also include threshold switching selectors, such as can be implemented using an Ovonic Threshold Switch (OTS), Volatile Conductive Bridge (VCB), Metal-Insulator-Metal (MIM), or other material that provides a highly non-linear dependence of current on select voltage. The following discussion will focus on memory cells composed of an MRAM memory elements combined in series with an Ovonic Threshold switch, although much of the discussion can be applied more generally. The current in the memory cells of the first memory level is shown as flowing upward as indicated by arrow $I_{cell}$, but current can flow in either direction, as is discussed in more detail in the following.

Figure 4B:
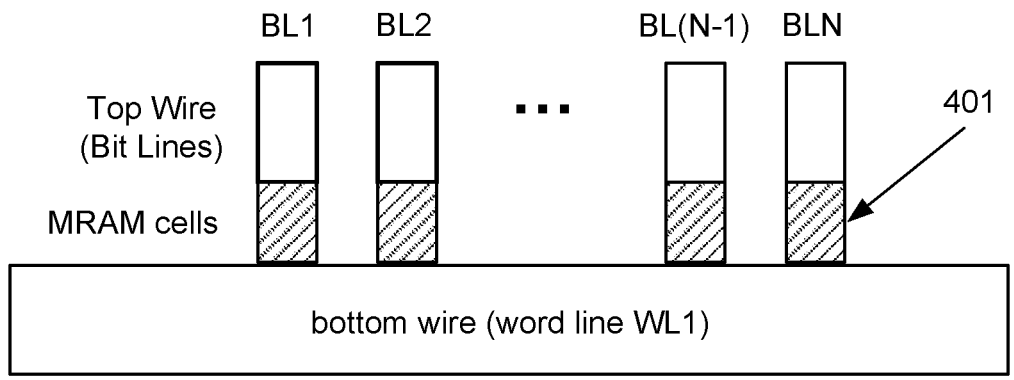
FIGS. 4B and 4C respectively present side and top views of the cross-point structure in FIG. 4A.
Figure 4C:
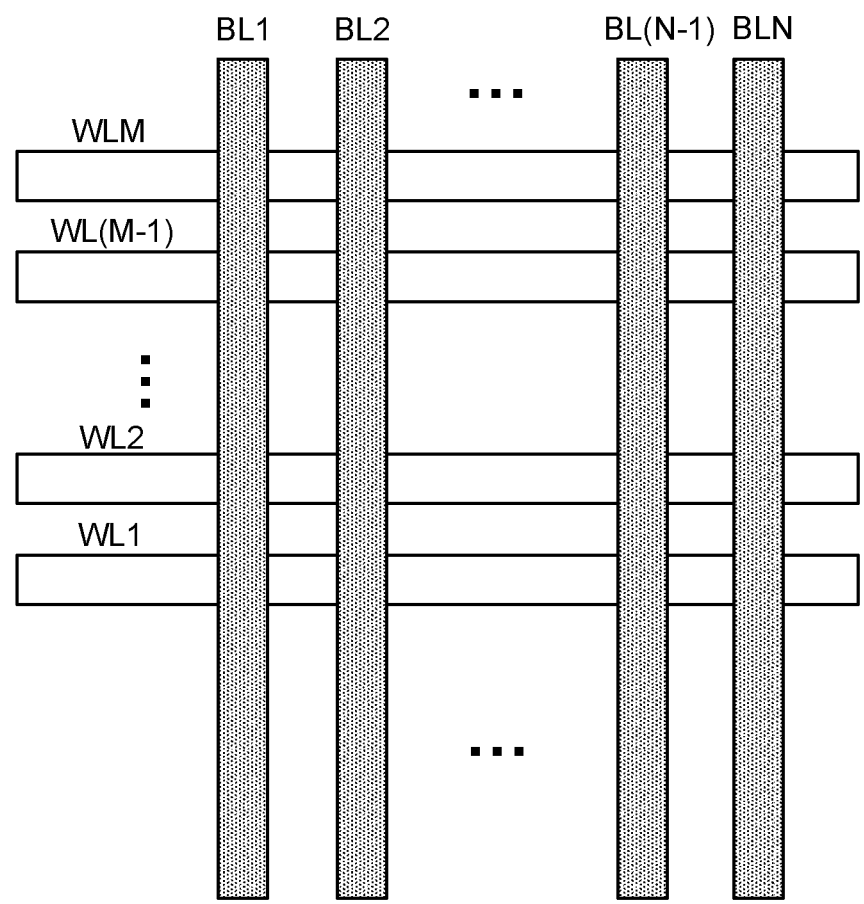

FIGS. 4B and 4C respectively present side and top views of the cross-point structure in FIG. 4A. The sideview of FIG. 4B shows one bottom wire, or word line, $WL_1$ and the top wires, or bit lines, $BL_1$-$BL_n$. At the cross-point between each top wire and bottom wire is an MRAM memory cell 401, although PCM, ReRAM, FeRAM, or other technologies can be used as the memory element. FIG. 4C is a top view illustrating the cross-point structure for M bottom wires $WL_1$-$WL_M$ and N top wires $BL_1$-$BL_N$. In a binary embodiment, the MRAM cell at each cross-point can be programmed into one of two resistance states: high and low. More detail on embodiments for an MRAM memory cell design and techniques for their reading are given below. In some embodiments, sets of these wires are arrayed continuously as a "tile," and such tiles may be paired adjacently in the Word Line (WL) direction and orthogonally in the Bit Line direction to create a module. Such a module may be composed of 2×2 tiles to form a four tile combination wherein the WL drivers between the tiles is "center driven" between the tiles with the WL running continuously over the driver at the approximate center of the line. Similarly, BL drivers may be located between the pair of tiles paired in the BL direction to be center driven, whereby the driver and its area is shared between a pair of tiles.

The cross-point array of FIG. 4A illustrates an embodiment with one layer of word lines and bits lines, with the MRAM or other memory cells sited at the intersection of the two sets of conducting lines. To increase the storage density of a memory die, multiple layers of such memory cells and conductive lines can be formed. A two-layer example is illustrated in FIG. 4D.

Figure 4D:
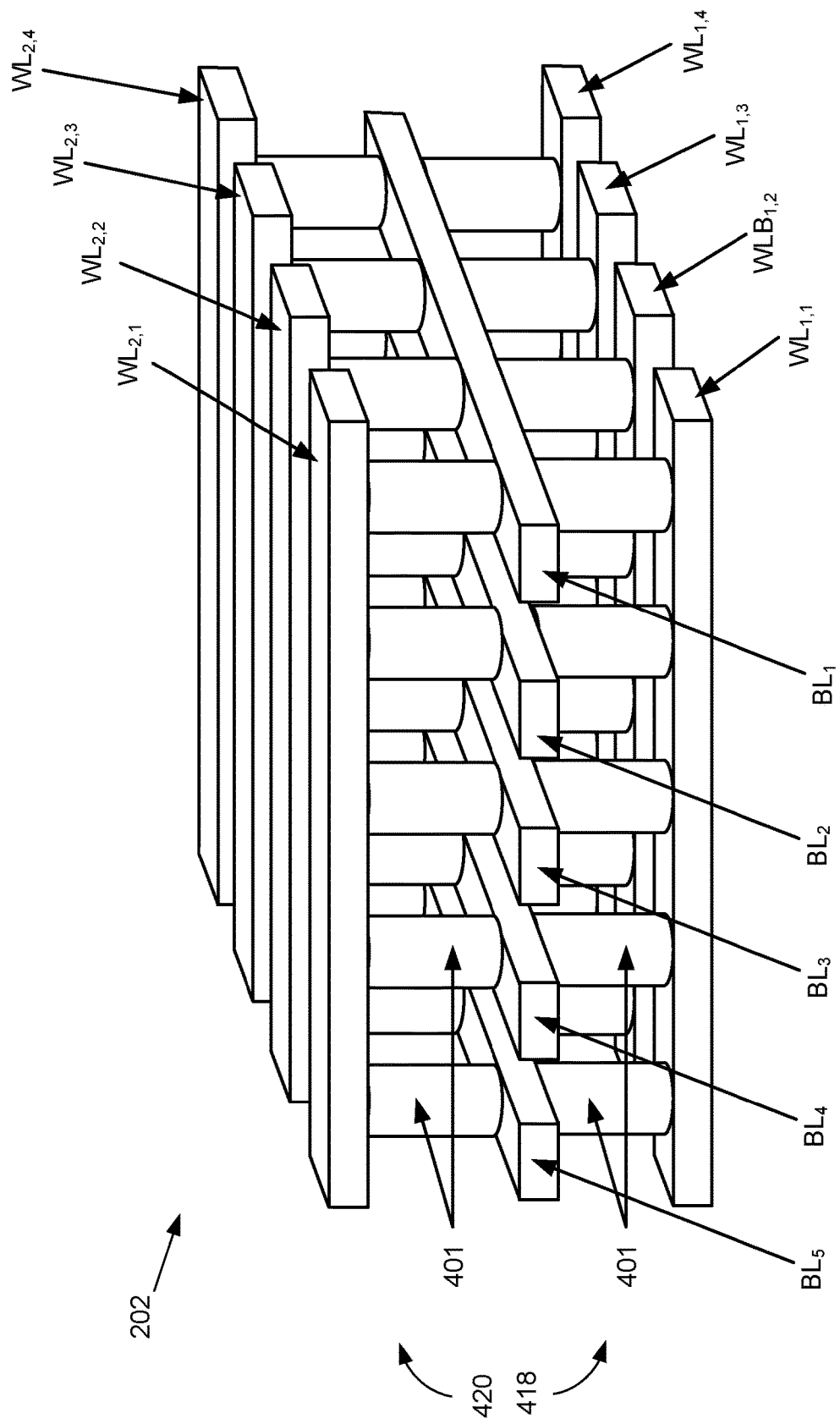
FIG. 4D depicts an embodiment of a portion of a two-level memory array that forms a cross-point architecture in an oblique view.

FIG. 4D depicts an embodiment of a portion of a two-level memory array that forms a cross-point architecture in an oblique view. As in FIG. 4A, FIG. 4D shows a first layer 418 of memory cells 401 of an array 202 connected at the cross-points of the first layer of word lines $WL_{1,1}$-$WL_{1,4}$ and bit lines $BL_1$-$BL_5$. A second layer 420 of memory cells is formed above the bit lines $BL_1$-$BL_5$ and between these bit lines and a second set of word lines $WL_{2,1}$-$WL_{2,4}$. Although FIG. 4D shows two layers, 418 and 420, of memory cells, the structure can be extended upward through additional alternating layers of word lines and bit lines. Depending on the embodiment, the word lines and bit lines of the array of FIG. 4D can be biased for read or program operations such that current in each layer flows from the word line layer to the bit line layer or the other way around. The two layers can be structured to have current flow in the same direction in each layer for a given operation or to have current flow in the opposite directions by driver selection in the positive or negative direction.

The use of a cross-point architecture allows for arrays with a small footprint and several such arrays can be formed on a single die. The memory cells formed at each cross-point can be a resistive type of memory cell, where data values are encoded as different resistance levels. Depending on the embodiment, the memory cells can be binary valued, having either a low resistance state or a high resistance state, or multi-level cells (MLCs) that can have additional resistance intermediate to the low resistance state and high resistance state. The cross-point arrays described here can be used in the memory die 292 of FIG. 2, the local memory 140 in FIG. 1, and/or the host memory 124 in FIG. 1. Resistive type memory cells can be formed according to many of the technologies mentioned above, such as ReRAM, PCM, FeRAM, or MRAM. The following discussion is presented mainly in the context of memory arrays using a cross-point architecture with binary valued MRAM memory cells, although much of the discussion is more generally applicable.

Figure 5:
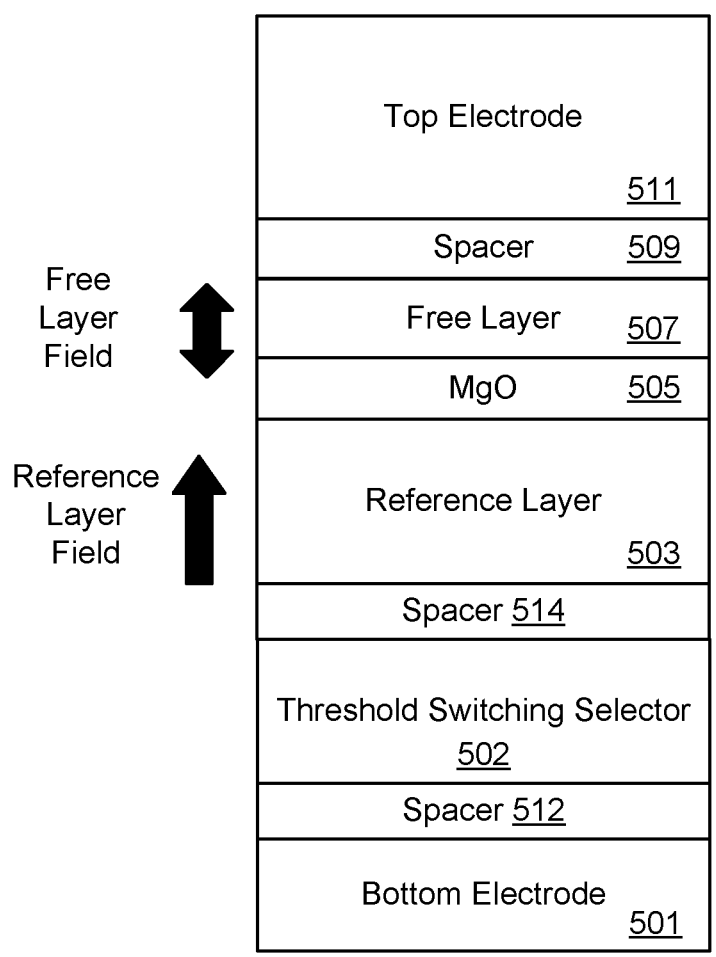
FIG. 5 illustrates an embodiment for the structure of an MRAM memory cell, here for example the selected cell is driven by a current source to read or write.

FIG. 5 illustrates the structure of an embodiment for an MRAM cell. The MRAM cell may be used as the programmable resistance memory cell 401 in, for example, FIGS. 4A-4D. The MRAM cell includes a bottom electrode 501, spacer 512, a threshold switching selector 502, spacer 514, a pair of magnetic layers (reference layer 503 and free layer 507) separated by a separation or tunneling layer of, in this example, magnesium oxide (MgO) 505, and then a top electrode 511 separated from the free layer 507 by a spacer 509. The spacer 509 can consist of an MgO capping layer in contact with the free layer 507. The spacer 509 can also contain additional metal layers. In another embodiment, the locations of the reference layer 503 and free layer 507 are switched, with the reference layer 503 on top of MgO 505, and the free layer 507 below MgO 505. In another embodiment, the location of the threshold switching selector 502 is between the free layer 507 and the top electrode 511.

In some embodiments, the bottom electrode 501 is a word line and the top electrode 511 is a bit line. In other embodiments, the bottom electrode 501 is a bit line and the top electrode 511 is a word line. The state of the memory cell is based on the relative orientation of the magnetizations of the reference layer 503 and the free layer 507: if the two layers are magnetized in the same direction, the memory cell will be in a parallel (P) low resistance state (LRS); and if they have the opposite orientation, the memory cell will be in an anti-parallel (AP) high resistance state (HRS). An MLC embodiment would include additional intermediate states. The orientation of the reference layer 503 is fixed and, in the example of FIG. 5, is oriented upward. Reference layer 503 is also known as a fixed layer or pinned layer. The reference layer 503 can be composed of multiple ferromagnetic layers coupled anti-ferromagnetically in a structure commonly referred to as synthetic anti-ferromagnet or SAF for short.

Data is written to an MRAM memory cell by programming the free layer 507 to either have the same orientation or opposite orientation of the reference layer 503. An array of MRAM memory cells may be placed in an initial, or erased, state by setting all of the MRAM memory cells to be in the low resistance state in which all of their free layers have a magnetic field orientation that is the same as their reference layers. Each of the memory cells is then selectively programmed (also referred to as "written") by placing its free layer 507 to be in the high resistance state by reversing the magnetic field to be opposite that of the reference layer 503. The reference layer 503 is formed so that it will maintain its orientation when programming the free layer 507. The reference layer 503 can have a more complicated design that includes synthetic anti-ferromagnetic layers and additional reference layers. For simplicity, the figures and discussion omit these additional layers and focus only on the fixed magnetic layer primarily responsible for tunneling magnetoresistance in the cell.

The threshold switching selector 502 has a high resistance (in an off or non-conductive state) until it is biased to a voltage higher than its threshold voltage or current above its threshold current, and until its voltage bias falls below Vhold ("Voffset") or current below Ihold. After Vt is exceeded and while Vhold is exceeded across the switching selector, the switching selector has a low resistance (in an on or conductive state). The threshold switching selector remains on until its current is lowered below a holding current Ihold, or the voltage is lowered below a holding voltage, Vhold. When this occurs, the threshold switching selector returns to the off (higher) resistance state. Accordingly, to program a memory cell at a cross-point, a voltage is applied which is sufficient to turn on the associated threshold switching selector and set or reset the memory cell; and to read a memory cell, the threshold switching selector similarly is activated by being turned on before the resistance state of the memory cell can be determined. One set of examples for a threshold switching selector is an ovonic threshold switching material of an Ovonic Threshold Switch (OTS). Example threshold switching materials include Ge—Se, Ge—Se—N, Ge—Se—As, Ge—Se—Sb—N, Ge58Se42, GeTe$_6$, Si—Te, Zn—Te, C—Te, B—Te, Ge—As—Te—Si—N, Ge—As—Se—Te—Si and Ge—Se—As—Te, with atomic percentages ranging from a few percent to more than 90 percent for each element. In an embodiment, the threshold switching selector is a two terminal device. The threshold switching selector 502 can also contain additional conducting layers on the interface with the reference layer 503. For example, spacer 514 is depicted between switching selector 502 and reference layer 503. The spacer layer 514 on the interface with reference layer 503 can be a single conducting layer or composed of multiple conducting layers. The threshold switching selector 502 can also contain additional conducting layers on the interface with the bottom electrode 501. For example, spacer 512 is depicted between switching selector 502 and reference layer 503. The spacer layer 512 on the interface with bottom electrode 501 can be a single conducting layer or composed of multiple conducting layers. Examples of conducting layers adjacent to the OTS include carbon, carbon nitride, carbon silicide, carbon tungsten, titanium, titanium nitride, tungsten, tungsten nitride, tantalum, tantalum nitride, and others. Threshold voltage switches have a Threshold Voltage (Vt) above which the resistance of the device changes substantially from insulating, or quasi insulating, to conducting.

In an embodiment, a current-force approach is used to access the MRAM cell. The current-force approach may be used to read or write the MRAM cell. In the current-force approach, an access current (e.g., $I_{read}$ or $I_{write}$) is driven through the bottom electrode 501 by a current driver. The current will be provided by a current source. In an embodiment, the current driver may be a part of the row driver circuitry (e.g., array drivers 224) for the electrode 501. However, alternatively the current driver may a part of the column driver circuitry (e.g., driver circuity 214) for the electrode 501. A voltage (e.g., $V_{select}$) is provided to the top electrode 511. Herein, the terms "read current" ($I_{read}$) and "write current" ($I_{write}$) will be used in connection with access currents that are driven through MRAM cells (or other programmable resistance cells). The write current may change the state of the MRAM cell. As an example, a write current of about 30 uA for 50 ns may be used for an MRAM cell with a Critical Dimension (CD) of approximately 20 nanometers with RA 10 $\Omega\mu m^2$ to switch the MRAM state from the P-state to the AP-state. Read currents may be about half the write current if applied for a limited time, such as <20 ns. A write current that flows in one direction through the MRAM cell will change an AP-state MRAM cell from the AP-state to the P-state. A write current that flows in the other direction through the MRAM cell will change a P-state MRAM cell from the P-state to the AP-state. In general, a read current will preferably be set low enough and the read duration short enough so as not to change the state of an MRAM cell from the P-state to the AP-state or from the AP-state to the P-state during read. Typically the write current required to switch the MRAM state from the P-state to the AP-state is larger in absolute magnitude than the write current required to switch the MRAM state from the AP-state to the P-state.

In some embodiments, a read current may be applied in an P2AP direction or, alternatively, in a AP2P direction. In some embodiments, the MRAM cell is read by performing an SRR (self-referenced-read). In one embodiment, the SRR has a first read (Read1 in the P2AP direction), a first write (Write 1 to the AP-state), and a second read (Read2 in the P2AP direction). Then the original state of the cell may be restored by a second write (Write_Back to the P-state for bits initially in the P-state).

In an embodiment, the voltage level of the memory cell due to Read1 in the P2AP direction is stored, for example on a capacitor; or by conversion to digital bits by an Analog to Digital converter and the bits stored in memory, for example in SRAM until after use in Read2. The state stored on a capacitor can be adjusted, for example, 150 mv positive or negative by forcing a voltage on one terminal of a capacitor connected to the storage capacitor. Or the digital stored level can be adjusted by digitally adding or subtracting 150 mV to the stored bits. The 150 mV can be adjusted to be dependent on the typical bit resistance. For example, if the bit low resistance state is 25K ohms and the high resistance 50K, the difference is 25K. If the read current is 15 ua, the difference voltage between the states if 25K×15ua=375 mV, making a choice of 150 mv acceptable but perhaps suggesting 187 mV may be more optimum, for example.

Although the foregoing describes reads in the P2AP direction and destructive writes to the AP-state (with write back to the P-state), in an alternative embodiment the first SRR has a first read (Read1 in the AP2P direction), a destructive write (Write 1 to the P-state) and a second read (Read2 in the AP2P direction).

In one embodiment, the MRAM cell is read by applying, for example, 0 V to the top electrode 511, while driving a current of, for example, 15 micro-Amperes (µA) through the bottom electrode 501. This read current may flow from the bottom electrode 501 to the top electrode 511. Note that the read may be Read1 or Read2 in the P2AP direction. P2AP means current flows in the direction that would write the bit from P to AP or AP to AP. In some embodiments, data is written to the MRAM cell using a bipolar write operation. In one embodiment, the MRAM cell is written from the AP-state to the P-state by applying, for example, 3V to the top electrode 511, while driving a write current of, for example, −30 µA through the bottom electrode 501. This write current will flow from the top electrode 511 to the bottom electrode 501. In one embodiment, the MRAM cell is written from the P-state to the AP-state by applying, for example, 0V to the top electrode 511, while driving a current of, for example, 30 µA through the bottom electrode 501. This write current will flow from electrode 501 to the electrode 511.

As an alternative to the approach in FIG. 5, the select voltage can be applied to the bottom electrode 501 with the access current applied through the top electrode 511. In one such embodiment, the MRAM cell is read by applying, for example, 3V to the bottom electrode 501, while driving a read current of, for example, −15 µA through the top electrode 511. This read current may flow from the bottom electrode 501 to the top electrode 511.

In one embodiment, the MRAM cell is written from the AP-state to the P-state by applying, for example, −3V to the bottom electrode 501, while driving a write current of, for example, 30 µA through the top electrode 511. The electron current will flow from the bottom electrode 501 to the top electrode 511. In one embodiment, the MRAM cell is written from the P-state to the AP-state by applying, for example, 0 V to the bottom electrode 501, while driving a current of, for example, −30 µA through the top electrode 511. The electron current will flow from the top electrode 511 to the bottom electrode 501. In this discussion it is also understood that the direction of the current polarity to switch the magnetization of the bit into the P or AP state can vary based on reference layer design and the location of the reference layer with respect to the free layer.

Some biasing techniques may result in voltage across non-selected memory cells of the array, which can induce currents in non-selected memory cells. Although this wasted power consumption can be mitigated to some degree by designing the memory cells to have relatively high resistance levels for both high and low resistance states, this will still result in increased current and power consumption as well as placing additional design constraints on the design of the memory cells and the array. One approach to address this unwanted current leakage is to place a selector element in series with each MRAM or other resistive (e.g., ReRAM, PCM) memory cell. For example, a select transistor can be placed in series with each resistive memory cell element in FIGS. 4A-4D so that the memory cells 401 is now a composite of a select transistor and a programmable resistance. Such an architecture may be referred to as 1T1R. Use of a select transistor, however, requires the introduction of additional control lines and cell area to be able to turn on the corresponding transistor of a selected memory cell. Additionally, transistors will often not scale in the same manner as the resistive memory element write current, so that as memory arrays move to smaller sizes the use of transistor based selectors can be a limiting factor in reducing cost, for example. An alternate approach to select transistors is the use of a threshold switching selector (e.g., threshold switching selector 502) in series with the programmable resistive element. A two terminal threshold switching selector does not require the aforementioned additional control lines and cell area to be able to turn on the corresponding select transistor of a selected memory cell. In some embodiments, the memory system performs a read as disclosed herein to read memory cells having a two terminal threshold switching selector in series with a programmable resistance memory element.

Figure 6A:
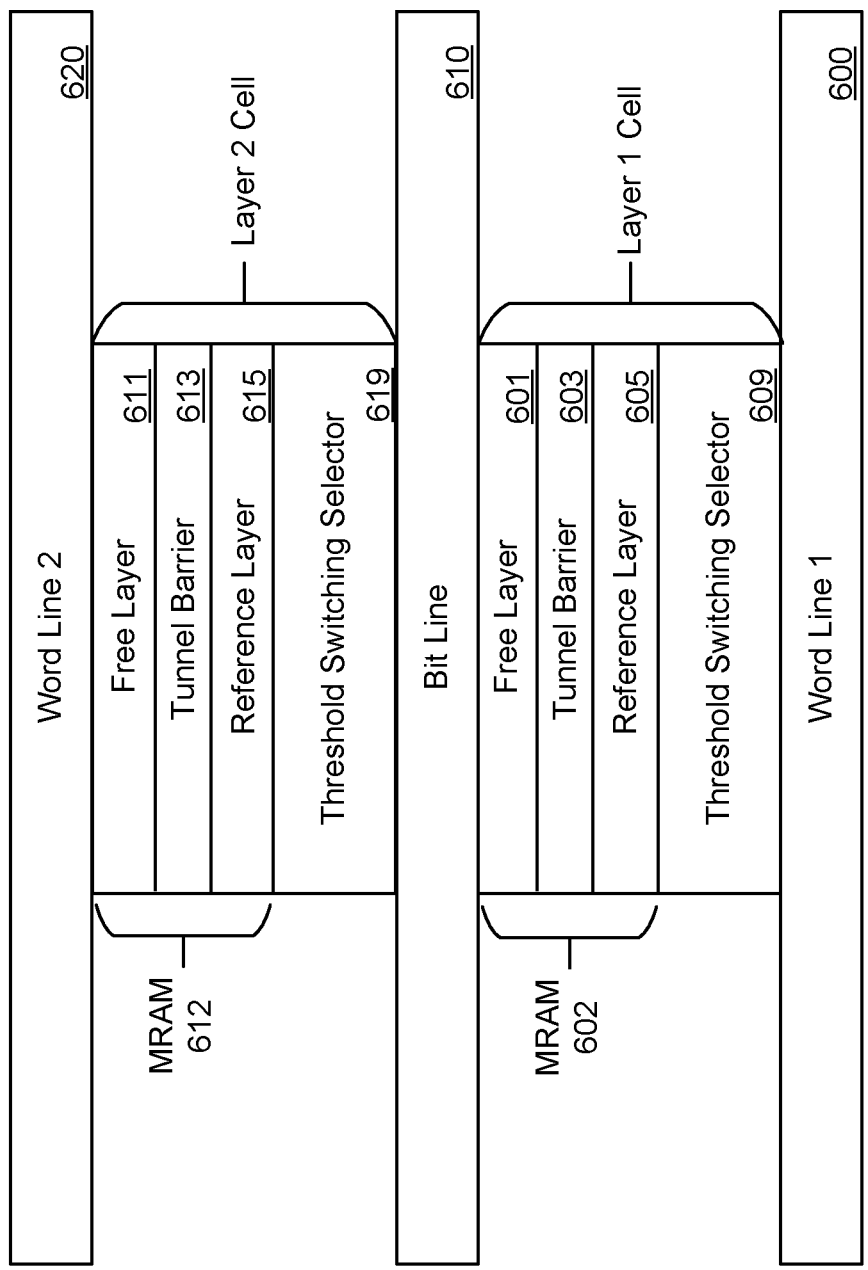
FIGS. 6A and 6B illustrate embodiments for the incorporation of threshold switching selectors into an MRAM memory array having a cross-point architecture.
Figure 6B:
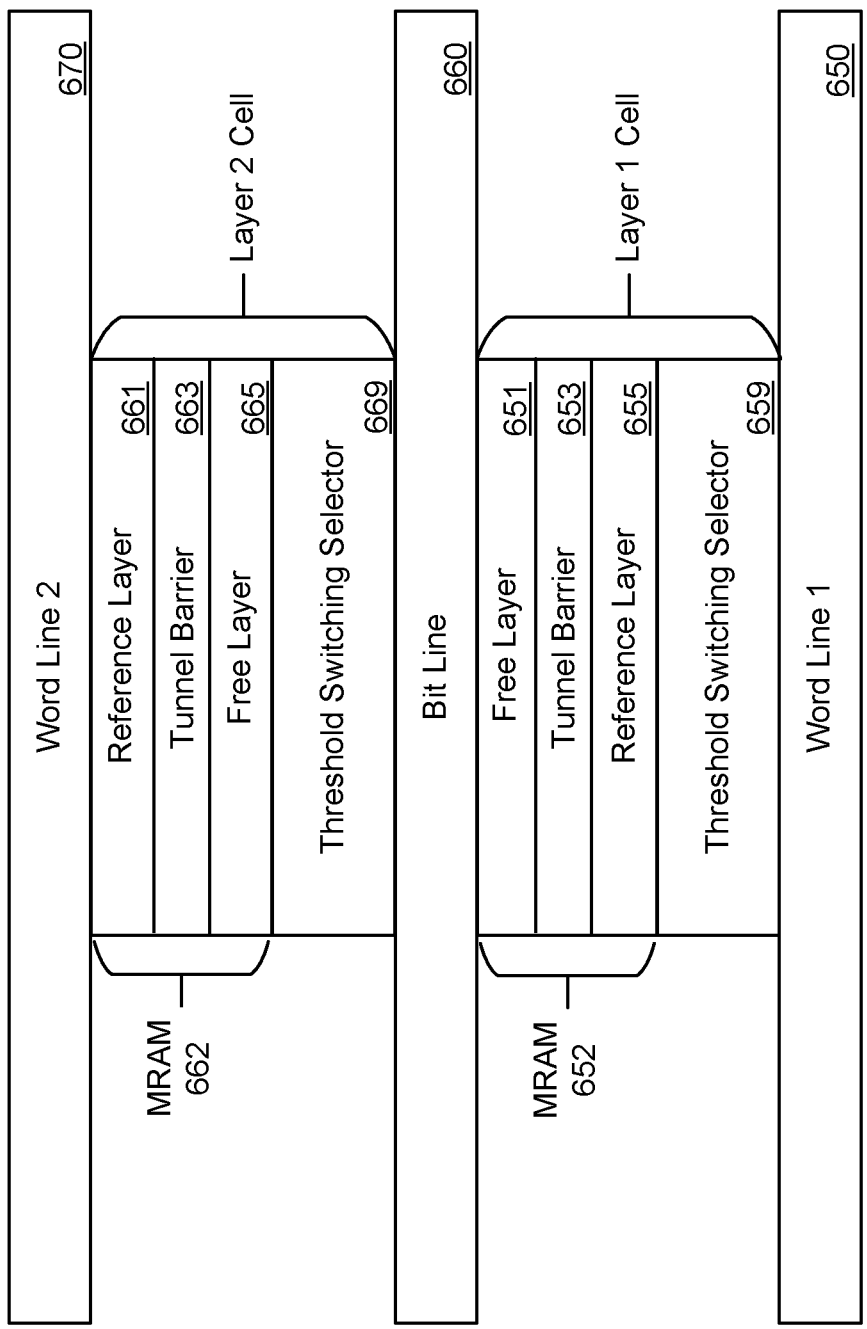

FIGS. 6A and 6B illustrate embodiments for the incorporation of threshold switching selectors into an MRAM memory array having a cross-point architecture. The examples of FIGS. 6A and 6B show two MRAM cells (Layer 1 Cell, Layer 2 Cell) in a two layer cross-point array, such as shown in FIG. 4D, but in a side view. Keeping the orientation of the MRAM layers the same in the Layer 1 Cell and the Layer 2 Cell, as depicted in FIG. 6A, allows the fabrication process to be the same for each layer. FIGS. 6A and 6B show a lower first conducting line of word line 1 600, an upper first conducting line of word line 2 620, and an intermediate second conducting line of bit line 610. In these figures, all of these lines are shown running left to right across the page for ease of presentation, but in a cross-point array they would be more accurately represented as in the oblique view of FIG. 4D where the word lines, or first conducting lines or wires, run in one direction parallel to the surface of the underlying substrate and the bit lines, or second conducting lines or wires, run in a second direction parallel to the surface to the substrate that is largely orthogonal to the first direction. The MRAM memory cells are also represented in a simplified form, showing only the reference layer, free layer, and the intermediate tunnel barrier, but in an actual implementation would typically include the additional structure described above with respect to FIG. 5.

An MRAM element 602 including free layer 601, tunnel barrier 603, and reference layer 605 is formed above the threshold switching selector 609, where this series combination of the MRAM element 602 and the threshold switching selector 609 together form the layer 1 cell between the bit line 610 and word line 1 600. The series combination of the MRAM element 602 and the threshold switching selector 609 operate largely as described above when the threshold switching selector 609 is turned on. Initially, though, the threshold switching selector 609 needs to be turned on by applying a voltage above the threshold voltage $V_{th}$ of the threshold switching selector 609, and then the biasing current or voltage needs to be maintained high enough above the holding current or holding voltage of the threshold switching selector 609 so that it stays on during the subsequent read or write operation.

On the second layer, an MRAM element 612 includes free layer 611, tunnel barrier 613, and reference layer 615 is formed above the threshold switching selector 619, with the series combination of the MRAM element 612 and the threshold switching selector 619 together forming the layer 2 cell between the bit line 610 and word line 2 620. The layer 2 cell will operate as for the layer 1 cell, although the lower conductor now corresponds to a bit line 610 and the upper conductor is now a word line, word line 2 620. Additional paired layers may similarly share another bit line between them, having a pattern of WL1, BL1, WL2; WL3, BL2, WL4; or have separate bit lines in a pattern such as WL1, BL1, WL2, BL2.

In the embodiment of FIG. 6A, the threshold switching selector 609/619 is formed below the MRAM element 602/612, but in alternate embodiments the threshold switching selector can be formed above the MRAM element for one or both layers. The MRAM memory cell is directional. In FIG. 6A, the MRAM elements 602 and 612 have the same orientation, with the free layer 601/611 above (relative to the unshown substrate) the reference layer 605/615. Forming the layers between the conductive lines with the same structure can have a number of advantages, particularly with respect to processing as each of the two layers, as well as subsequent layers in embodiments with more layers, can be formed according to the same processing sequence.

FIG. 6B illustrates an alternate embodiment that is arranged similarly to that of FIG. 6A, except that in the layer 2 cell the locations of the reference layer and free layer are reversed. More specifically, between word line 1 650 and bit line 660, as in FIG. 6A the layer cell 1 includes an MRAM element 1 having a free layer 651 formed over tunnel barrier 653, that is turn formed over the reference layer 655, with the MRAM element 652 formed over the threshold switching selector 659. The second layer of the embodiment of FIG. 6B again has an MRAM element 662 formed over a threshold switching selector 669 between the bit line 660 and word line 2 670, but, relative to FIG. 6A, with the MRAM element 662 inverted, having the reference layer 661 now formed above the tunnel barrier 663 and the free layer 665 now under the tunnel barrier 663. Alternatively, the configuration of MRAM element 662 may be used for the Layer 1 cell and the configuration of MRAM cell 652 may be used for the Layer 2 cell.

Although the embodiment of FIG. 6B requires a different processing sequence for the forming of layers, in some embodiments it can have advantages. In particular, the directionality of the MRAM structure can make the embodiment of FIG. 6B attractive since when writing or reading in the same direction (with respect to the reference and free layers) the bit line will be biased the same for both the lower layer and the upper layer, and both word lines will be biased the same. For example, if both layer 1 and layer 2 memory cells are sensed in the P2AP direction (with respect to the reference and free layers), the bit line layer 660 will be biased such as in the P2AP direction, the bit line 660 is biased low (e.g., 0V) for both the upper and lower cell, with word line 1 650 and word line 2 670 both biased to a higher voltage level. Similarly, with respect to writing, for writing to the high resistance AP state the bit line 660 is biased low (e.g., 0V) for both the upper and lower cell, with word line 1 650 and word line 2 670 both biased to a higher voltage level.

To either read data from or write data to an MRAM memory cell involves passing a current through the memory cell. In embodiments where a threshold switching selector is placed in series with the MRAM element, before the current can pass through the MRAM element the threshold switching selector may be turned on by applying a sufficient voltage across and current through the series combination of the threshold switching selector and the MRAM element.

Figure 7:
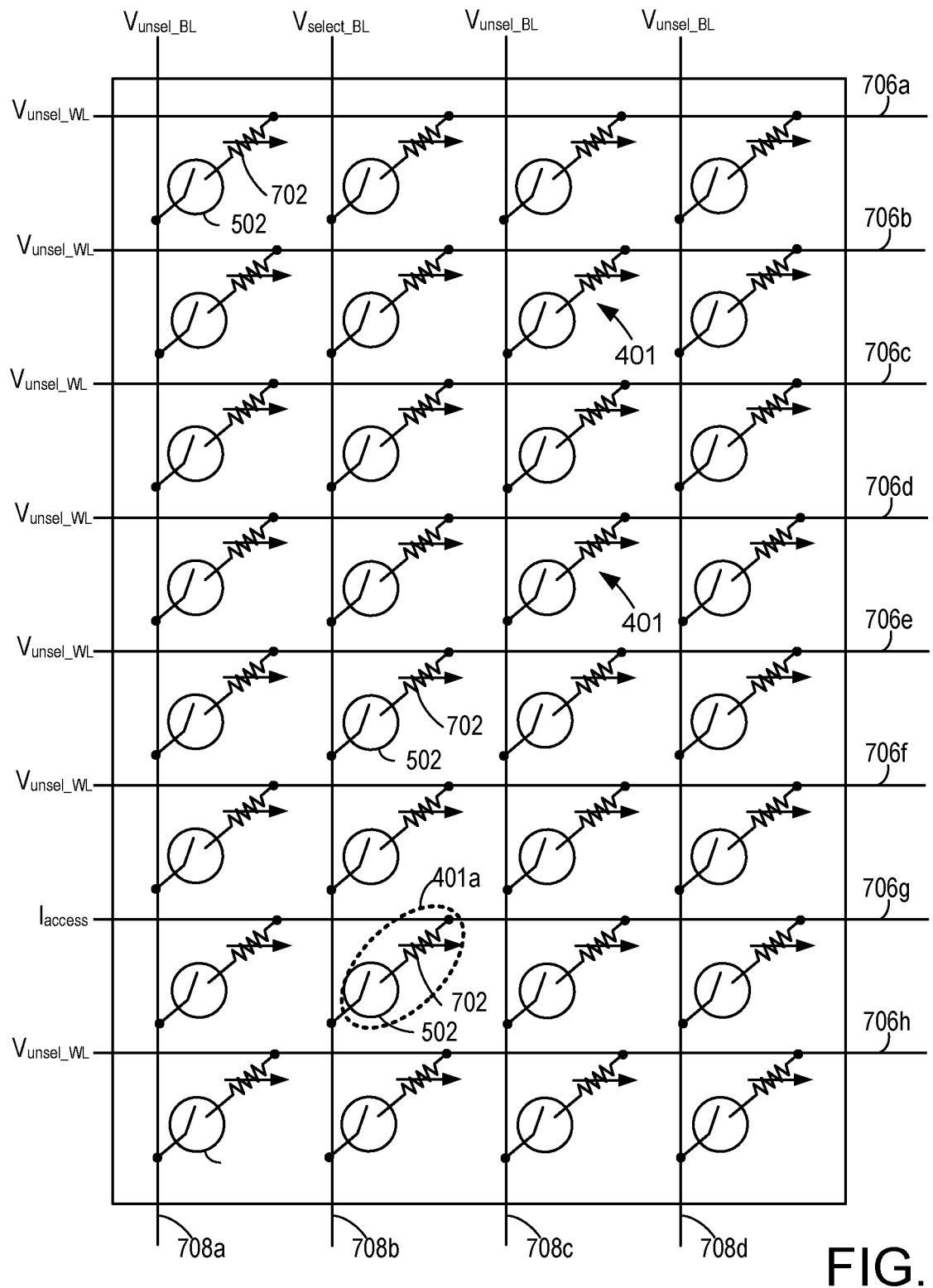
FIG. 7 depicts an embodiment of a memory array having a cross-point architecture that is accessed using a forced-current approach.

FIG. 7 depicts an embodiment of a memory array 202 having a cross-point architecture. The array 202 has a set of first conductive lines 706a-706h and a set of second conductive lines 708a-708d. In one embodiment, the set of first conductive lines 706a-706h are word lines and the set of second conductive lines 708a-708b are bit lines. For ease of discussion, the set of first conductive lines 706a-706h may be referred to as word lines and the set of second conductive lines 708a-708b may be referred to as bit lines. However, the set of first conductive lines 706a-706h could be bit lines and the set of second conductive lines 708a-708b could be word lines.

The array 202 has a number of programmable resistance memory cells 401. Each memory cell 401 is connected between one of the first conductive lines 706 and one of the second conductive lines 708. In one embodiment, each memory cell 401 has a magnetoresistive random access memory (MRAM) element in series with a threshold switching selector. The threshold switching selector 502 is configured to become conductive with lower resistance in response to application of a voltage level exceeding a threshold voltage of the threshold switching selector 502, and remains conductive with lower resistance until the current through the switching selector 502 is reduced below the selector holding current, Ihold. The threshold switching selector 502 may be a two terminal device. In an embodiment, the threshold switching selector 502 comprises an OTS.

For purpose of discussion, memory cell 401a is being selected for access. This could be a read or a write access. Selected memory cell 401a is at the cross-point of selected word line 706g and selected bit line 708b. To select a memory cell 401, a select voltage ($V_{select\_BL}$) such as near ground is provided to the selected bit line (e.g., bit line 708b) and an access current ($I_{access}$) is driven (or forced) through a selected word line (e.g., word line 706g). A selected word line means that that word line is connected to at least one selected memory cell. The selected word line will typically be connected to one or more unselected memory cells. A selected bit line means that that bit line is connected to at least one selected memory cell. The selected bit line will typically be connected to one or more unselected memory cells. A selected memory cell is connected between a selected word line and a selected bit line.

In one embodiment, $V_{select\_BL}$ has a magnitude such that the threshold switching selector 502 in a selected memory cell will turn on, assuming that $I_{access}$ is applied to the selected word line. For example, $V_{select\_BL}$ may be approximately 0V. On the other hand, $V_{unsel\_BL}$ has a magnitude such that the threshold switching selector 502 in an unselected memory cell will not turn on, for example $V_{select\_BL}$ may be approximately 1.65V if the positive power supply is 3.3V. Access current ($I_{access}$) is driven through at least a portion of selected word line 706g. This access current may also flow through the selected memory cell 401a and in a portion of selected bit line 708b after the OTS is turned on. Such a selected WL may, for example, be driven high by 15 μa to read or 30 μa to write by a current source with compliance voltage of, for example, 3.3V. To write the opposite polarity, the selected word line is forced, for example, with −30 μa and the selected bit line to 3.3V.

The other memory cells are not selected for access (i.e., are unselected memory cells). An unselected memory cell means that the memory cell is not presently selected for access (e.g., read or write). An unselected word line is connected only to unselected memory cells. An unselected bit line is connected only to unselected memory cells. Word lines and bit lines that are not selected are referred to as unselected word lines or unselected bit lines, respectively. In one embodiment, a word lines or bit lines may be unselected by forcing them to an unselect voltage, such as Vmid, for example 1.65V, at approximately one half the drive compliance voltage, for example 3.3V. An unselect voltage ($V_{unsel\_BL}$) is provided to the unselected bit lines (e.g., bit lines 708a, 708c, 708d). An unselect voltage ($V_{unsel\_WL}$) is provided to the unselected word lines (e.g., word lines 710a, 710b, 710c, 710d, 710e, 710f, and 710h).

$I_{access}$ could flow in either direction through the selected word line (as well as the selected bit line). In one embodiment, no current other than leakage is forced through unselected word lines (e.g., 706a, 706b, 706c, 706d, 706e, 706f, and 706h).

In the example of FIG. 7 there are more word lines than bit lines in the cross-point array. In one embodiment, there are more bit lines than word lines in the cross-point array. In one embodiment, the number of bit lines equals the number of word lines in the cross-point array. In the example of FIG. 7 there are twice as many word lines as bit lines in the cross-point array; however, a different ratio could be used. Thereby, different tile sizes may be realized. For example, a tile may have 1024 BL by 2048 WL, which may be composed into a module of 2048×4096 cells by center driving the WL and BL between the four tiles. In one embodiment, read is performed on a group of memory cell by, for example, selecting one memory cell in each of a number of tiles. In some embodiments, more than one memory cell from a tile may be selected for read.

In some embodiments, a current-force approach is used to access memory cells in a cross-point memory array. Threshold switching selectors may be used in series with the memory cells. The threshold switching selector may be connected in series with the memory element between the word line and the bit line. Hence, any voltage across the switching selector will reduce the voltage across the memory element. Typically, there will be some variation in the offset or hold voltage between the switching selectors. A current-force approach may help to mitigate offset voltage variation between threshold switching selectors to help minimize the selected cell current variation cell to cell.

Figure 8:
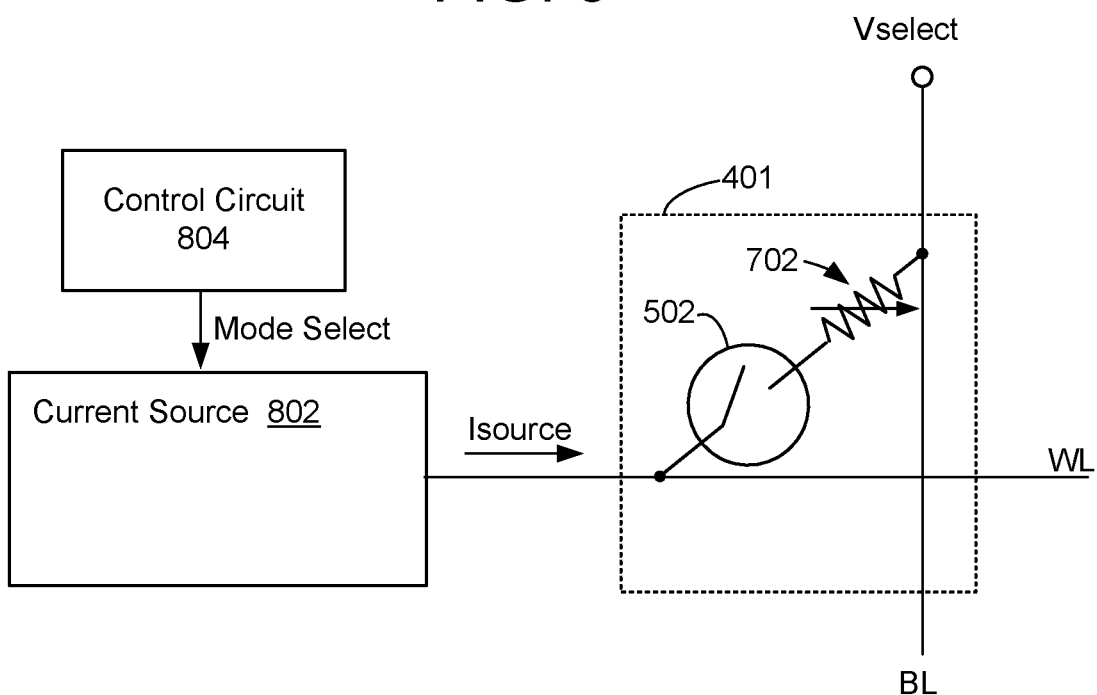
FIG. 8 is a diagram of one embodiment of a current source providing a current to a memory cell.

FIG. 8 is a diagram of one embodiment of a system having a current source providing a current to a memory cell. The memory cell 401 has a programmable resistance memory element 702 in series with a threshold switching selector 502. In one embodiment, the memory cell 401 is an MRAM cell in which the programmable resistance memory element 702 is a magnetoresistance memory element and the threshold switching selector 502 is an OTS. However, the memory cell could be a PCM cell, a ReRam cell, etc. The threshold switching selector 502 is not required to be an OTS. The voltage Vselect on the bit line (BL) is a voltage having a suitable magnitude to select the memory cell, for example Vp of 3.6V. In one embodiment, Vselect is 0V. However, Vselect could be a higher voltage.

The current source 802 provides a current (Isource) to the word line. During a read the current may charge up the word line until the threshold switching selector 502 switches on. After the threshold switching selector 502 switches on, Isource is driven through the memory cell. In an embodiment, the current source 802 includes a cascode amplifier. In an embodiment, the current source 802 has two modes of operation. A control circuit 804 may be used to select between the two modes of operation. In an embodiment, one mode is referred to as a cascode mode and the other as a non-cascode mode. In an embodiment, the non-cascode mode (e.g., cascade mode) is used during the initial part of a read in which the threshold switching selector 502 is switched on. After the threshold switching selector 502 is switched on, the cascode mode may be used to drive the current through the memory cell 401 for its reduced variation the voltage on Iout varies (with changes in the MRAM resistance with state changes from LRS to HRS. The memory cell 401 may be sensed while the current source 802 is operated in the cascode mode, which improves accuracy of the sensing. Moreover, operating the current source in the non-cascode mode enables a large voltage across the memory cell 401, which facilitates switching on the threshold switching selector 502. In an embodiment, the current source is operated in the non-cascode while writing the memory cell 401. In an embodiment, the current source 802 has a first output conductance when operated in the first mode and a second output conductance when operated in the second mode. In an embodiment, the second output (cascode) conductance is higher than the first output conductance. Having a higher output conductance when sensing the cell can improve accuracy of sensing the memory cell but increases the voltage across the current sourcing element (headroom). In an embodiment, in the first mode the output current varies with voltage at the output at a first rate. However, in the second mode the output current varies with voltage at the output at a second rate that is lower than the first rate. Note that the voltage at the output of the current source may depend on the voltage across the memory cell. In an embodiment, because Isource has less dependance on the voltage at the current source output in the second mode (relative to the first mode), accuracy of sensing the cell is improved. However, the first mode may allow for a larger voltage across the cell 401, which is beneficial for turning on the threshold switching selector 502, should the OTS Vth drift higher, as well as for write where less drop in the current force element can allow a larger range of voltage across the memory cell and sense node voltage (on I_out).

Figure 9:
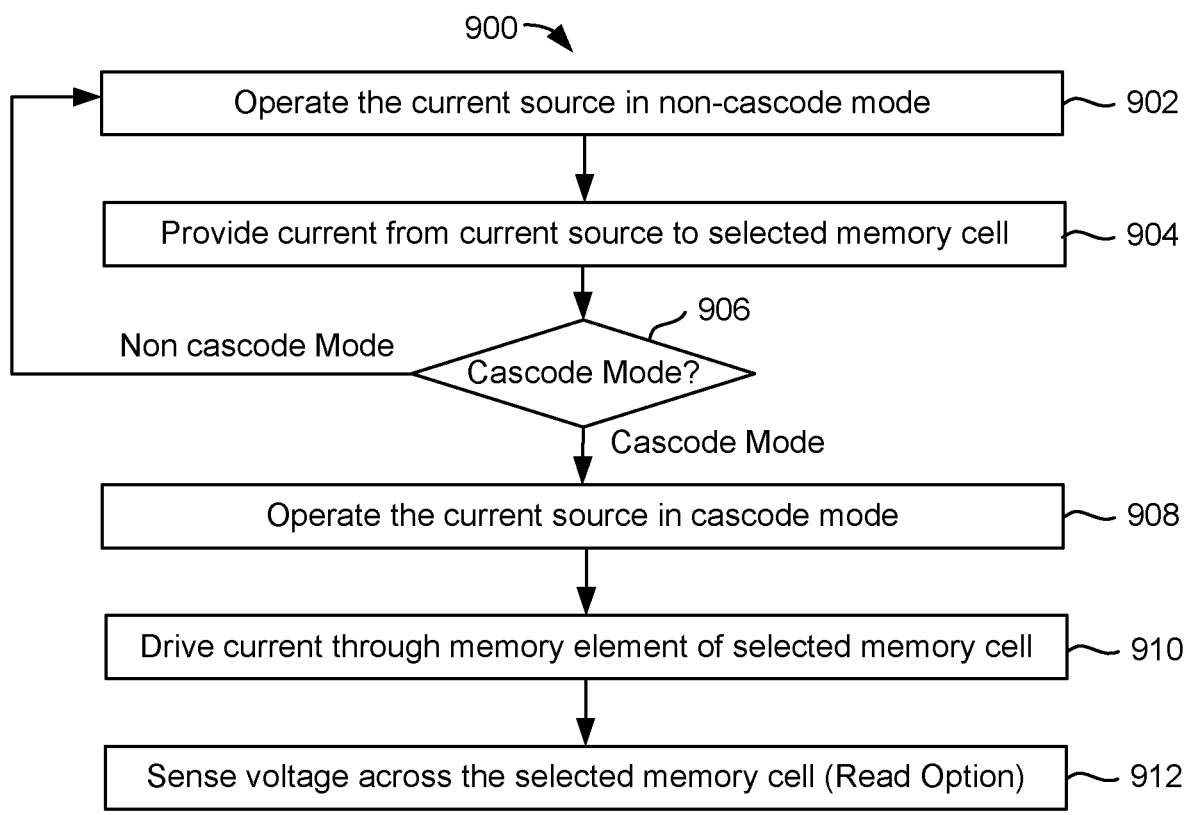
FIG. 9 is a flowchart of one embodiment of a process of operating a current source when accessing programmable resistance memory cells in a cross-point array.

FIG. 9 is a flowchart of one embodiment of a process 900 of operating a current source when reading programmable resistance memory cells in a cross-point array. Step 902 includes operating the current source 802 in a non-cascode mode. Step 904 includes providing the output current (Icurrent) to the selected memory cell. In an embodiment, the current such as 15 ua if mram CD is 20 nm is provided to the selected word line while a select voltage is applied to the selected bit line, such as 0V.

Step 906 includes a determination of whether the stay in the non-cascode mode or to change to the cascode mode. In one embodiment, the change is made after the threshold switching selector 502 switches on. This determination may be based on waiting a pre-determined time after first providing the current to allow sufficient time for the threshold switching selector to switch on. In response to determining that the cascode mode should be entered, the current source 802 is operated in the cascode mode in step 908. Step 910 includes driving the output current (Icurrent) through the selected memory cell while the threshold switching selector remains on. In one embodiment, this current has a magnitude suitable to read the cell. In one embodiment, this current has a magnitude suitable to write the cell. Step 912 could include sensing a voltage across the selected memory cell while the current is driven through the selected memory cell if this is a read operation. Note that write operations are also possible in which case the current in step 910 may be stepped up relative to the current in step 904.

Figure 10A:
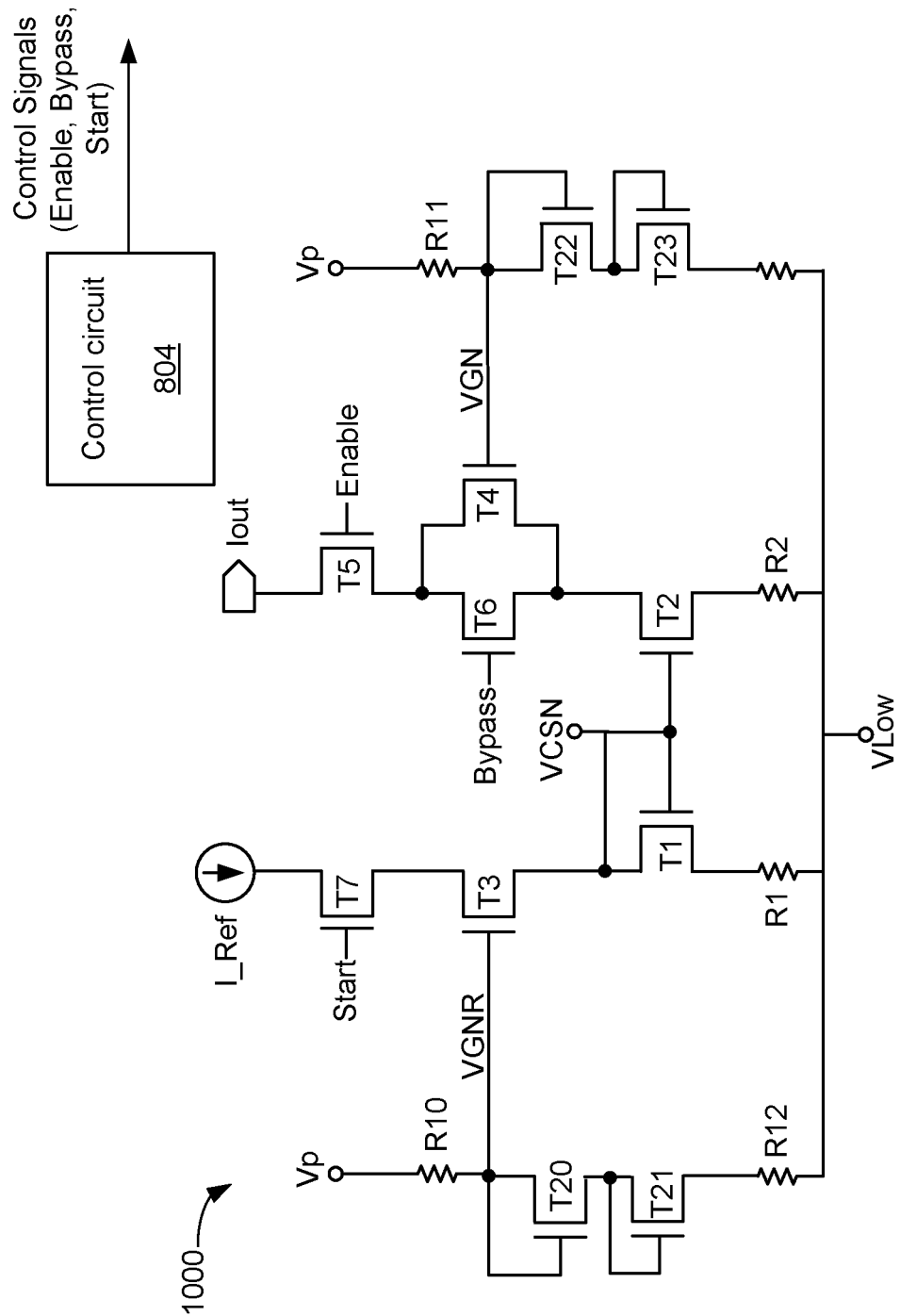
FIG. 10A is schematic diagram of one embodiment of system that operates a current source in two modes when reading a programmable resistance memory cell having a threshold switching selector.

FIG. 10A is schematic diagram of one embodiment of system that operates a current source 1000 in two modes when reading a programmable resistance memory cell having a threshold switching selector. Transistors T3 and T4 form a cascode circuit. The reference current I_Ref is input to T3 and T1, and is mirrored by T2 and T4. Transistor T3 may be referred to as an input transistor and T4 may be referred to as an output transistor. Transistor T4 provides the output current Isource to the memory array used to Read and Write. Or two circuits 1000 may be used: one to read and a second to write, as a possible improvement to latency allowed for the desired current in changing from Read to Write, read-modify-write. Transistor T1 is in series with T3. Transistor T2 is in series with T4. In an embodiment, the circuit 1000 includes a cascode amplifier that may include T2, T4 and R2, sometimes referred to as a cascode current source. A cascode amplifier may have two stages which are referred to as an input stage and an output stage. In an embodiment, the input stage includes transistor T2, which may be referred to herein as a current mirror transistor with gate to VCSN. In an embodiment, the input stage is an amplifier stage. In an embodiment, the gate of T4 VGN may be referred to as an input of the cascode amplifier output stage. The gate of T2 may be biased by bias voltage VCSN, as generated by T1 with reference current I_ref flowing through it after passing through cascode transistor T3. In an embodiment, the output stage includes transistor T4, which may be referred to herein as an output transistor, or cascode output transistor. In an embodiment, the drain of T4 may be referred to as the output of the cascode amplifier. Current source 1000 is implemented within one embodiment of current source 802 in FIG. 8. The system includes a control circuit 804 that issues control signals to control the current source 1000 through driver signal VGN and VGNR. In an embodiment, control circuit 804 is implemented within state machine 262 from FIG. 2 or 3, but is not limited thereto. One of the control signals is used to control the magnitude of bias voltage VGN to select between the two modes. In one embodiment, a relatively high bias voltage on VGN of about Vp~3.6V will operate the current source 1000 in the non-cascode mode and a lower bias voltage of ~1.5V will operate the current source 1000 in the cascode mode. In one embodiment, applying 0V as VCSN or VGN will disable the current source 1000 so the output current is near 0 and approximately equal to transistor leakage. If the current source 1000 is disabled then a different current source may be used to provide the current to the selected memory cell. Resistors R1 and R2 may be sized the same. Resistors R1 and R2 may be 0 Ohms (i.e., removed) or higher. A higher resistance for R1 and R2 may allow for greater mismatch between T1 and T2 while still keeping the output current from varying more than a target percentage. The voltage V_low may be ground, but is not required to be ground. And for a Read current of 15 ua, the R1 and R2 may be 33K ohms, which can be realized by a transistor with gate at Vp and source drain replacing the resistor terminals shown. The transistor L and W may be adjusted for the desired current or voltage drop. The current in the right leg R2, T2, and T4 may be adjusted relative to I_REF by increasing or decreasing the size of R2, T2 and T4 in a proportion of R1, T1, T3. Each of R2, T2, and T4 increased by the same multiple. The bias voltage VGN may be generated by a control circuit, such as by the circuit R11, T22, T23. Similarly the equivalent voltage for T3 may be generated by R10, T20, T21 where R11 may be the same size as R10, T22 the same size as T20, and T23 the same size as T21. Or the relative sizes may be adjusted to adjust VGNR voltage relative to voltage VGN, such as to increase or decrease voltage required for Cascode total voltage across the circuit. In one embodiment, R10 and R11 are each about 1 Mohm; R12 and R13 are each about 100 Kohm.

FIG. 10A also depicts a control circuit that generates control signals Bypass, Enable, and Start. Circuit 1000 has a start transistor T7 at the input. Start transistor T7 may be controlled to either allow I_ref to pass to T3 or prevent I_ref from passing to T3 and thereby reduces power when current source 802 in FIG. 8 is unused. The Enable signal is provided to enable transistor T5 to enable the circuit. The Bypass signal is provided to bypass transistor T6 to bypass T4. Transistors T5 and T6 are optional. Operation of T5 and T6 will be explained below.

Figure 10B:
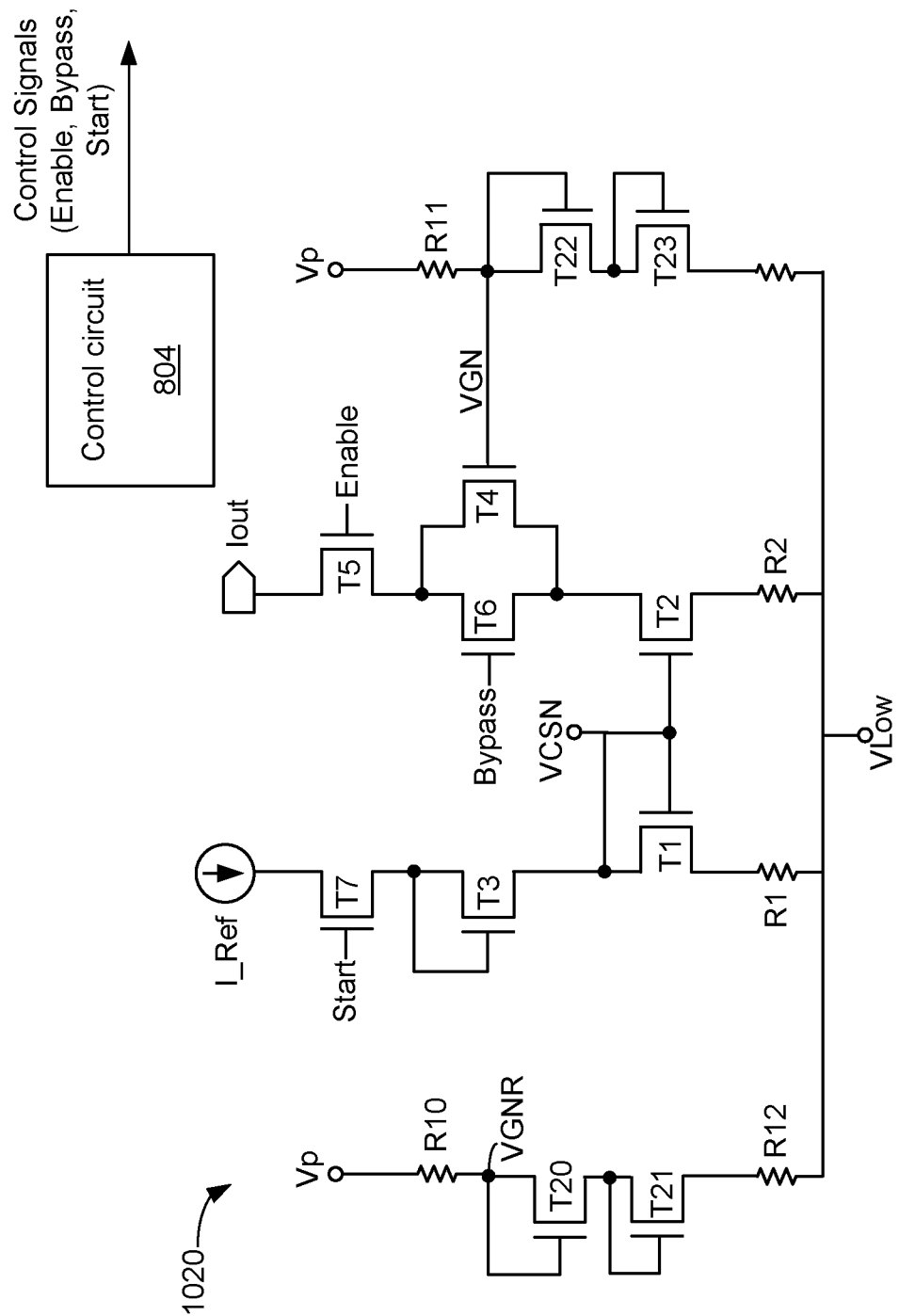
FIGS. 10B and 10C contain schematic diagrams of embodiments having biasing techniques that are alternatives to the biasing in FIG. 10A.
Figure 10C:
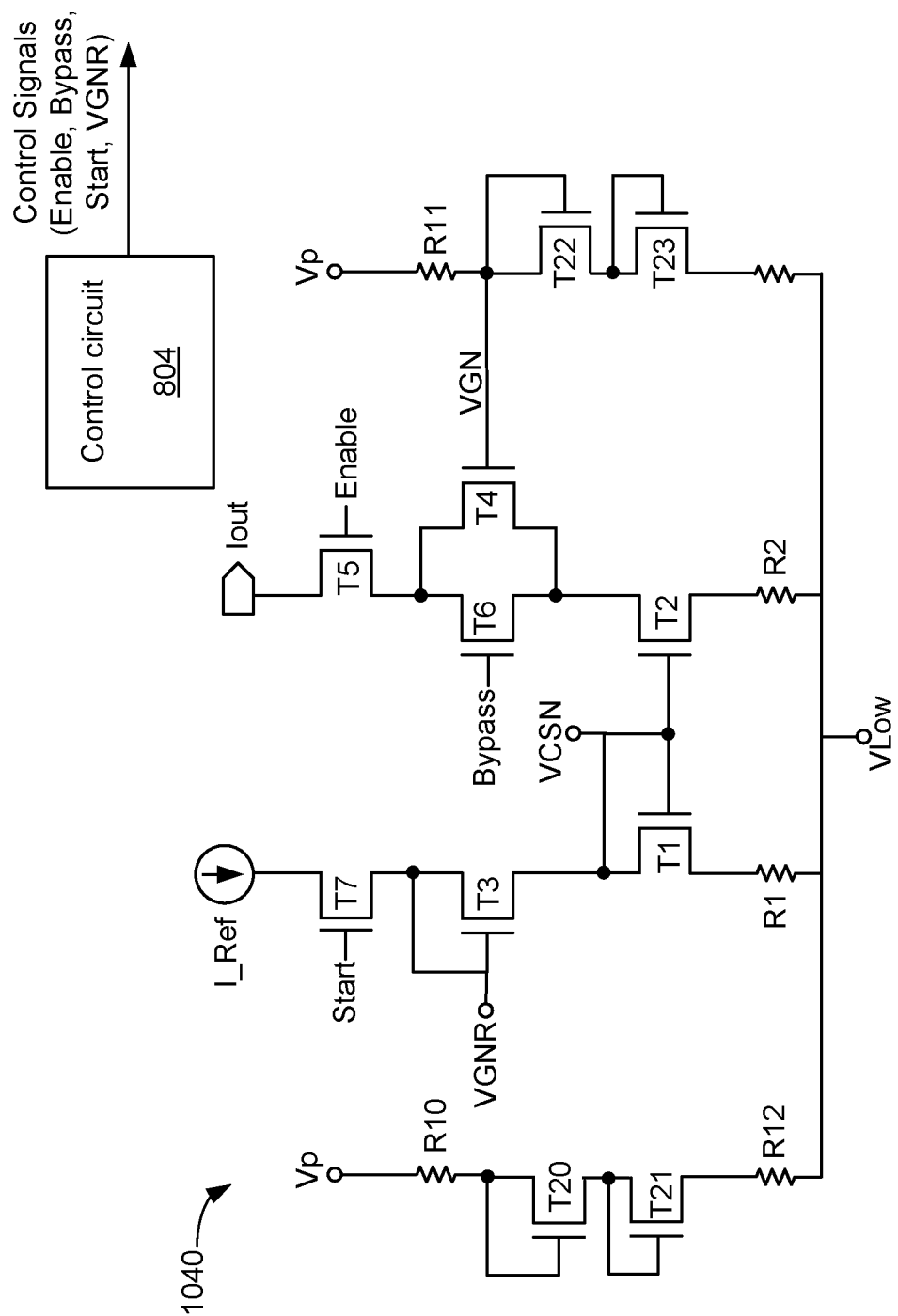

In an embodiment of circuit 1000 depicted in FIG. 10A, the gate of T3 is biased by VGNR, which is provided by the node between R10 and T20. FIG. 10B depicts an alternative biasing technique in which the gate of T3 in circuit 1020 is connected to drain of T3 (source of T7). FIG. 10C depicts another alternative biasing technique in which control circuit 804 provides the voltage VGNR to the gate of T3 in circuit 1040.

FIG. 11 is a graph depicting output current versus voltage on the output node of one embodiment of a current source. Curve 1102 is for a non-cascode mode of one embodiment of the current source. Curve 1104 is for a cascode mode of one embodiment of the current source. Each curve has a relatively linear portion (1102a, 1104a) and a portion (1102b, 1104b) for which current depends far more heavily on output voltage. The cascode mode has far less variation in output current versus voltage across the useful operating range compared to the non-cascode mode. The cascade has a larger working operating region for a given Vp. Line 1104a roughly corresponds to an operating region of the cascode mode in which there is very little variation in output current versus voltage at the output. Line 1102a roughly corresponds to an operating region of the non-cascode mode in which there is very little variation in output current versus voltage at the output. Note that although the non-cascode mode will work down to a lower voltage than the cascode mode before saturating where the current output varies strongly with output voltage, the cascode mode has far less variation in output current versus voltage across the useful operating range. Also note that the non-cascode mode can be beneficial when the voltage across the memory cell may be larger such as when turning on the threshold switching selector or when writing the memory cell. The voltage across the memory cell may be larger for write than for read due to the write current having a larger magnitude than the read current. In some embodiments, the write current is about twice the read current.

Figure 12:
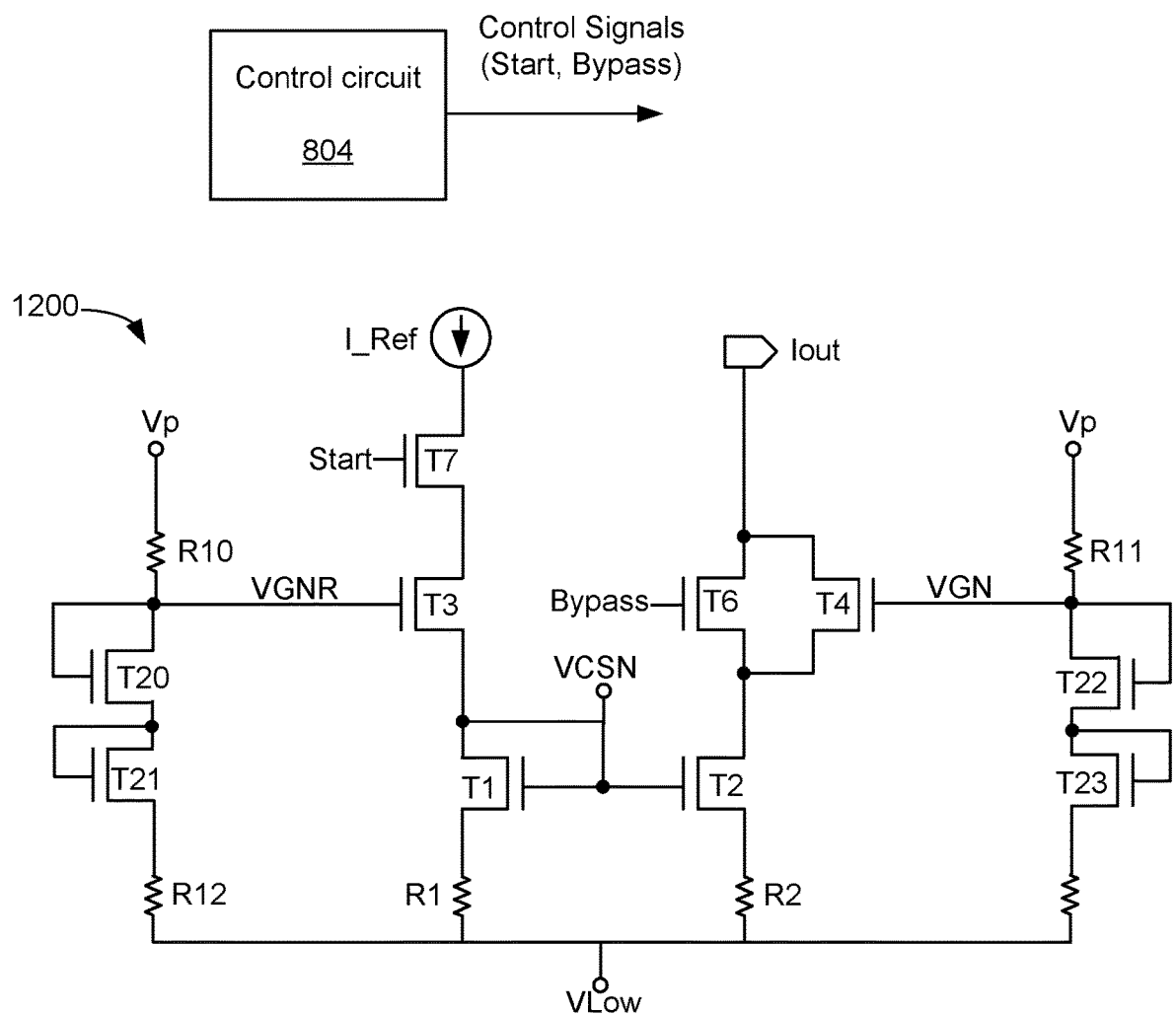
FIG. 12 is schematic diagram of one embodiment of system having a bypass transistor that may be used to operate a current source in two modes when reading a programmable resistance memory cell having a threshold switching selector.

FIG. 12 is schematic diagram of one embodiment of system that operates a current source 1200 in two modes when reading a programmable resistance memory cell having a threshold switching selector. The current source 1200 is similar to current source 1000 in FIG. 10A, but omits the enable transistor T5. Current source 1200 is implemented within one embodiment of current source 802. The transistors having the same references (T1, T2, T3, T4) may operate in a similar manner as those described with reference to FIG. 10. In an embodiment, the bypass transistor T6 can be used to bypass the cascode transistor T4 to cause the circuit 1200 to operate in the non-cascode mode or to not bypass the cascode transistor T4 to cause the circuit 1200 to operate in the cascode mode. In an embodiment, the bypass transistor T6 may be used to bypass T4 in the input stage of the cascode amplifier. Also note that the input of the cascode amplifier (e.g., gate of T4) is also bypassed. A high voltage applied to the gate of T6 will result in T6 shorting across the cascode transistor T4, thereby resulting in the non-cascode mode. A low voltage (e.g., 0V) applied to the gate of T6 will turn off T6, thereby resulting in the cascode mode. The system includes a control circuit 804 that issues control signals to control the current source 1200. One of the control signals (Bypass) is applied to the gate of T6 to bypass/not bypass the cascode transistor T4. As noted in the discussion of FIG. 10, the bias voltage VGN may be used to select between the cascode mode and the non-cascode mode. One option is to use a single copy of circuit 1200 for both the cascode mode and the non-cascode mode, but at different times by use of bypass transistor. The bias voltage VGN may be kept at the bias for the cascode mode for both states of the bypass transistor T6. In an embodiment, the bias voltage VGNR to the gate of T3 is provided from the node between R10 and T20. However, the bias voltage VGNR to the gate of T3 could be provided as shown and described with respect to FIG. 10B or 10C.

In one embodiment, circuit 1200 is replicated with one being operated in the cascode mode (when enabled) and the other being operated in the non-cascode mode (when that copy is enabled). The circuit 1300 is capable of being operated in the either the non-cascode mode or the cascode mode based on the bias voltage VGN with the cascode transistor T4 not bypassed. Alternatively, the circuit 1300 is capable of being operated in the either the non-cascode mode or the cascode mode based on whether the cascode transistor T4 is bypassed using transistor T6 with Bypass high (Vp) or low (V_low).

Figure 13:
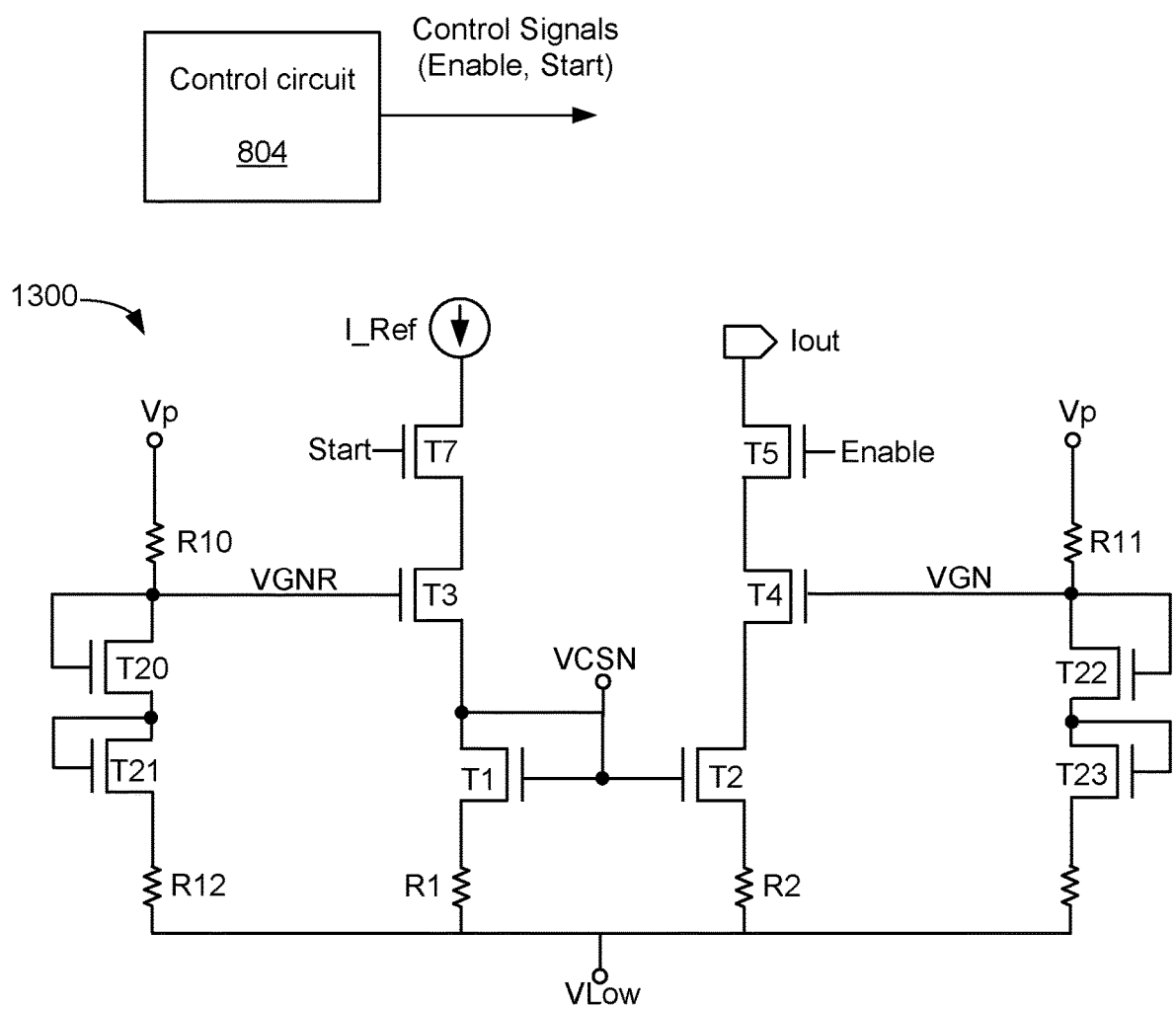
FIG. 13 is schematic diagram of one embodiment of system having an enable transistor that may be used to enable/disable an current source that is capable be being operated in two modes when reading a programmable resistance memory cell having a threshold switching selector.

FIG. 13 is schematic diagram of one embodiment of system that operates a current source 1300 in two modes when reading a programmable resistance memory cell having a threshold switching selector. The current source 1300 is similar to current source 1000 in FIG. 10A, but adds an enable transistor T5. Current source 1300 is implemented within one embodiment of current source 802 in FIG. 8. The transistors having the same references (T1, T2, T3, T4) may operate in a similar manner as those described with reference to FIG. 10. In an embodiment, the enable transistor T5 is used to either enable (or select) the current source 1300 or alternatively to disable (or deselect) the current source 1300 by turning off the current flow except for leakage. Current source 1300 has a cascode amplifier (which may include T2, T4, R2). In an embodiment, the enable transistor T5 may be used to enable or disable the cascode amplifier, and changing this driver circuit load to be only capacitance with low leakage, for when unused. The system includes a control circuit 804 that issues control signals to control the current source 1300. One of the control signals (Enable) is applied to the gate of T5 to enable/disable the circuit 1300. As noted in the discussion of FIG. 10, in an embodiment, the bias voltage VGN may be used to select between the cascode mode and the non-cascode mode. In one embodiment, circuit 1300 is replicated with one being operated in the cascode mode (when enabled) and the other being operated in the non-cascode mode (when enabled). Therefore, the bias voltage VGN to each circuit may remain at a fixed value with the respective enable transistors T5 used to select one circuit or the other. In an embodiment, the bias voltage VGNR to the gate of T3 is provided from the node between R10 and T20. However, the bias voltage VGNR to the gate of T3 could be provided as shown and described with respect to FIG. 10B or 10C.

Figure 14:
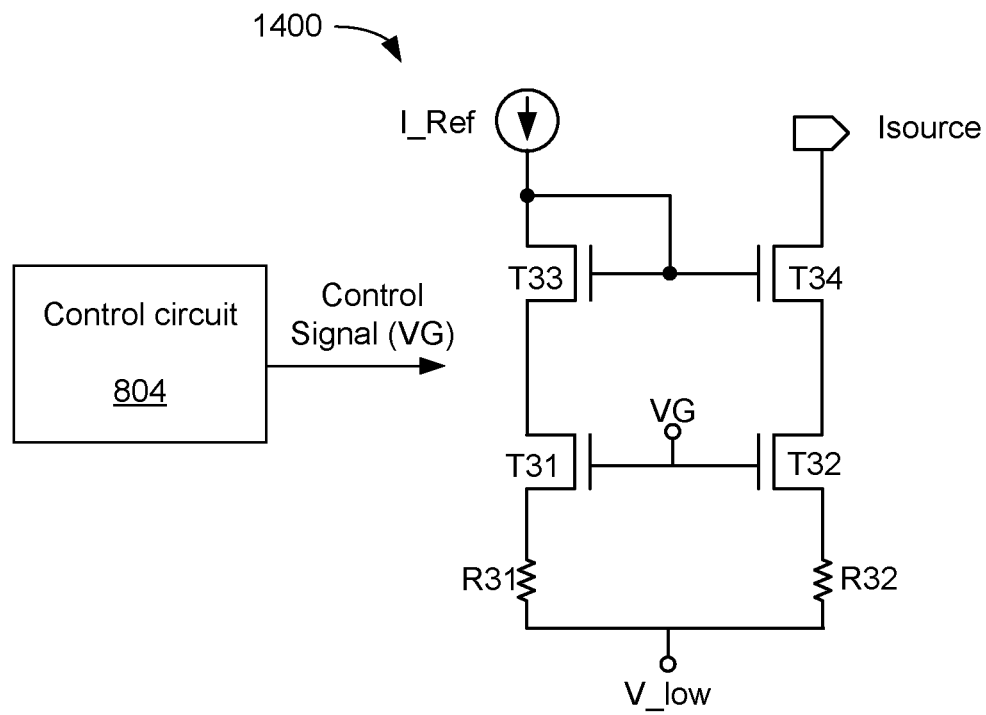
FIG. 14 is a schematic diagram of one embodiment of a system that may issue a control signal (VG) to operate a current source in two modes when reading a programmable resistance memory cell having a threshold switching selector.

FIG. 14 is schematic diagram of one embodiment of system that operates a current source 1400 in two modes when reading a programmable resistance memory cell having a threshold switching selector. The current source 1400 may be referred to as a current mirror cascode circuit (or "cascode current mirror"). Transistors T33 and T34 form a current mirror. The reference current I_Ref is input to T33 and mirrored by T34. Transistor T33 may be referred to as an input transistor and T34 may be referred to as an output transistor. Transistor T34 provides the output current Isource to the memory array. Transistor T31 is in series with T33. Transistor T32 is in series with T34. In an embodiment, the circuit 1400 includes a cascode amplifier that may include T32, T34 and R32. A cascode amplifier may have two stages which are referred to as an input stage and an output stage. In an embodiment, the input stage includes transistor T32, which may be referred to herein as a cascode transistor. In an embodiment, the gate of T32 may be referred to as the input of the cascode amplifier. The gate of T32 may be biased by bias voltage VG. In an embodiment, the output stage includes transistor T34, which may be referred to herein as an output transistor. In an embodiment, the drain of T34 may be referred to as the output of the cascode amplifier. Current source 1400 is implemented within one embodiment of current source 802. The system includes a control circuit 804 that issues control signals to control the current source 1400. In an embodiment, control circuit 804 is implemented within state machine 262, but is not limited thereto. One of the control signals is used to control the magnitude of bias voltage VG to select between the two modes. In one embodiment, a relatively high bias voltage will operate the current source 1400 in the non-cascode mode and a lower bias voltage will operate the current source 1400 in the cascode mode. In one embodiment, applying 0V as VG will disable the current source 1000. If the current source 1400 is disabled then a different current source may be used to provide the current to the selected memory cell. Resistors R31 and R32 may be sized the same. Resistors R31 and R32 may be 0 Ohms (i.e., removed) or higher. A higher resistance for R31 and R32 may allow for greater mismatch between T31 and T32 while still keeping the output current from varying more than a target percentage. The volage V_low may be ground, but is not required to be ground.

The circuit 1400 in FIG. 14 may be modified by adding a bypass transistor in parallel with T32 and/or adding an enable transistor in series with T32. Therefore, the T32 may be bypassed similar to bypassing T4 (see FIG. 12) to provide either the cascode mode or the non-cascode mode. Also, the circuit 1400 may be enabled/disabled with an enable transistor similar to the enable transistor T5 discussed in circuit 1300 in FIG. 14.

Figure 15:
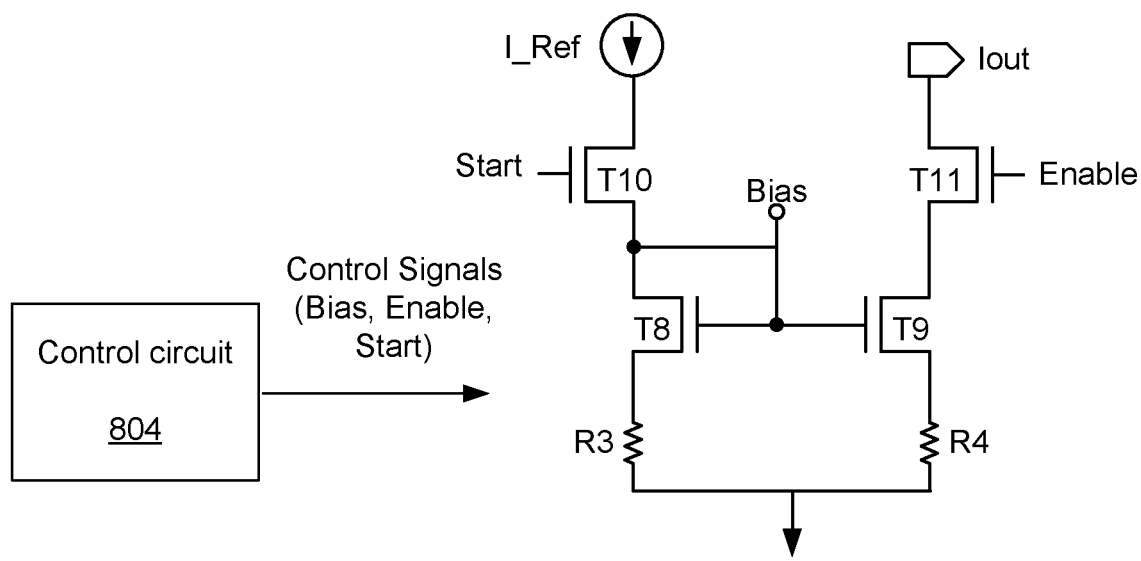
FIG. 15 is a schematic diagram of one embodiment of a system that operates a current source in a non-cascode mode when reading a programmable resistance memory cell having a threshold switching selector.

FIG. 15 is a schematic diagram of one embodiment of a system that operates a current source 1500 in a non-cascode mode when reading a programmable resistance memory cell having a threshold switching selector. Current source 1500 is implemented within one embodiment of current source 802. The current source 1500 has a current mirror formed by transistors T8 and T9. The start transistor T10 controls whether the reference current (I_ref) is provided as an input to current source 1500. The enable transistor T11 enables/disables the current source 1500. The current source 1500 does not have a cascode transistor and does not operate in a cascode mode. In an embodiment, current source 1500 is enabled for the non-cascode mode and a different current source is enabled for the cascode mode, as by enabling a version such as that of circuit 1000, 1020, 1040, 1200, 1300 or 1400.

Figure 16A:
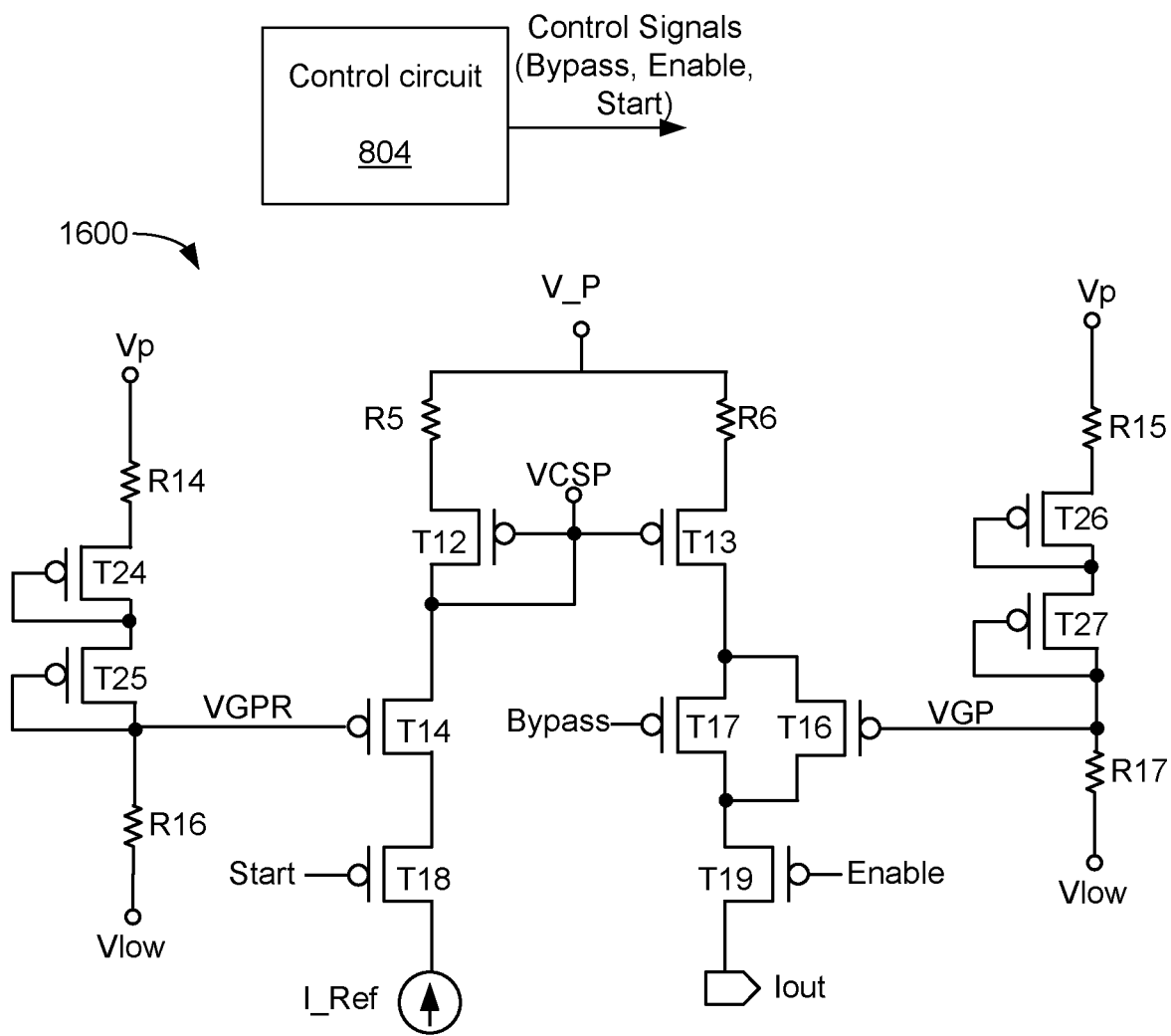
FIG. 16A is a schematic diagram of one embodiment of a system that operates a current source in two modes when reading a programmable resistance memory cell having a threshold switching selector.

FIG. 16A is a schematic diagram of one embodiment of a system that operates a current source 1600 in two modes (e.g., cascode, non-cascode) when reading a programmable resistance memory cell having a threshold switching selector. Current source 1600 is implemented within one embodiment of current source 802. The circuit 1600 has p-channel transistors. The operation of circuit 1600 may be similar to the n-channel circuit 1400. In an embodiment, the bypass signal in circuit 1600 to the gate of T17 may be low for the non-cascode mode (providing a short across T16) and high for the cascode mode (output current flows through the series of T13, T15 and T16). In one embodiment, the p-channel transistors in circuit 1600 are larger than the n-channel transistors in circuit 1400 to account for the n-channel transistors having greater mobility (drive) than the p-channel transistors. In one embodiment, the p-channel transistors in circuit 1600 are about twice the size of the n-channel transistors in circuit 1400. The circuits R15, T26, T27, R17, R14, T24, T25, R14 may be used to bias VGPR or VGP, or such bias may be provided by Control Circuit 804 in FIG. 8.

Figure 16B:
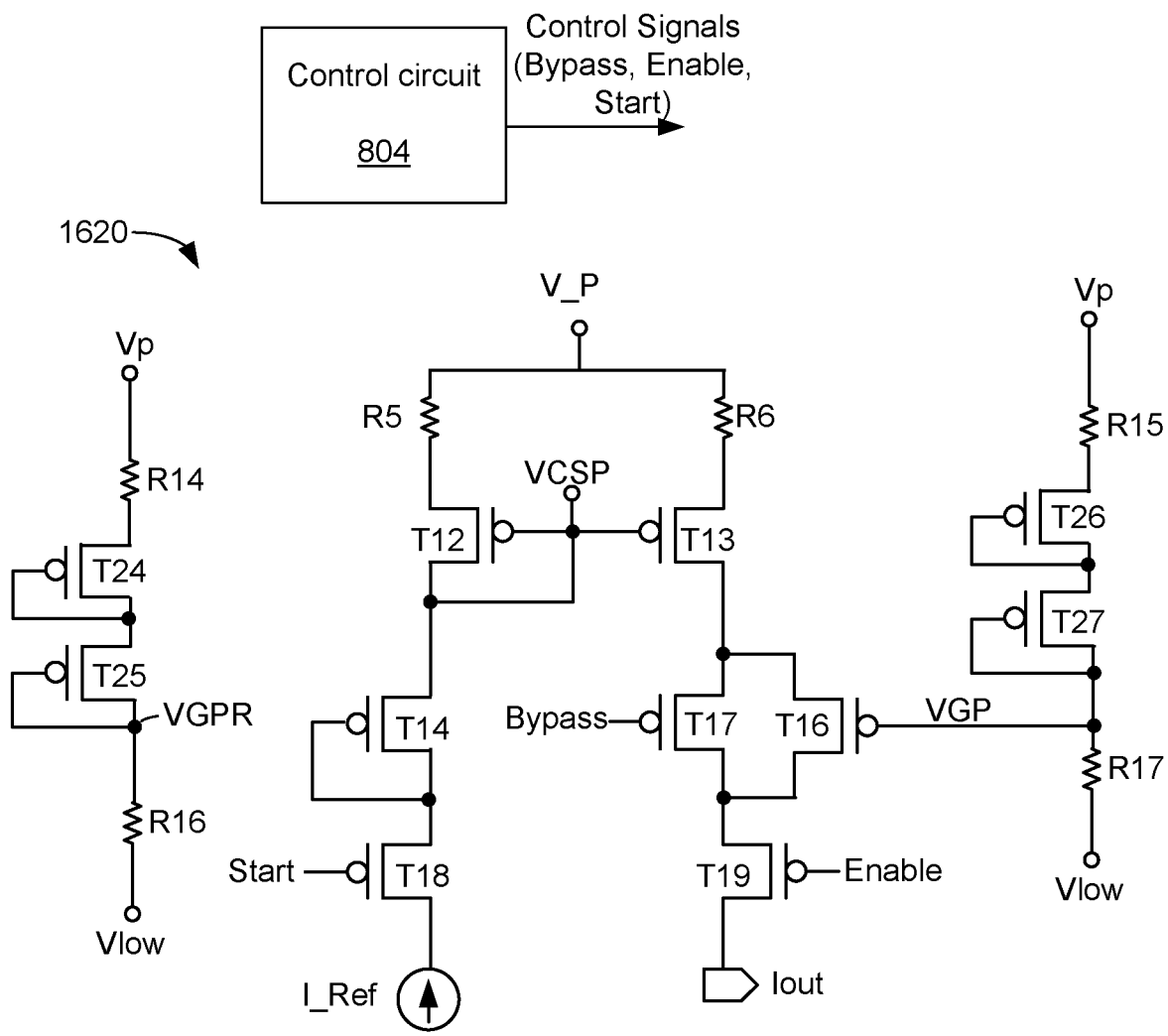
FIGS. 16B and 16C contain schematic diagrams of embodiments having biasing techniques that are alternatives to the biasing in FIG. 16A.
Figure 16C:
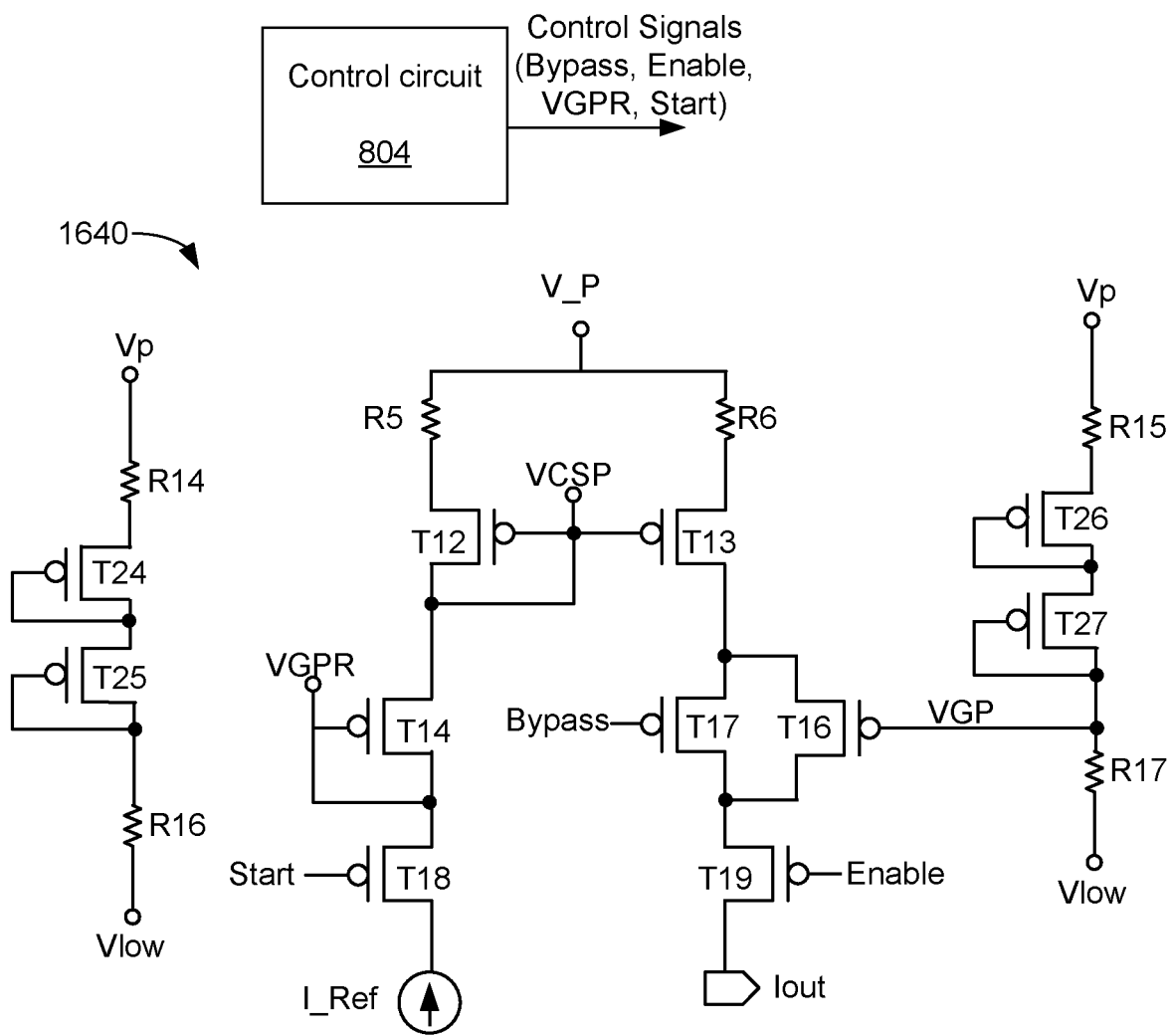

In an embodiment of circuit 1600 depicted in FIG. 16A, the gate of T14 is biased by VGPR, which is provided by the node between R16 and T25. FIG. 16B depicts an alternative biasing technique in which the gate of T14 in circuit 1620 is connected to the node between T14 and T18. FIG. 16C depicts another alternative biasing technique in which control circuit 804 provides the voltage VGPR to the gate of T14 in circuit 1640.

Figure 17:
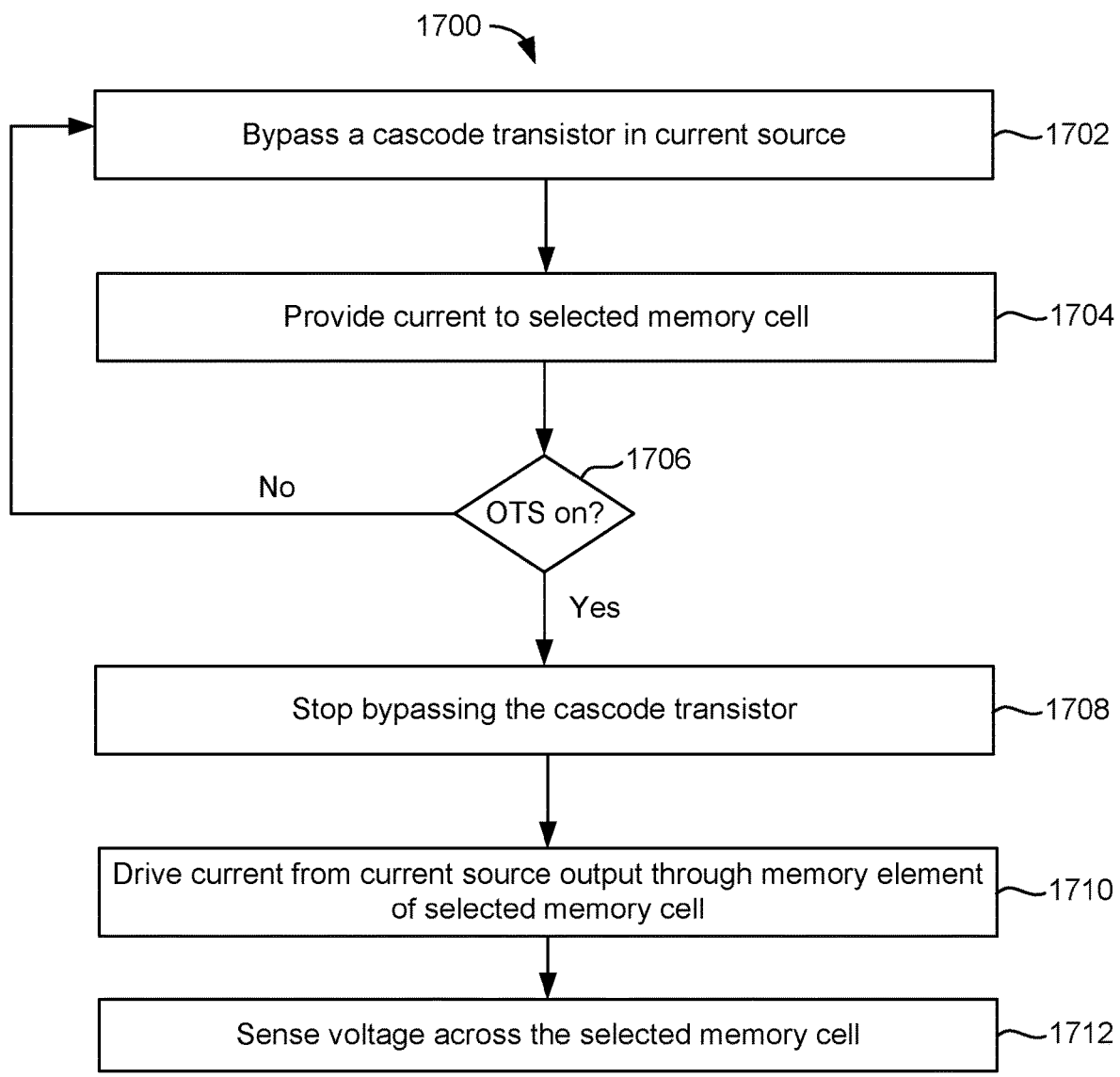
FIG. 17 is a flowchart of one embodiment of a process in which controlling between the non-cascode mode and the cascode mode involves determining whether to bypass the cascode transistor.

In one embodiment, the cascode transistors (e.g., T4, T16) is either bypassed to operate in the non-cascode mode and not bypassed to operate in the cascode mode. FIG. 17 is a flowchart of one embodiment of a process 1700 in which controlling between the non-cascode mode and the cascode mode involves determining whether to bypass the cascode transistor. Process 1700 provides further details for one embodiment of process 900. Process 1700 involves bypassing a cascode transistor. The process 1700 could use any of circuits 1300, 1400, or 1600, but is not limited thereto. Step 1702 includes bypassing a cascode transistor in the current source. In an embodiment, a voltage is applied to the gate of bypass transistor T6 to turn on the bypass transistor T6 to short past the cascode transistor T4. [For circuit 1600 in FIG. 16A, 16B, or 16C, the bypass signal may be applied to bypass transistor T17. For circuit 1400 in FIG. 14, a bypass transistor could be added across T32.]. Step 1702 is one embodiment of step 902 of process 900 of operating a current source in a non-cascode mode.

Step 1704 includes providing the output current (Icurrent) to the selected memory cell. In an embodiment, the current is provided to the selected word line while a select voltage is applied to the selected bit line. Step 1704 is one embodiment of step 904 of process 900.

Step 1706 includes a determination of whether the threshold switching selector has turned on. This determination may be based on waiting a pre-determined time after first providing the current to allow sufficient time for the threshold switching selector to switch on. If the threshold switching selector has not yet turned on then the system stays in the non-cascode mode. After the threshold switching selector has turned on, the system may switch to the cascode mode. Step 1706 is one embodiment of step 906 of process 900 of determining whether to operate in a non-cascode mode or a cascode mode.

In response to determining that the threshold switching selector has turned on, in step 1708 the bypass transistor may be turned off to stop bypassing the cascode transistor T4 (or T16 in FIG. 16; or T32 in FIG. 14). Step 1708 is one embodiment of step 908 of process 900 of operating a current source in a cascode mode. Step 1710 includes driving the output current (Icurrent) through the selected memory cell while the threshold switching selector remains on. Step 1712 includes sensing a voltage across the selected memory cell while the current is driven through the selected memory cell.

Figure 18:
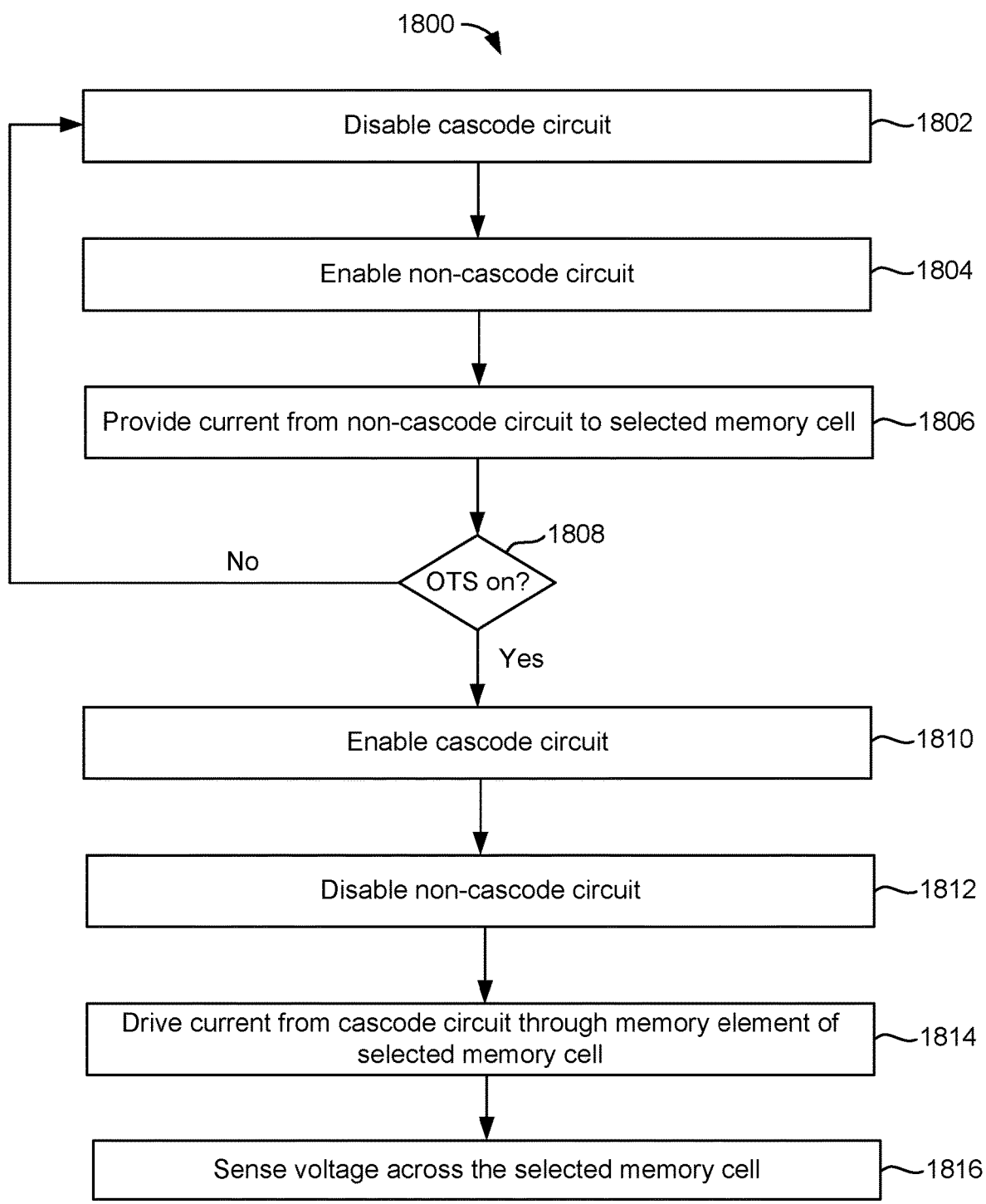
FIG. 18 is a flowchart of one embodiment of a process in which controlling between the non-cascode mode and the cascode mode involves selecting between two different circuits.

In one embodiment, the system selects between two different circuits to provide either the non-cascode mode or the cascode mode. FIG. 18 is a flowchart of one embodiment of a process 1800 in which controlling between the non-cascode mode and the cascode mode involves selecting between two different circuits. Process 1800 provides further details for one embodiment of process 900. For the sake of discussion one circuit will be referred to as a cascode circuit and another circuit will be referred to as a non-cascode circuit. Current sources 1000, 1020, 1040, 1200, 1300, 1400, 1600, 1620, and 1640 each have the ability to be operated as either the cascode circuit or as the non-cascode circuit. Circuit 1500 of FIG. 15 may be operated as the non-cascode circuit. Thus, a wide combination of circuit combinations may be selected for the cascode circuit and non-cascode circuit.

Step 1802 includes disabling the cascode circuit. Step 1804 includes enabling the non-cascode circuit. The enable signal to T5 or T19 may be used in steps 1802-1804. In one embodiment, an enable transistor is added in series with T34 in circuit 1400 of FIG. 14. Steps 1802-1804 together are one embodiment of step 902 of process 900 of operating a current source in a non-cascode mode. Step 1806 includes providing the output current (Icurrent) of the non-cascode circuit to the selected memory cell. In an embodiment, the current is provided to the selected word line while a select voltage is applied to the selected bit line. Step 1806 is one embodiment of step 904 of process 900 of operating a current source in a non-cascode mode.

Step 1808 includes a determination of whether the threshold switching selector has turned on. This determination may be based on waiting a pre-determined time after first providing the current to allow sufficient time for the threshold switching selector to switch on. If the threshold switching selector has not yet turned on then the system stays in the non-cascode mode. After the threshold switching selector has turned on the system may switch to the cascode mode. Step 1808 is one embodiment of step 906 of process 900 of determining whether to operate in a non-cascode mode or a cascode mode.

In response to determining that the threshold switching selector has turned on, in step 1810 the cascode circuit is enabled. In step 1812 the non-cascode circuit is disabled. Such changes may be nearly simultaneous or not. The enable signal to T5 or T16 may be used in steps 1810-1812. Together steps 1810-1812 are one embodiment of step 908 of process 900 of operating a current source in a cascode mode. Step 1814 includes driving the output current of the cascode circuit through the selected memory cell while the threshold switching selector remains on. Step 1816 includes sensing a voltage across the selected memory cell while the current is driven through the selected memory cell.

Figure 19:
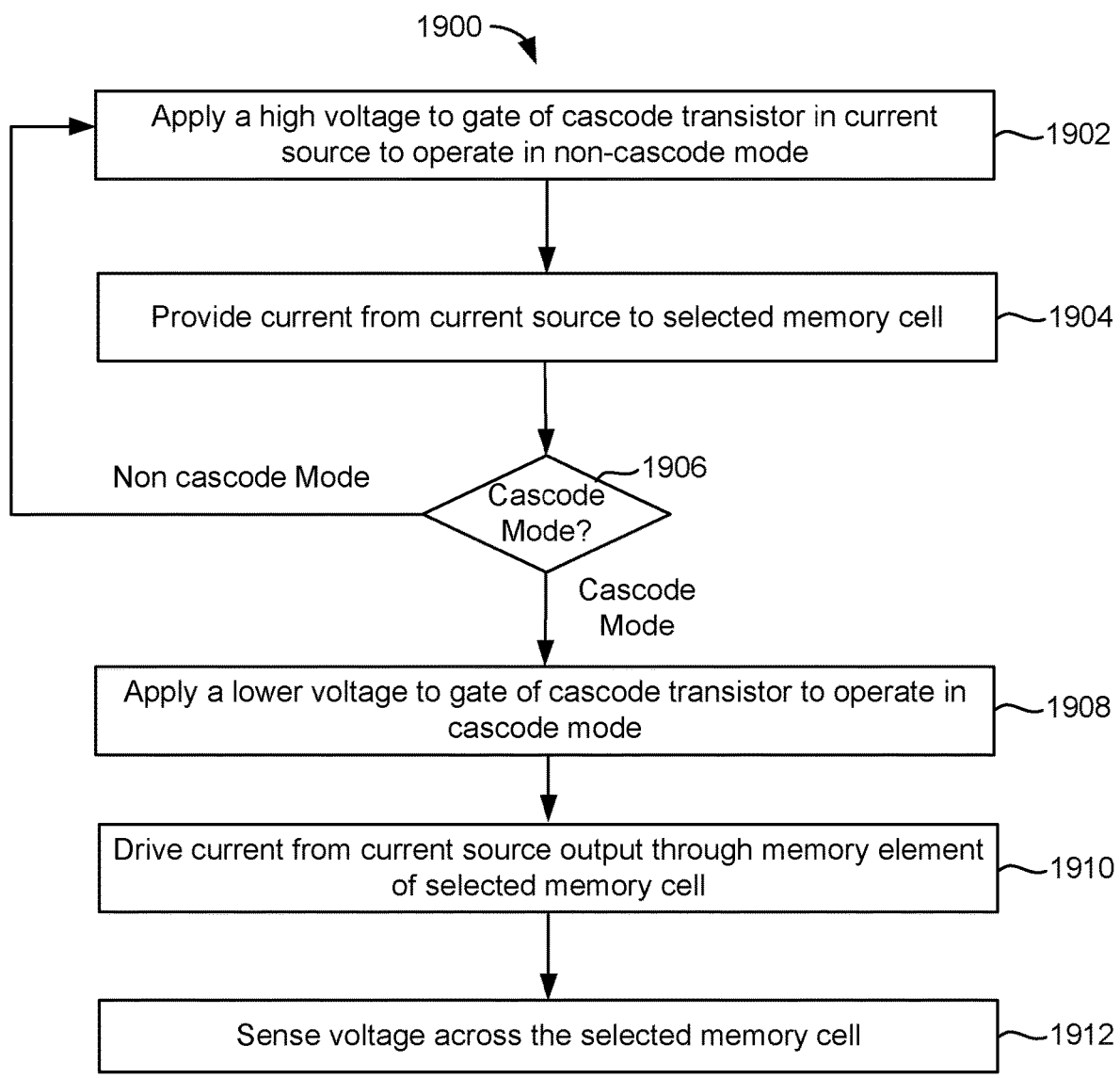
FIG. 19 is a flowchart of one embodiment of a process in which controlling between the non-cascode mode and the cascode mode involves the magnitude of the bias voltage to the gate of the cascode transistor.

In one embodiment, the bias voltage to the gate of the cascode transistor is used to select between the non-cascode mode and the cascode mode. FIG. 19 is a flowchart of one embodiment of a process 1900 in which controlling between the non-cascode mode and the cascode mode involves the magnitude of the bias voltage to the gate of the cascode transistor. Process 1900 provides further details for one embodiment of process 900. Process 1900 could use one circuit operated in both the non-cascode mode and the cascode mode but at different times. Process 1900 could use two different circuits with one operated in the cascode mode and the other operated in the non-cascode mode.

Step 1902 includes applying a high voltage to a gate of the cascode transistor in a current circuit. The current circuit could include, but is not limited to, current source 1000, 1020, 1040, 1200, 1300, 1400, 1600, 1620, or 1640. The cascode transistor may include, but is not limited to, T4 in any of current sources 1000, 1020, 1040, 1200, or 1300; T16 in any of current sources 1600, 1620, or 1640; or T32 in current source 1400. If two circuits are used in process 1900 step 1902 may include turning on the enable transistor T5 in the circuit to be used for the non-cascode mode and turning off the enable transistor T5 in the circuit that will be used for the cascode mode. Step 1902 is one embodiment of step 902 of process 900 of operating a current source in a non-cascode mode. Step 1904 includes providing the output current of the current circuit to the selected memory cell. In an embodiment, the current is provided to the selected word line while a select voltage is applied to the selected bit line. Step 1904 is one embodiment of step 904 of process 900 of operating a current source in a non-cascode mode.

Step 1906 includes a determination of whether the threshold switching selector has turned on. This determination may be based on waiting a pre-determined time after first providing the current to allow sufficient time for the threshold switching selector to switch on. If the threshold switching selector has not yet turned on then the system stays in the non-cascode mode. After the threshold switching selector has turned on the system may switch to the cascode mode. Step 1906 is one is one embodiment of step 906 of process 900 of determining whether to operate in a non-cascode mode or a cascode mode.

In response to determining that the threshold switching selector has turned on, in step 1908 a lower voltage is applied to the gate of the cascode transistor in a current circuit. This may be the same current circuit that was used for the non-cascode mode or a different circuit. Step 1908 may also include turning on the enable transistor T5 in the circuit to be used for the cascode mode and turning off the enable transistor T5 in the circuit that was used for the non-cascode mode. Step 1908 is one embodiment of step 908 of process 900 of operating a current source in a cascode mode. Step 1910 includes driving the output current through the selected memory cell while the threshold switching selector remains on. Step 1912 includes sensing a voltage across the selected memory cell while the current is driven through the selected memory cell.

Figure 21A:
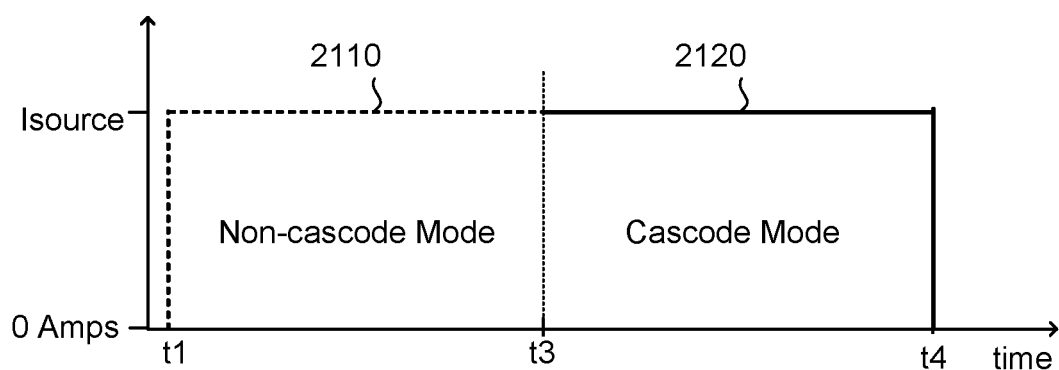
FIG. 21A depicts current versus time during an embodiment of a globally referenced read operation.
Figure 21B:
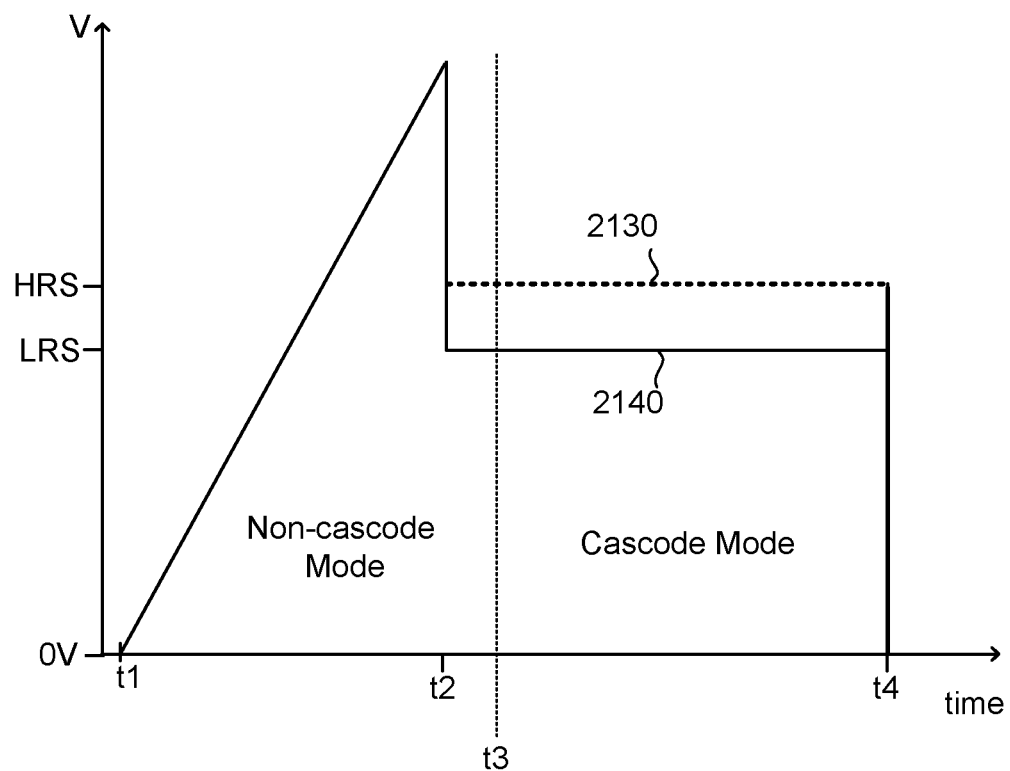
FIG. 21B depicts voltage versus time for the voltage across a selected memory cell during an embodiment of a globally referenced read operation.

FIG. 20 is a flowchart of one embodiment of a process 2000 of a globally referenced read operation. The system operates the current source in two modes (e.g., a non-cascode mode and a cascode mode). In an embodiment, a programmable resistance memory cell having a threshold switching selector is read. In an embodiment, an MRAM cell with an OTS is read. However, the memory cell is not required to be MRAM and the threshold switching selector is not required to be an OTS. Process 2000 will be discussed with reference to FIGS. 21A and 21B. FIG. 21A depicts current versus time. FIG. 21B depicts voltage versus time for the voltage across a selected memory cell.

Step 2002 includes applying a select voltage to the selected bit line. Step 2004 includes operating the current source in the non-cascode mode to generate a select current. The term "select current" means a current having a suitable magnitude of current and voltage to switch on the threshold switching selector. Step 2006 includes driving the select current to the selected word line to turn on the threshold switching selector. With reference to FIG. 21A, the current is increased to $I_{source}$ at time t1. Between t1 and t3 the current source is operated in the non-cascode mode but could be operated in the cascode mode if enough power supply voltage is available. Dashed line 2110 represents the select current. With reference to FIG. 21B, the voltage across the memory cell increases from t1 to t2. The threshold switching selector is off between t1 and t2. Between t1 and t2, the current causes the word line voltage to increase. The current also supports any leakage in the path. Once the voltage across threshold switching selector reaches the threshold voltage $V_{th}$ of the threshold switching selector 502, it will turn on and switch to a low resistance state (at t2). Thus, the voltage across the series combination x-y select address select transistors and the threshold switching selector element 502 and the resistive memory element ramps up between t1 and t2 as the threshold switching selector is in an off state until t2. With reference to FIG. 21B, the threshold switching selector 502 remains on between t2 and t3 (in a low resistance state). Once the threshold switching selector 502 is in the on state (at t2), the current will flow through the selected memory cell 401. The voltage across the memory cell will drop to a level dependent upon the series resistance of the memory element 702 and the on-state resistance of the threshold switching selector 502 along with the address select transistors and metal resistance in the path. For a binary embodiment in which a memory cell only stores two states, the memory cell will have an HRS and an LRS. The resultant voltage across the series connected memory element 702 and threshold switching selector 502 in response to the current for the FIRS and LRS are respectively shown as lines 2130 and 2140.

Step 2008 includes a determination of whether the stay in a select stage or to change to a sense stage. The change is made after the threshold switching selector switches on. This determination may be based on waiting a pre-determined time after first providing the current to allow sufficient time for the threshold switching selector to switch on. Step 2008 is one embodiment of step 906 of process 900 of determining whether the stay in the non-cascode mode or to change to the cascode mode. In response to determining to enter the sense stage, the current source is operated in the cascode mode in step 2010 to generate a more accurate read current. Step 2012 includes driving the read current to the selected word line to force the read current through the selected memory cell while the threshold switching selector remains on. With reference to FIG. 21A, the current source enters the cascode mode at t3. Line 2120 represents the read current during the cascode mode. The magnitude of the read current may be about the same as the magnitude of the select current. For example, each current could be about 15 uA. However, the read current is less dependent on the magnitude of the voltage across the memory cell (which impacts the voltage at the output of the current source) than the select current. Therefore, the magnitude of the read current will be very close to the target magnitude after t3 when needed to be more accurate. With reference to FIG. 21B, the voltage across the memory cell may stay about the same after entering the cascode mode. The threshold switching selector 502 stays in the on state. The resultant voltage across the series connected memory element 702 and threshold switching selector 502 in response to the current for the HRS and LRS are respectively shown as lines 2130 and 2140.

Step 2014 includes sensing a voltage across the selected memory cell while the current is driven through the selected memory cell. The memory cell may be sensed a brief time after entering the cascode mode at t3. Step 2016 includes comparing the sensed voltage to a common reference voltage to determine the state of the memory cell. The "common reference voltage" is a reference voltage that is used as a comparison voltage for a number of different memory cells. This common reference voltage may be mid-way between the typical voltage of the HRS and the LRS.

Figure 23A:
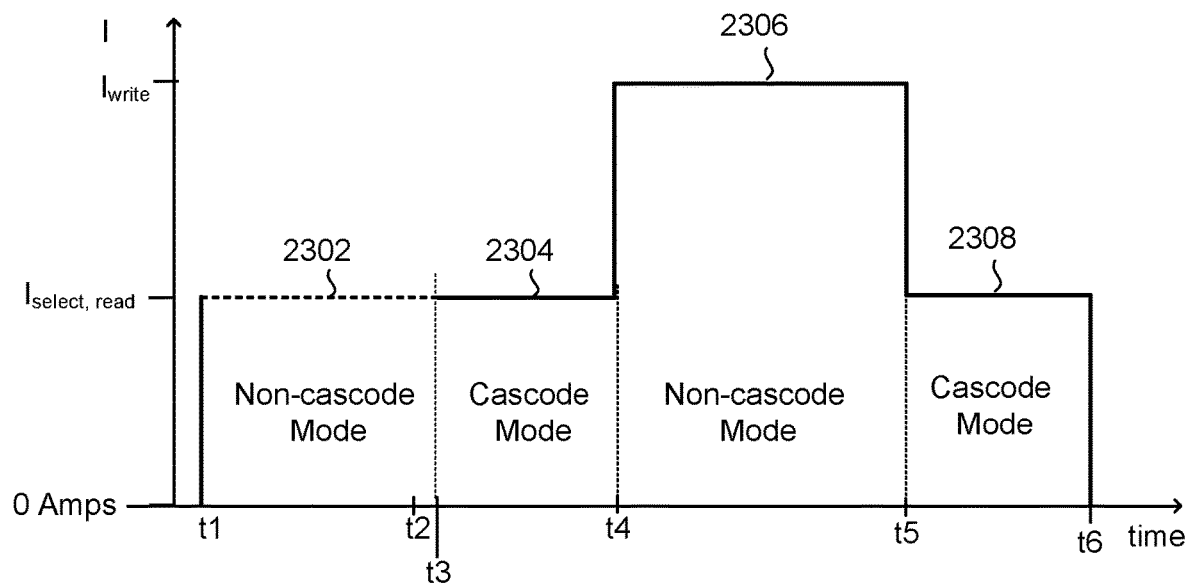
FIG. 23A depicts current versus time for an embodiment of a self-referenced read operation.
Figure 23B:
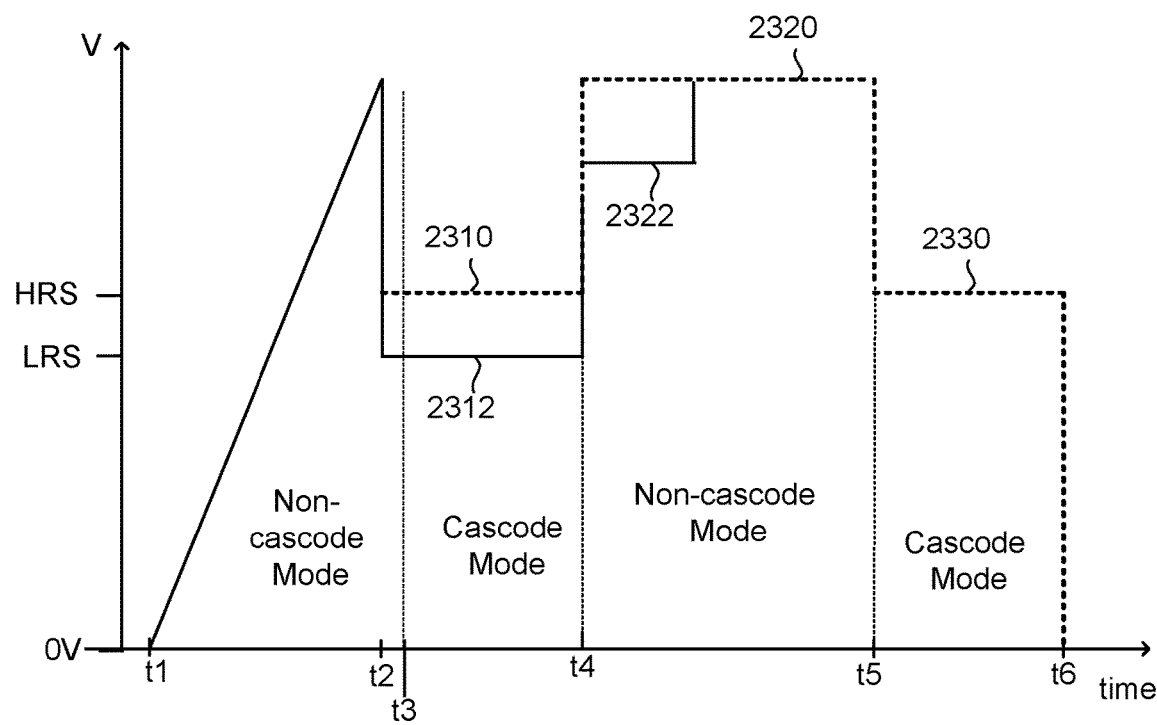
FIG. 23B depicts voltage versus time for the voltage across a selected memory cell for an embodiment of a self-referenced read operation.

FIG. 22 is a flowchart of one embodiment of a process 2200 of a self-referenced read operation. The system operates the current source in two modes (e.g., a non-cascode mode and a cascode mode). In an embodiment, a programmable resistance memory cell having a threshold switching selector is read. In an embodiment, an MRAM cell with an OTS is read. However, the memory cell is not required to be MRAM and the threshold switching selector is not required to be an OTS. Process 2200 will be discussed with reference to FIGS. 23A and 23B. FIG. 23A depicts current versus time. FIG. 23B depicts voltage versus time for the voltage across a selected memory cell.

Step 2202 includes performing a first read select the cell to turn on the select element using a non-cascode mode followed by a Read using a more accurate current in a cascode mode for the current source. The non-cascode mode is used to turn on the threshold switching selector. The cascode mode is used when sensing or reading the memory cell. In one embodiment steps 2002-2014 of process 2000 are performed. Step 2204 includes storing a voltage from the sensing the memory cell in the first read. With reference to FIG. 23A, the current is increased at time t1. Between t1 and t3 the current source is operated in the non-cascode mode. Dashed line 2302 represents the select current during the non-cascode mode. Line 2304 represents the read current during the cascode mode between t3 and t4. FIG. 23B shows the voltage across the memory cell between t1 to t4, which is similar to the voltage across the cell in FIG. 21B. Line 2310 represents the voltage of the HRS. Line 2312 represents the voltage of the LRS.

Step 2206 includes operating the current source in the non-cascode mode to generate a write current. The term "write current" means a current having a suitable magnitude to change the resistance of the memory cell programmable resistance memory element of the selected cell. Step 2208 includes driving the write current to the selected word line and through the selected cell with the threshold switching selector still turned on. With reference to FIG. 23A, the current is increased to $I_{write}$ at time t4. Between t4 and t5 the current source is operated in the non-cascode mode and may be increased substantially from the earlier non-cascode current choice, perhaps 2×. Dashed line 2306 represents the write current. With reference to FIG. 23B, the voltage across the cell increases to either line 2322 (LRS) to line 2320 (HRS) at t4. At some point between t4 and t5 if the cell was in the LRS it will switch to the HRS. Thus, by t5 the cell may always be in the HRS (line 2320).

Step 2210 includes operating the current source in the cascode mode to generate a read current. Step 2212 includes driving the read current to the selected word line to force the read current through the selected memory cell while the threshold switching selector remains on. With reference to FIG. 23A, the current source enters the cascode mode at t5. Line 2308 represents the read current during the cascode mode. With reference to FIG. 23B, the voltage across the memory cell drops due to the magnitude of the read current being less than the write current. Line 2330 shows that the memory cell is now in the HRS.

Step 2214 includes sensing a voltage across the selected memory cell while the read current is driven through the selected memory cell. The memory cell may be sensed after allowing for a settling time after entering the cascode mode at t5. Step 2216 includes comparing the sensed voltage to the stored voltage from the first read to determine the state of the memory cell. The stored voltage from the first read may be adjusted (for example, up or down by 150 mv, and the mram cd may be 20 nm, its RA 10, and read current approximately 15 ua). The determination of the original state of the memory cell depends on the difference between the first adjusted read voltage and the second read voltage. For example, if the first sampled voltage was adjusted up and the write was from FIRS to the HRS, then where the cell was originally in the HRS, then the second sampled voltage should be lower than the first adjusted up voltage. However, if the cell was originally in the LRS then the second sampled voltage should be higher than the first adjusted up voltage due to the higher voltage of the HRS with more change in voltage of about 350 mV relative to the adjustment of the first read voltage of 150 mV.

Figure 24:
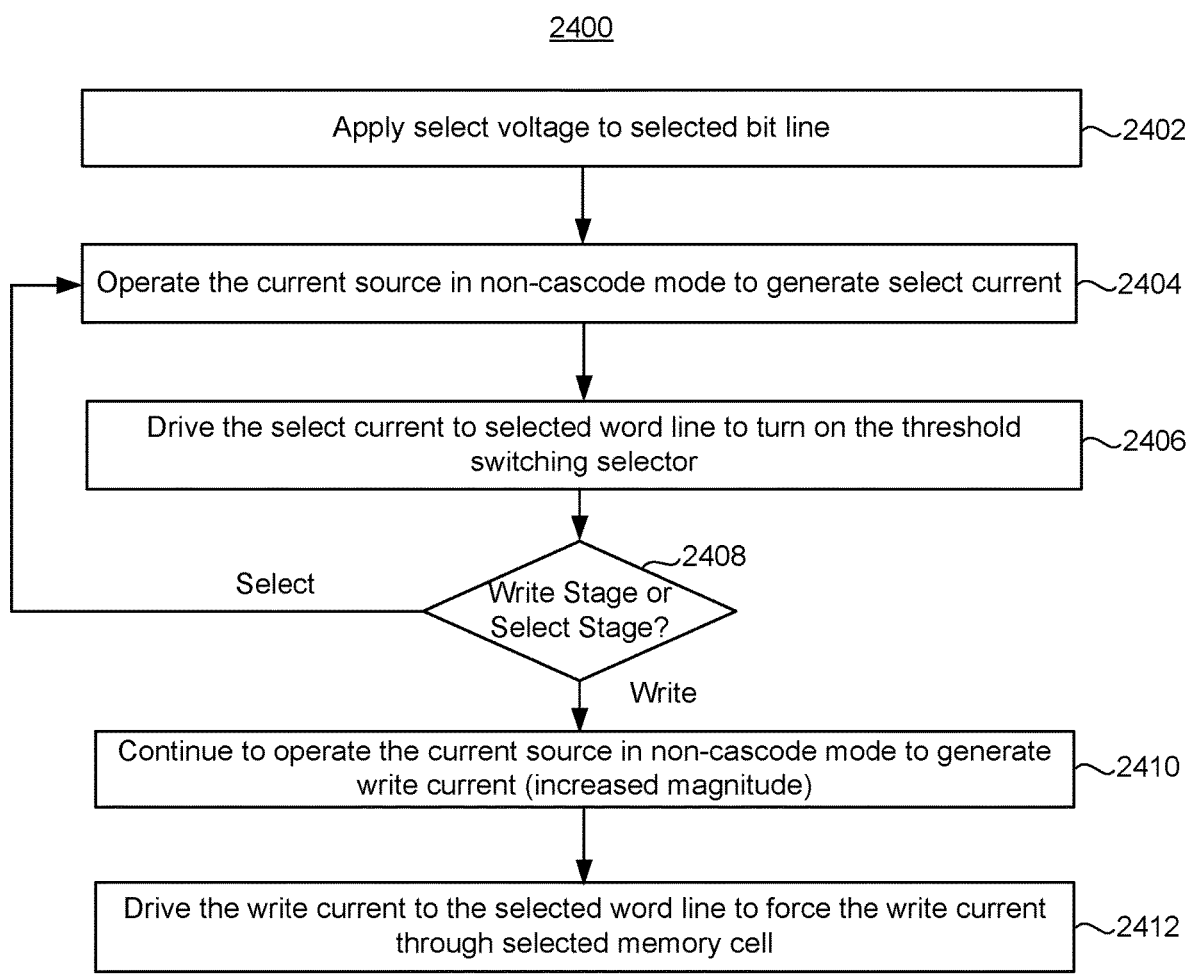
FIG. 24 is a flowchart of one embodiment of a process of a write operation.

FIG. 24 is a flowchart of one embodiment of a process 2400 of a write operation. The system may operate the current source in a non-cascode mode. In an embodiment, a programmable resistance memory cell having a threshold switching selector is written. In an embodiment, an MRAM cell with an OTS is written. However, the memory cell is not required to be MRAM and the threshold switching selector is not required to be an OTS.

Step 2402 includes applying a select voltage to the selected bit line. Step 2404 includes operating the current source in the non-cascode mode to generate a select current. The term "select current" means a current having a suitable magnitude of current and voltage to switch on the threshold switching selector. Step 2406 includes driving the select current to the selected word line to turn on the threshold switching selector.

Step 2408 includes a determination of whether the stay in a select stage or to change to a write stage. The change is made after the threshold switching selector switches on. This determination may be based on waiting a pre-determined time after first providing the current to allow sufficient time for the threshold switching selector to switch on. In response to determining to enter the write stage, the current source continues to be operated in the non-cascode mode in step 2410 to generate a write current. However, the write current may have a larger magnitude than the select current. Step 2412 includes driving the write current to the selected word line to force the write current through the selected memory cell while the threshold switching selector remains on.

Figure 25:
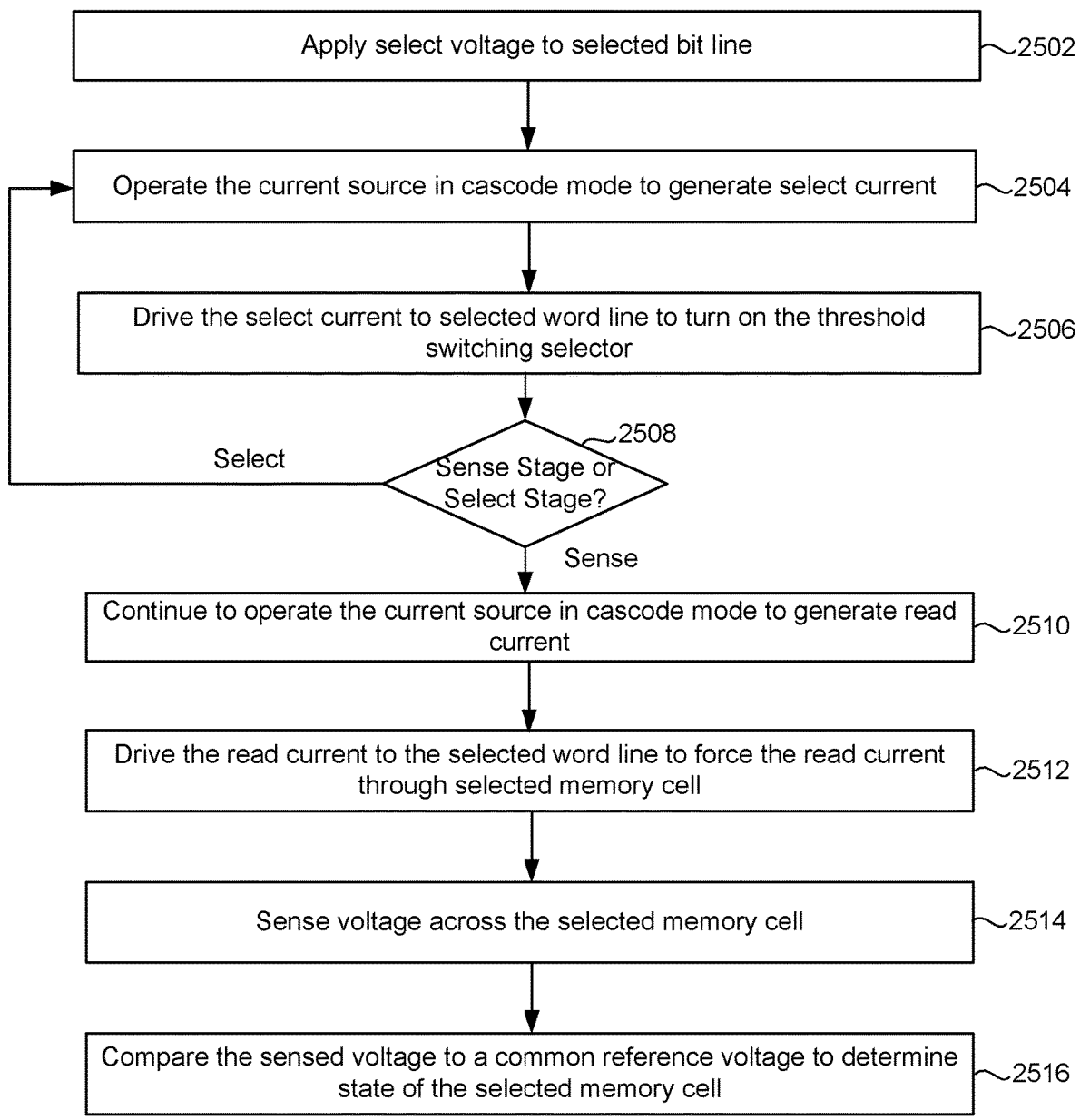
FIG. 25 is a flowchart of one embodiment of a process of a globally referenced read operation.

FIG. 25 is a flowchart of one embodiment of a process 2500 of a globally referenced read operation. The system may operate the current source in a cascode mode. In an embodiment, a programmable resistance memory cell having a threshold switching selector is read. In an embodiment, an MRAM cell with an OTS is read. However, the memory cell is not required to be MRAM and the threshold switching selector is not required to be an OTS.

Step 2502 includes applying a select voltage to the selected bit line. Step 2504 includes operating the current source in the cascode mode to generate a select current. The term "select current" means a current having a suitable magnitude of current and voltage to switch on the threshold switching selector. Step 2506 includes driving the select current to the selected word line to turn on the threshold switching selector.

Step 2508 includes a determination of whether the stay in a select stage or to change to a sense stage. The change is made after the threshold switching selector switches on. This determination may be based on waiting a pre-determined time after first providing the current to allow sufficient time for the threshold switching selector to switch on. In response to determining to enter the sense stage, the current source continues to be operated in the cascode mode in step 2510 to generate a read current. Step 2512 includes driving the read current to the selected word line to force the read current through the selected memory cell while the threshold switching selector remains on.

Step 2514 includes sensing a voltage across the selected memory cell while the current is driven through the selected memory cell. Step 2516 includes comparing the sensed voltage to a common reference voltage to determine the state of the memory cell. The "common reference voltage" is a reference voltage that is used as a comparison voltage for a number of different memory cells. This common reference voltage may be mid-way between the typical voltage of the HRS and the LRS.

In view of the foregoing, it can be seen that, according to an embodiment, an apparatus comprises a current source configured to connect to a memory array. The current source has an output configured to provide an output current. The memory array comprises a plurality of memory cells. Each memory cell comprises a memory element in series with a threshold switching selector. The threshold switching selector of each respective memory cell has an on state to select the memory element of the respective memory cell and an off state to deselect the memory cell of the respective memory cell. The apparatus comprises one or more control circuits coupled to the current source. The one or more control circuits configured to connect to the memory array. The one or more control circuits are configured to operate the current source in a first mode in which the output has a first conductance to provide the output current to a selected memory cell to turn on the threshold switching selector of the selected memory cell. The one or more control circuits are configured to operate the current source in a second mode in which the output has a second conductance to drive the output current through the memory element of the selected memory cell while the threshold switching selector of the selected memory cell remains turned on. The one or more control circuits are configured to sense a voltage across the selected memory cell while driving the output current through the memory element of the selected memory cell.

In a further embodiment, the one or more control circuits are further configured to operate the current source in the first mode after sensing the voltage across the selected memory cell to drive the output current through the memory element of the selected memory cell to write the selected memory cell while the threshold switching selector of the selected memory cell remains turned on.

In a further embodiment, the one or more control circuits are further configured to operate the current source in the second mode after writing the selected memory cell to drive the output current through the selected memory cell while the threshold switching selector of the selected memory cell remains turned on. The one or more control circuits are further configured to sense a voltage across the selected memory cell while driving the output current through the memory element of the selected memory cell after writing the selected memory cell. The one or more control circuits are further configured to compare the sensed voltage prior to writing the selected memory cell with the sensed voltage after writing the selected memory cell.

In a further embodiment, the current source comprises a cascode current source having a cascode transistor coupled to the output to provide the output current. The current source has a bypass transistor coupled in parallel across the cascode transistor. The bypass transistor has a first state configured to create a short circuit bypass of the cascode transistor and a second state in which the bypass transistor is off. The one or more control circuits are further configured to place the bypass transistor in the first state to operate the current source in the first mode in which the output current flows through the bypass transistor. The one or more control circuits are further configured to place the bypass transistor in the second state to operate the current source in the second mode in which the output current flows the cascode transistor, wherein a gate of the cascode transistor is an input of a cascode amplifier.

In a further embodiment, the current source comprises a cascode current source having a cascode transistor coupled to the output to provide the output current. The one or more control circuits are further configured to apply a first voltage to a gate of the cascode transistor to operate the current source in the first mode to provide the output current to the selected memory cell to turn on the threshold switching selector of the selected memory cell. The one or more control circuits are further configured apply a second voltage to the gate of the cascode transistor to operate the current source in the second mode to drive the output current through the memory element of the selected memory cell while the threshold switching selector of the selected memory cell remains on. The first voltage is greater than the second voltage.

In a further embodiment, the current source further comprises a first circuit having a first output transistor that is coupled to the output of the current source. The current source comprises a second circuit having a cascode current source having a cascode transistor coupled to the output of the current source. The one or more control circuits are further configured to enable the first circuit and disable the second circuit to operate the current source in the first mode to provide the output current from the first output transistor to the selected memory cell to turn on the threshold switching selector of the selected memory cell. The one or more control circuits are further configured to enable the second circuit and disable the first circuit to operate the current source in the second mode to drive the output current from the cascode transistor through the memory element of the selected memory cell.

In a further embodiment, the first circuit further comprises a first enable transistor coupled in series with the first output transistor. The second circuit further comprises a second enable transistor coupled in series with the cascode transistor. The one or more control circuits are further configured to operate the first enable transistor to connect the first output transistor to the output of the current source and to operate the second enable transistor to disconnect the cascode transistor from the output of the current source to operate the current source in the first mode. The one or more control circuits are further configured to operate the first enable transistor to disconnect the first output transistor from the output of the current source and to operate the second enable transistor to connect the cascode transistor to the output of the current source to operate the current source in the second mode.

In a further embodiment, the current source comprises a first current mirror having a first input mirror transistor coupled to a first input to receive a first reference current and a first output mirror transistor coupled to the output to mirror the first reference current to the output. The current source has a cascode transistor coupled in series with the first output mirror transistor. The current source has a first start transistor coupled in series with the first input mirror transistor. The current source comprises a second current mirror having a second input mirror transistor coupled to a second input to receive a second reference current and a second output mirror transistor coupled to the output to mirror the second reference current to the output. The current source has a second start transistor coupled in series with the second input mirror transistor. The one or more control circuits are configured to operate the first start transistor to pass the first reference current to the first input mirror transistor when operating the current source in the first mode and to block the first reference current from the first input mirror transistor when operating the current source in the second mode. The one or more control circuits are configured to operate the second start transistor to pass the second reference current to the second input mirror transistor when operating the current source in the second mode and to block the second reference current from the second input mirror transistor when operating the current source in the first mode.

In a further embodiment, the apparatus comprises the memory array. The memory element of each memory cell comprises a programmable resistance memory element.

In a further embodiment, the threshold switching selector of each memory cell comprises an Ovonic Threshold Switch (OTS).

In a further embodiment, the selected memory cell is a first memory cell. The one or more control circuits are further configured to operate the current source in the first mode to provide the output current to a second selected memory cell to turn on the threshold switching selector of the second selected memory cell. The one or more control circuits are further configured to continue to operate the current source in the first mode to drive the output current through the memory element of the second selected memory cell while the threshold switching selector of the selected memory cell remains turned on to write the second selected memory cell.

In a further embodiment, the selected memory cell is a first memory cell. The one or more control circuits are further configured to operate the current source in the second mode to provide the output current to a second selected memory cell to turn on the threshold switching selector of the second selected memory cell. The one or more control circuits are further configured to continue to operate the current source in the second mode to drive the output current through the memory element of the second selected memory cell while the threshold switching selector of the second selected memory cell remains turned on. And, the one or more control circuits are further configured to sense a voltage across the second selected memory cell while driving the output current through the memory element of the second selected memory cell.

One embodiment includes a method for operating memory. The method comprises applying a select voltage to a selected bit line in a cross-point memory array, the selected bit line connected to a selected programmable resistance memory cell in the cross-point memory array. The method comprises operating a current source in a first mode in which an output current provided by an output of the current source varies with a voltage at the output at a first rate to generate a select current. The method comprises providing the select current to a selected word line connected to the selected programmable resistance memory cell to turn on a threshold switching selector of the selected programmable resistance memory cell. The method comprises operating the current source in a second mode in which the output current varies with a voltage at the output at a second rate to generate a read current, wherein the second rate is lower than the first rate. The method comprises driving the read current through a programmable resistance memory element of the selected programmable resistance memory cell while the threshold switching selector remains on. The method comprises sensing a voltage across the selected programmable resistance memory cell while driving the read current through the programmable resistance memory element.

One embodiment includes a memory system having a cross-point memory array having programmable resistance memory cells. Each programmable resistance memory cell has a programmable resistance memory element in series with a threshold switching selector. The memory system has a current source comprising a current mirror having a first transistor coupled to an input to receive a reference current and a second transistor coupled to an output of the current source to mirror the reference current to the output. The current source further comprises a third transistor coupled in series with the first transistor and a fourth transistor coupled in series with the second transistor. The memory system has one or more control circuits coupled to the cross-point memory array and to the current source. The one or more control circuits are configured to operate the current source in a first mode to generate a select current, including operating the fourth transistor in a non-cascode mode. The one or more control circuits are configured to provide the select current to a selected memory cell in the cross-point memory array to turn on the threshold switching selector of the selected memory cell. The one or more control circuits are configured to operate the current source in a second mode to generate a read current, including operating the fourth transistor in a cascode mode, The one or more control circuits are configured to drive the read current through the selected memory cell while the threshold switching selector remains on. The one or more control circuits are configured to sense a voltage across the selected memory cell while driving the read current through the selected memory cell.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The terms "top" and "bottom," "upper" and "lower" and "vertical" and "horizontal," and forms thereof, as may be used herein are by way of example and illustrative purposes only, and are not meant to limit the description of the technology inasmuch as the referenced item can be exchanged in position and orientation. Also, as used herein, the terms "substantially" and/or "about" mean that the specified dimension or parameter may be varied within an acceptable tolerance for a given application.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
a current source configured to connect to a memory array, the current source having an output, the memory array comprising a plurality of memory cells, wherein each memory cell comprises a memory element in series with a threshold switching selector, wherein the threshold switching selector of each respective memory cell has an on state to select the memory element of the respective memory cell and an off state to deselect the memory cell of the respective memory cell; and
one or more control circuits coupled to the current source, the one or more control circuits configured to connect to the memory array, wherein the one or more control circuits are configured to:
operate the current source in a first mode in which the output has a first conductance to provide a first output current from the output of the current source to cause a first voltage across a selected memory cell to turn on the threshold switching selector of the selected memory cell;
operate the current source in a second mode in which the output has a second conductance to drive a second output current from the output of the current source through the memory element of the selected memory cell while the threshold switching selector of the selected memory cell remains turned on; and
sense a second voltage across the selected memory cell while driving the second output current through the memory element of the selected memory cell.

2. The apparatus of claim 1, wherein the one or more control circuits are further configured to:
operate the current source in the first mode after sensing the second voltage across the selected memory cell to drive a write current through the memory element of the selected memory cell to write the selected memory cell while the threshold switching selector of the selected memory cell remains turned on.

3. The apparatus of claim 2, wherein the one or more control circuits are further configured to:
operate the current source in the second mode after writing the selected memory cell to drive a read current through the selected memory cell while the threshold switching selector of the selected memory cell remains turned on, the read current having substantially the same magnitude as the second output current used when sensing the second voltage across the selected memory cell;
sense a third voltage across the selected memory cell while driving the read current through the memory element of the selected memory cell after writing the selected memory cell; and
compare the sensed second voltage prior to writing the selected memory cell with the sensed third voltage after writing the selected memory cell.

4. The apparatus of claim 1, wherein:
the current source comprises a cascode current source having a cascode transistor coupled to the output of the current source, the current source having a bypass transistor coupled in parallel across the cascode transistor and coupled to the output of the current source, wherein the bypass transistor has a first state configured to create a short circuit bypass of the cascode transistor and second state in which the bypass transistor is off; and
the one or more control circuits are further configured to:
place the bypass transistor in the first state to operate the current source in the first mode in which the first output current flows through the bypass transistor; and
place the bypass transistor in the second state to operate the current source in the second mode in which the second output current flows through the cascode transistor, wherein a gate of the cascode transistor is an input of a cascode amplifier.

5. The apparatus of claim 1, wherein:
the current source comprises a cascode current source having a cascode transistor coupled to the output of the current source to provide the first output current and the second output current; and
the one or more control circuits are further configured to:
apply a first voltage to a gate of the cascode transistor to operate the current source in the first mode to provide the first output current to cause the first voltage across the selected memory cell to turn on the threshold switching selector of the selected memory cell; and
apply a second voltage to the gate of the cascode transistor to operate the current source in the second mode to drive the second output current through the memory element of the selected memory cell while the threshold switching selector of the selected memory cell remains on, wherein the first voltage to the gate of the cascode transistor is greater than the second voltage to the gate of the cascode transistor.

6. The apparatus of claim 1, wherein:
the current source further comprises a first circuit having a first output transistor that is coupled to the output of the current source to provide the first output current;
the current source comprises second circuit having a cascode current source having a cascode transistor coupled to the output of the current source to provide the second output current; and
the one or more control circuits are further configured to:
enable the first circuit and disable the second circuit to operate the current source in the first mode to provide the first output current from the first output transistor to cause the first voltage across the selected memory cell to turn on the threshold switching selector of the selected memory cell; and enable the second circuit and disable the first circuit to operate the current source in the second mode to drive the second output current from the cascode transistor through the memory element of the selected memory cell.

7. The apparatus of claim 6, wherein:

the first circuit further comprises a first enable transistor coupled in series with the first output transistor;

the second circuit further comprises a second enable transistor coupled in series with the cascode transistor;

the one or more control circuits are further configured to operate the first enable transistor to connect the first output transistor to the output of the current source and to operate the second enable transistor to disconnect the cascode transistor from the output of the current source to operate the current source in the first mode; and the one or more control circuits are further configured to operate the first enable transistor to disconnect the first output transistor from the output of the current source and to operate the second enable transistor to connect the cascode transistor to the output of the current source to operate the current source in the second mode.

8. The apparatus of claim 1, wherein:

the current source comprises a first current mirror having a first input mirror transistor coupled to a first input to receive a first reference current and a first output mirror transistor coupled to the output of the current source to mirror the first reference current to the output of the current source to provide the second output current, the current source having a cascode transistor coupled in series with the first output mirror transistor, the current source having a first start transistor coupled in series with the first input mirror transistor;

the current source comprises a second current mirror having a second input mirror transistor coupled to a second input to receive a second reference current and a second output mirror transistor coupled to the output of the current source to mirror the second reference current to the output of the current source to provide the first output current, the current source having a second start transistor coupled in series with the second input mirror transistor;

the one or more control circuits are configured to operate the first start transistor to pass the first reference current to the first input mirror transistor when operating the current source in the second mode to provide the second output current and to block the first reference current from the first input mirror transistor when operating the current source in the first mode; and the one or more control circuits are configured to operate the second start transistor to pass the second reference current to the second input mirror transistor when operating the current source in the first mode to provide the first output current and to block the second reference current from the second input mirror transistor when operating the current source in the second mode.

9. The apparatus of claim 1, wherein the apparatus further comprises the memory array, the memory element of each memory cell comprises a programmable resistance memory element.

10. The apparatus of claim 9, wherein the threshold switching selector of each memory cell comprises an Ovonic Threshold Switch (OTS).

11. The apparatus of claim 1, wherein the selected memory cell is a first memory cell, wherein the one or more control circuits are further configured to:

operate the current source in the first mode to provide a select current to cause a third voltage across a second selected memory cell to turn on the threshold switching selector of the second selected memory cell; and continue to operate the current source in the first mode to drive a write current through the memory element of the second selected memory cell while the threshold switching selector of the selected memory cell remains turned on to write the second selected memory cell, wherein the write current has a greater magnitude than the selected current.

12. The apparatus of claim 1, wherein the selected memory cell is a first memory cell, wherein the one or more control circuits are further configured to:

operate the current source in the second mode to provide a select current to cause a third voltage across a second selected memory cell to turn on the threshold switching selector of the second selected memory cell;

continue to operate the current source in the second mode to drive a read current through the memory element of the second selected memory cell while the threshold switching selector of the second selected memory cell remains turned on; and sense a fourth voltage across the second selected memory cell while driving the read current through the memory element of the second selected memory cell, wherein the select current, the read current, and the second output current each have substantially the same magnitude.

13. A method for operating memory, the method comprising:

applying a select voltage to a selected bit line in a cross-point memory array, the selected bit line connected to a selected programmable resistance memory cell in the cross-point memory array;

operating a current source in a first mode in which a first output current provided by an output of the current source varies with a voltage at the output of the current source at a first rate to generate a select current;

providing the select current to a selected word line connected to the selected programmable resistance memory cell while the select voltage is applied to the selected bit line to turn on a threshold switching selector of the selected programmable resistance memory cell;

operating the current source in a second mode in which a second output current provided by the output of the current source varies with the voltage at the output of the current source at a second rate to generate a read current, wherein the second rate is lower than the first rate;

driving the read current through a programmable resistance memory element of the selected programmable resistance memory cell while the threshold switching selector remains on; and sensing a voltage across the selected programmable resistance memory cell while driving the read current through the programmable resistance memory element.

14. The method of claim 13, wherein:

operating the current source in the first mode comprises bypassing a cascode transistor with a bypass transistor, the bypass transistor coupled to the output of the current source to provide the select current, bypassing the cascode transistor results in the select current varying with the voltage at the output of the current source at the first rate; and operating the current source in the second mode comprises operating the current source with the cascode transistor coupled to the output of the current source with the read current varying with the voltage at the output of the current source at the second rate.

15. The method of claim 13, wherein:

operating the current source in the first mode comprises enabling a first current mirror for which a first current mirror output current varies with a voltage at the output of the first current mirror at the first rate while disabling a current mirror cascode circuit, the output of the first current mirror when enabled being the output of the current source, the first current mirror output current being the output current of the current source; and operating the current source in the second mode comprises disabling the first current mirror while enabling the current mirror cascode circuit for which a cascode output current varies with a voltage at the output of the current mirror cascode circuit at the second rate to provide the read current from the current mirror cascode circuit, the output of the current mirror cascode circuit when enabled being the output of the current source, the cascode output current being the output current of the current source.

16. The method of claim 13, wherein:

operating the current source in the first mode comprises applying a first voltage to a gate of a cascode transistor, the cascode transistor coupled to the output of the current source to provide the select current varying with the voltage at the output of the current source at the first rate; and operating the current source in the second mode comprises applying a second voltage to the gate of the cascode transistor, the cascode transistor coupled to the output of the current source to provide the read current varying with the voltage at the output of the current source at the second rate, the second voltage to the gate of the cascode transistor having a lower magnitude than the first voltage to the gate of the cascode transistor.

17. The method of claim 13, further comprising:

operating the current source in the first mode to generate a write current;

driving the write current through the selected programmable resistance memory cell to write the selected programmable resistance memory cell while the threshold switching selector of the selected memory cell remains turned on;

operating the current source in the second mode to generate a second read current after operating the current source in the first mode to generate the write current;

driving the second read current through the selected programmable resistance memory cell while the threshold switching selector of the selected memory cell remains turned on;

sensing a voltage across the selected programmable resistance memory cell while driving the second read current through the selected programmable resistance memory cell; and comparing the sensed voltage prior to writing the selected programmable resistance memory cell with the sensed voltage after writing the selected programmable resistance memory cell.

18. A memory system comprising:

a cross-point memory array having first conductive lines, second conductive lines and programmable resistance memory cells, each programmable resistance memory cell having a programmable resistance memory element in series with a threshold switching selector between one of the first conductive lines and one of the second conductive lines;

a current source comprising a current mirror having a first transistor coupled to an input to receive a reference current and a second transistor coupled to an output of the current source to mirror the reference current to the output, wherein the current source further comprises a third transistor coupled in series with the first transistor and a fourth transistor coupled in series with the second transistor; and one or more control circuits coupled to the cross-point memory array and to the current source wherein the one or more control circuits are configured to:

operate the current source in a first mode to generate a select current, including operating the fourth transistor in a non-cascode mode;

provide the select current to a selected first conductive connected to a selected memory cell in the cross-point memory array while applying a select voltage to a selected second conductive line connected to the selected memory cell to turn on the threshold switching selector of the selected memory cell;

operate the current source in a second mode to generate a read current, including operating the fourth transistor in a cascode mode;

drive the read current through the selected memory cell while the threshold switching selector remains on; and sense a voltage across the selected memory cell while driving the read current through the selected memory cell.

19. The memory system of claim 18, wherein:

the current source comprises a fifth transistor connected in parallel with the fourth transistor;

operating the current source in the first mode and operating the fourth transistor in the non-cascode mode comprises bypassing the fourth transistor with the fifth transistor wherein the select current is from the fifth transistor and second transistor connected in series; and operating the current source in the second mode and operating the fourth transistor in the cascode mode comprises turning off the fifth transistor wherein the read current is from the second transistor and fourth transistor connected in series, wherein a gate of the fourth transistor is an input of a cascode amplifier.

20. The memory system of claim 18, wherein:

operating the current source in the first mode and operating the fourth transistor in the non-cascode mode comprises applying a first bias voltage to a gate of the fourth transistor; and operating the current source in the first mode and operating the fourth transistor in the non-cascode mode comprises applying a second bias voltage to the gate of the fourth transistor that is lower than the first bias voltage.

* * * * *